United States Patent
Kislov

(10) Patent No.: US 10,467,362 B2
(45) Date of Patent: Nov. 5, 2019

(54) ANALYTICAL TOOLS AND METHODS FOR MODELING TRANSPORT PROCESSES IN FLUIDS

(71) Applicant: Nikolai Kislov, Tampa, FL (US)

(72) Inventor: Nikolai Kislov, Tampa, FL (US)

( * ) Notice: Subject to any disclaimer, the term of this patent is extended or adjusted under 35 U.S.C. 154(b) by 0 days.

(21) Appl. No.: 15/989,253

(22) Filed: May 25, 2018

(65) Prior Publication Data

US 2019/0228124 A1    Jul. 25, 2019

Related U.S. Application Data

(60) Provisional application No. 62/619,595, filed on Jan. 19, 2018, provisional application No. 62/672,789, filed on May 17, 2018.

(51) Int. Cl.
    *G06F 17/50* (2006.01)
    *G06F 17/13* (2006.01)
    *G06F 17/18* (2006.01)

(52) U.S. Cl.
    CPC .......... *G06F 17/5018* (2013.01); *G06F 17/13* (2013.01); *G06F 17/18* (2013.01); *G06F 2217/16* (2013.01)

(58) Field of Classification Search
    CPC ................ B64G 1/401; G06F 17/5018; G06F 17/5009; C23C 14/042; B05B 7/1486; G06K 9/6265; G01N 27/624
    See application file for complete search history.

(56) References Cited

U.S. PATENT DOCUMENTS

| | | | |
|---|---|---|---|
| 5,025,346 A | 6/1991 | Tang | |
| 6,089,744 A * | 7/2000 | Chen | G06F 17/5018 703/2 |
| 6,631,648 B2 | 10/2003 | Lal | |
| 7,076,414 B2 | 7/2006 | Miyori | |
| 7,209,873 B1 | 4/2007 | Kliegel | |
| 8,642,953 B2 | 2/2014 | Turteltaub | |

(Continued)

OTHER PUBLICATIONS

Mol, Squeezed film damping measurements on a parallel-plate MEMS in the free molecule regime, J. Micromech. Microeng. 19 (2009) 074021 (6pp), doi:10.1088/0960-1317/19/7/074021 (http://iopscience.iop.g/0960-1317/19/7/074021).

(Continued)

*Primary Examiner* — Kandasamy Thangavelu

(57) ABSTRACT

An improved computer implemented method for modeling transport processes in fluids is disclosed. Instead of modeling based on using an infinitesimal fluid element of a continuous medium, the method approximates fluid flow in a fluid system as a model gas flow in a model gas system being identical to the fluid system. The method is adapted to model gas flow including dilute gas flow for high Knudsen numbers (Kn). The method delivers a new basis for prediction of dynamic evolution of the model gas system by considering a pre-established or known dynamic history of the system during a pre-initial period. A new generation of Computational Fluid Dynamics software products, which are based on the disclosed analytical tools and methods, are anticipated having capability to modeling gases from the continuum flow regime (Kn<0.01) to the free molecular flow regime (Kn>10), considerably higher accuracy of prediction, and lower computation cost.

30 Claims, 17 Drawing Sheets

(56) References Cited

U.S. PATENT DOCUMENTS

| | | | |
|---|---|---|---|
| 9,243,624 B2 | 1/2016 | Mcnamara | |
| 2003/0087471 A1* | 5/2003 | Shtein | C23C 14/042 438/82 |
| 2010/0151124 A1* | 6/2010 | Xue | B05B 7/1486 427/185 |
| 2010/0224731 A1* | 9/2010 | Gany | B64G 1/401 244/171.1 |
| 2011/0183431 A1* | 7/2011 | Covey | G01N 27/624 436/173 |
| 2013/0144576 A1* | 6/2013 | Gnoffo | G06F 17/5009 703/2 |
| 2014/0372348 A1* | 12/2014 | Lehmann | G06K 9/6265 706/12 |

OTHER PUBLICATIONS

Wang, Slide film damping in microelectromechanical system devices, Proc IMechE Part N: J Nanoengineering and Nanosystems 227(4) 162-170, DOI: 10.1177/1740349913486097 (pin.sagepub.com).

Hutcherson, On the squeeze-film damping of micro-resonators in the free-molecule regime, J. Micromech. Microeng. 14 (2004) 1726-1733.

Gologanu, Damping effects in MEMS resonators, CAS 2012 (International Semiconductor Conference), Sinaia, 2012, pp. 67-76. doi: 10.1109/SMICND.2012.6400695 (https://ieeexplore.ieee.org/document/6400695/citations).

Turansky, High-Fidelity Dynamic Modeling of Spacecraft in the Continuum—Rarefied Transition Regime (2012), Aerospace Engineering Sciences Graduate Theses & Dissertations. 53. https://scholar.colorado.edu/asen_gradetds/53.

Grabe, Numerical Simulation of Nozzle Flow into High Vacuum Using Kinetic and Continuum Approaches. In: Dillmann A., Heller G., Klaas M., Kreplin HP., Nitsche W., Schroder W. (eds) New Results in Numerical and Experimental Fluid Mechanics VII. Notes on Numerical Fluid Mechanics and Multidisciplinary Design, vol. 112 (2010) Springer, Berlin, Heidelberg. 10.1007/978-3-642-14243-7_52.

Hutcherson, Theoretical and numerical studies of the air damping of micro-resonators in the non-continuum regime, (Thesis), G. W. Woodruff School of Mechanical Engineering, Georgia Institute of Technology, Nov. 2004.

* cited by examiner

ANALYTICAL TOOLS AND METHODS FOR MODELING TRANSPORT PROCESSES IN FLUIDS

CROSS-REFERENCE TO RELATED APPLICATIONS

This application incorporates by reference the entire contents of U.S. provisional application No. 62/619,595 entitled "Analytical Tools and Method for Simulating Fluid Flow" filed Jan. 19, 2018, and the entire contents of U.S. provisional application No. 62/672,789 entitled "Analytical Tools and Method for Modeling Transport Processes in Fluids" filed May 17, 2018.

BACKGROUND

Computational Fluid Dynamics (CFD) is used mainly for analytical predictions of the fluid transport properties including velocity, heat transfer coefficient, and pressure; still, CFD has many challenges. One challenge is that the users must select the appropriate models to characterize their specific problem. However, errors due to uncertainty in the formulation of the model and often intentional simplification of the model may diminish the usefulness of the results of the computations. Also, errors in the modeling of the fluids problem are disturbed with the choice of the governing equations to be solved and models for the fluid properties. The general major disadvantage of any existing or available on market CFD software consists in using an infinitesimal fluid element viewed as a continuous medium, to which fundamental physical principles are applied. This approach is in a contradiction with the molecular or particle nature of the matter, thus providing a source of significant uncertainty in interpreting the results of modeling and calculations.

Simulating a system means solving its mathematical model and predicting its behavior in different situations based on that solution. Continuous systems can be modeled with ordinary differential equations (ODE) or partial differential equations (PDE). Solving an ODE or PDE, which models a particular system, with an initial value at an initial time, $t_0$, results in determining the system's evolution. Disadvantageously, this approach does not consider that the dynamic behavior of the fluid system in times earlier than initial time, $t_0$, which actually affects the behavior of the fluid system in times following the initial time.

Fluid as a matter comprises molecules. In contemporary fluid dynamics, it indeed is considered as a continuous distribution of matter and is defined as a substance that deforms continuously under the action of shear stress. Both liquids and gases are fluids and all variables describing fluids are considered continuous functions of the spatial coordinates and time. The differential forms derived from the fundamental conservations laws with additional assumption of Newton's viscosity law are commonly known as Navier-Stokes (NS) equations, which also include time-dependent equations for conservation of mass, linear momentum, angular momentum, and energy.

Those equations are derived by considering the mass, momentum, and energy balances for an infinitesimal control volume. The variables to be determined are the velocity components, the fluid density, static pressure, and temperature. The flow is assumed to be differentiable and continuous, allowing these balances to be expressed as partial differential equations.

Also, the balance equations can only describe fluid flow approximately mostly because of inability to determine the functional distribution for viscous stress forces and the rate of heat addition and viscous dissipation. Thus, although the conservation laws correctly describe the fluid within a control volume located remotely in a fluid flow, they do not take into the consideration the molecular nature of the fluid. Specifically, viscosity in gases arises principally from the molecular diffusion that transports momentum between layers of flow.

As a general limitation, microscopic or bulk analysis allows the treatment of a collection of free particles as a continuum where collisional mean free path, $\lambda_f$, is much lower than the macroscopic length scale L of the system. However, the classical continuum approach cannot be applied to situations when the length scale of the system is of the same order or less as compared to the collisional mean free path. From viewpoint of the classical fluid dynamic, the condition $\lambda_f \ll L$ makes good physical sense, which enables the introduction of the concept of the fluid element with volume V having a linear size large in comparison with $\lambda_f$ but small in comparison with L. It is well-known from the prior art that "the Navier-Stokes equations, which are the base for the CFD, are only valid as long as the representative physical length scale of the system is much larger than the mean free path of the molecules that make up the fluid. In that case, the fluid is referred to as a continuum. The ratio of the mean free path, $\lambda_f$, and the representative length scale, L, is called the Knudsen number, $Kn = \lambda_f/L$. The NS equations are valid for $Kn < 0.01$." [1]

In recent years, flow in microsystems has received much attention because of rapid developments in micromachining technology, in which most common components are micro fluidic and micro heat transfer systems, namely, Micromechanical Systems (MEMS). To define a transport process, one must understand conditions at the boundary of the system. At the current state of the art, specifying the boundary conditions is one of the most difficult parts of the analysis. In microfluidic systems, the molecular mean free path is comparable to the system's characteristic length, so that non-continuum or rarefied effects at molecular scale must be considered.

Returning to the consideration of the fluid as continuum, we should highlight the following. Navier-Stokes equations are derived by considering the mass, momentum, and energy balances for an extremely small control volume. The flow is considered implicitly differentiable and continuous, allowing these balances to be expressed as partial differential equations. The variables to be solved for are the velocity components, the fluid density, static pressure, and temperature. However, in practice, these equations are very difficult to solve analytically. Therefore, scientists and engineers made further approximations and simplifications to the equation set until they had a group of equations that they could solve. It implies that the Navier-Stokes equations can describe fluid flow only approximately. In addition, in small-scale flows when the characteristic hydrodynamic length scale approaches the fluid characteristic length scale, the Navier-Stokes description is expected to fail. In dilute or rarefied gases, mean free path or the average distance traveled between intermolecular collisions is also considered to be a fail factor for the Navier-Stokes description.

The limitation that the NS equations are valid for $Kn < 0.01$ reduces the fields of CFD applications significantly [1]. Specifically, the conventional CFD method is inapplicable for modeling of dilute or rarefied gases. As stated in Multiphysics Cyclopedia of COMSOL, "The characteristic length of your model should therefore be larger than 6.8 μm for the NS equations to be valid" [1]. The conventional CFD method is not useful for simulations microelectronics and nanoelectronics low-pressure processing and plasma processing where a chamber pressure is in the range from $10^{-4}$ Pa for physical vapor deposition to 10 Pa for sputtering [2]. It does not simulate a gas flow properly in microchannels in MEMS applications [3]: in the slip-transition regimes range, which is, $0.001<Kn\leq10$, the CFD scheme, based on the classical Navier-Stokes equations "becomes inappropriate to describe the gas flow behavior in MEMS devices."

The other approach involves fluid simulations based on collisions of particles positioned at sites of a three-dimensional lattice. It can be performed effectively only by a massively parallel data processors having combinational logic for processing collision rules. This method is enormously complicated and restricted because of the limitation of the available computational approaches for modeling real physical systems.

Summing noted above, a satisfactory, accurate calculation of momentum or mass or energy transport properties of free particles interacting by collisions lies in a lack of an appropriate method for describing adequately a collection of free particles traveling in space via particle/molecular collisions between gas particles.

In view of the above, a practical universal analytical tool and method that allows effective combination/supplement of macroscopic fluid dynamics with microscopic particulate nature of the matter and capable modeling gases in a wide range of gas pressure from dilute or rarefied gases to high pressure gases is desired.

SUMMARY

It is an object of the present invention to provide analytical tools and a method for modeling fluid flow such as a gas flow in an unstable and stable conditions.

It is also an object to describe adequately a collection of free particles traveling in space via particle/molecular collisions for predicting one or more of distribution patterns of fluid flow properties such as density, mass flow velocity, and temperature.

One general aspect includes a method for modeling transport processes in fluids including: approximating a fluid flow in a fluid system as a flow of a model gas in a model gas system being identical to the fluid system, where the model gas facilitates a distant transport of one or more of properties including one or more of mass, momentum, and energy, which is implemented by way of a plurality of particles being in a constant state of mostly random motion and interaction by collisions, where each of the plurality of particles of the model gas is assigned to travel with a probability between any of two points of a plurality of points in space occupied by the model gas by following a ballistic trajectory governed by a law of motion. The ballistic trajectory has a starting point in one of a plurality of points of original collisions and an ending point in one of a plurality of points of ending collisions, and where each of the plurality of particles is adapted to transport a combination of one or more of properties including one or more of mass, momentum, and energy between one of the plurality of points of original collisions and one of the plurality of points of ending collisions.

In some embodiments, the method further includes treating each point of the plurality of points in space occupied by the model gas as a point of collisions for each of the plurality of particles having the ballistic trajectory having the ending point in one of the plurality of points at a same time; treating each of the plurality of points of original collisions as a point source; treating each of the plurality of points of ending collisions as a point sink; and treating each of the plurality of particles moving from the point source to the point sink as a property carrier created in the point source at time of original collision by obtaining one or more of properties of specific values being intrinsic to the model gas surrounding the point source, and ended in the point sink at time of ending collision by transferring one or more of properties of specific values in the point sink, where value of property delivered in the point sink by each of the plurality of converging ballistic particles or value of property taken away from the point source by each of the plurality of diverging ballistic particles is evaluated regarding whether value of the property is conserved or changed because of aging and whether value of property carried by each of the plurality of particles is modified because of interaction with an external field, and where velocity of each of a plurality of point sources is assigned to be equal to mass flow velocity of the model gas in each of a plurality of corresponding points of original collisions at time of original collision.

In some embodiments, the method further including steps of: specifying a geometry model; defining a net rate of property influx per unit volume from the model gas system in a general point of a plurality of non-moving points in space occupied by the model gas at a given time, the net rate of property influx per unit volume, which is formed by way of a plurality of converging ballistic particles, each of the plurality of converging ballistic particles is selected from the plurality of particles by the ballistic trajectory having the ending point in the general point of the plurality of non-moving points in space occupied by the model gas at the given time, where the given time is greater than or equal to the initial time; defining a net rate of property efflux per unit volume from the general point at the given time, the net rate of property efflux per unit volume, which is formed by way of a plurality of diverging ballistic particles, each of the plurality of diverging ballistic particles is selected from the plurality of particles by the ballistic trajectory having the starting point in the general point of the plurality of non-moving points at the given time; forming an integral property balance equation for each of one or more properties being transported by the plurality of particles in each of the plurality of non-moving points, where the integral property balance equation is established in a way that, in the general point at the given time, a term of the net rate of property influx per unit volume is equated to sum of the first term of temporal rate of a property change per unit volume and a second term of the net rate of property efflux per unit volume; and computing the flow of the model gas, where computing the flow of the model gas includes resolving a system of one or more of integral property balance equations in each of the plurality of non-moving points at the given time. Implementations of the described techniques include hardware, a method or process, or computer software on a computer-accessible medium.

In some embodiments, the a computer system includes a processor; a non-transitory computer readable memory coupled to the processor; one or more user input devices operatively coupled to the processor; a display operatively coupled to the processor; software stored in the non-transitory computer readable memory and executable by the processor, the software having computer readable instructions that are operable, when executed by data processing apparatus, to perform operations including: obtaining a plurality of parameters specifying a fluid system being approximated to a model gas system including specification of model gas material, pressure, temperature, and geometry, where the plurality of parameters specifying geometry includes setting geometry and boundary conditions during a period from a pre-initial time until the given time; obtaining a set of discretization parameters specifying a set of points in space occupied by a model gas; obtaining a value of an allowable error for calculations; obtaining a set of parameters including an initial time and the given time; calculating, for each of the set of points in space occupied by the model gas, a local initial time, obtaining a set of derived analytical equations involving in the set of parameters which govern model gas flow; solving the set of derived analytical equations to calculate a property value in each of the set of points in space occupied by the model gas at the given time; and where the set of derived analytical equations is derived based on an assumption that the model gas facilitates distant transport of one or more of properties including one or more of mass, momentum, and energy, which is implemented by way of a plurality of particles traveling with a probability between any of two points in space occupied by the model gas by following a ballistic trajectory governed by a law of motion, where each of the plurality of particles is adapted to transport a combination of one or more of properties including one or more of mass, momentum, and energy between any of two points of a plurality of points of collisions.

The method offers a basis for a new generation of a Computational Fluid Dynamics analysis processes since modeling of the fluid system evolution can be based not only on the established initial conditions at the initial time for the fluid system but also on the pre-established dynamic history of the fluid system at a period preceding the initial time, thus increasing certainty and accuracy of prediction of the fluid system evolution for extended period of time. The method advances a new generation of a Computational Fluid Dynamics analysis processes by a significant decrease of physical modeling errors due to uncertainty in the formulation of the model and deliberate simplifications of the model. The method creates potentially much lower discretization errors since the flow problem can be formulated by direct application of integral or integro-differential equations, thus eliminating errors occurred from the representation of the governing flow differential equations and other physical models as algebraic expressions in a discrete domain of space and time.

In one embodiment, a simulation is disclosed for incompressible model gas expanding in the space between two infinite parallel plates in the open channel at the uniform temperature where the top and bottom plates and the model gas are initially at rest. The velocity profile induced in the model gas due to sudden motion of the bottom plate is determined by using computer program including computer readable medium having represented in that program codes.

In another embodiment, a simulation is disclosed for incompressible model gas expanding in the space between two infinite parallel plates in the open channel at the uniform temperature in a case of mixed diffuse and specular particles scatterings from the plates being at rest. The velocity profile induced in the model gas due to the pressure gradient along the channel is determined by using computer program including computer readable medium having represented in that program codes.

In another embodiment, an apparatus for calculations by using a computer program product with a computer system is disclosed including a data entry system having suitable type of user I/O interface, a data storage device, which may be any suitable computer readable and programmable memory. Calculations are performed by a processor, which may be any suitable computer processor and may be displayed to the user on display, which may be any suitable computer display.

As will further be appreciated by those of skill in the art, although described above primarily referring to method aspects, the invention may be embodied, for example, as a method, apparatus/system and computer program products. Other systems, methods, and computer program products according to embodiments will be or become apparent to one with skill in the art upon review of these drawings and detailed description. It is intended that all such additional systems, methods, and computer program products be included within this description, be within the scope of the present invention, and be protected by the claims.

BRIEF DESCRIPTION OF THE DRAWINGS

The invention can be best understood by those having ordinary skill in the art by reference to the following detailed description when considered with the drawings, which are provided as example schematics and are not meant to limit the invention, where.

DETAILED DESCRIPTION

Figure 1:
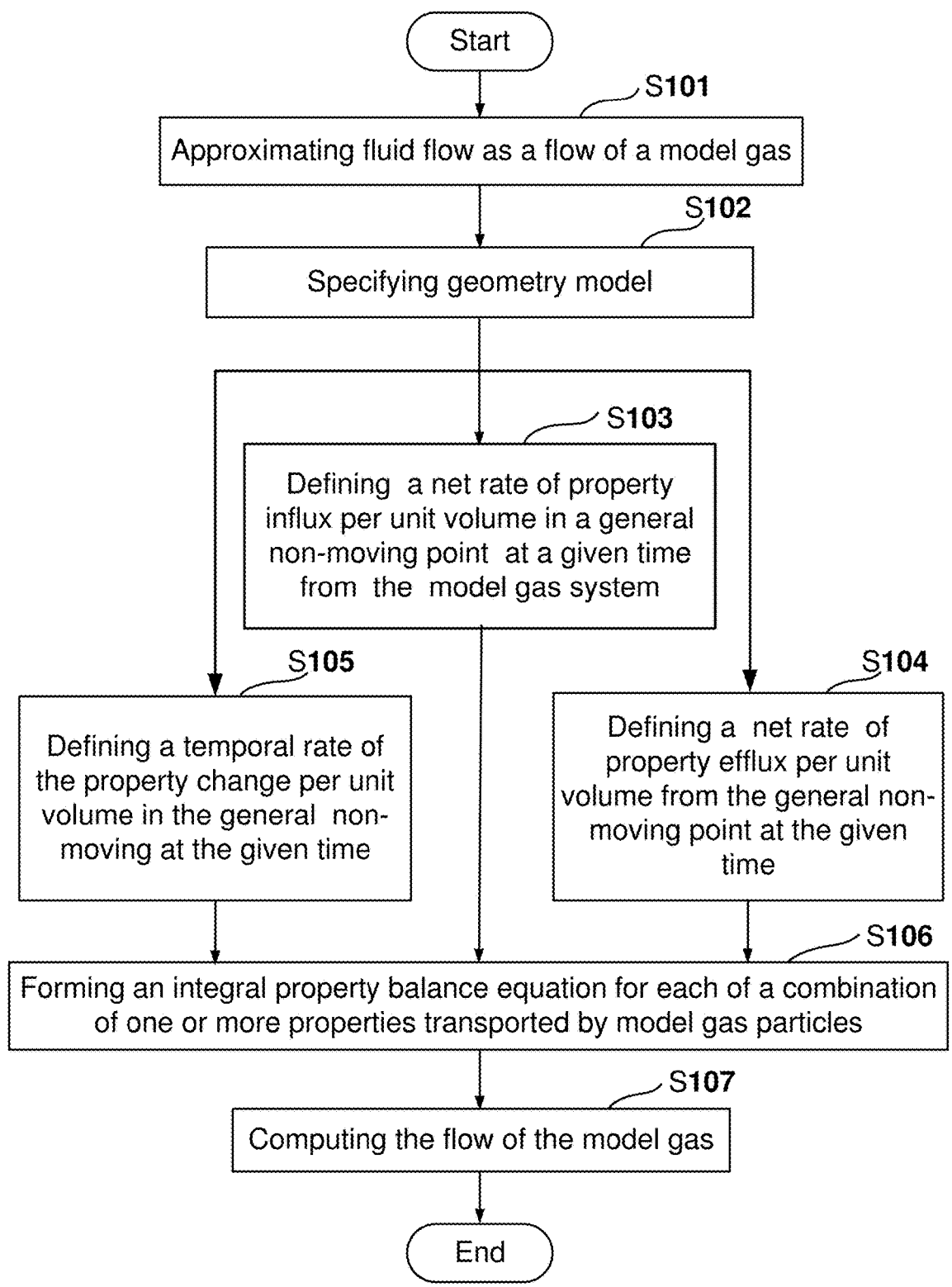
FIG. 1 is a general flowchart of the method steps embodying the principles of the invention.

Reference will now be made to the preferred embodiments of the invention, examples of which are illustrated in the drawings. Throughout the following detailed description, the same reference numerals refer to the same elements in all figures.

The transport processes involve the exchange of mass, momentum, energy, and other properties exchanged via exchange by particles. In a more abstract sense, we view all particle interactions and property randomizing as an exchange of property/information. We have also recognized that (1) transport phenomena include any situation that involves a net transfer of property/information between particles and randomizing properties between interacting particles; (2) a randomized physical/statistical property by property exchange between interacting particles can be taken out into the surrounding gas.

It is to be understood that other embodiments may be utilized and structural changes may be made without departing from the scope of the claimed subject matter. Specifically, the following specification is limited to the case of fluid systems having no internal property generation sources such as energy generation sources. However, the method can be generalized by including in the balance property/energy generation term with no difficulty, as apprehended by those skilled in the art.

In this specification, all references are made to absolute time, which is measured equally in all inertial reference frames. Also, when referencing to appropriate laws of motion, Newton's First and Second Laws of motion are applied to embodiments of this invention. However, the method can be generalized, for example, by applying a different law of motion applicable to non-Newtonian or relativistic systems, as apprehended by those skilled in the art.

Also, in these embodiments, the majority of the transport processes are treated or viewed as transient or unsteady, implying that process variables change in time, which is the most common state of a system or process. However, the method can be reduced to a steady state or in a stable state, in which the values of all variables associated with the process do not change with time, by eliminating the time dependence in variables and terms associated with the process with no difficulty, as apprehended by those skilled in the art.

In these embodiments, fluid affected by a uniform body force or external force field such as gravitational field is analyzed. It is to be understood this limitation is made without departing from the scope of the claimed subject matter.

Some have recognized that the majority of rules and concepts governing fluid flow in three-dimensional and one-dimensional configurations are similar. Therefore, for clarity and exemplary, the key part of the specification deals with a method of modeling fluid behavior in the one-dimensional fluid system, which comes with simulations in a computer. However, needs to provide supplemental information is recognized, so those skilled in the art can produce one or more embodiments of the present invention. Subsection 9 of the specification further discloses materials providing specific instructions for modeling the three-dimensional fluid flow. The invention is also applicable to two-dimensional and multi-dimensional particle motions.

Embodiments of the present invention will now be described with accompanying drawings.

1. The Principles of the Invention

FIG. 1 is a general flowchart of the method steps embodying the principles of the method. In an unsteady state condition of the model gas flow, the method includes the steps of:

approximating fluid flow as model gas flow (S101);

specifying the geometry model (S102);

defining a net rate of property influx per unit volume from the model gas system in a general point of a plurality of non-moving points in space occupied by the model gas at a given time, which is formed by way of a plurality of converging ballistic particles, each of the plurality of converging ballistic particles is selected from the plurality of particles of the model gas system by a converging ballistic trajectory having the ending point in the general point of the plurality of non-moving points in space at the given time (S103);

defining a net rate of property efflux per unit volume from the general point of the plurality of non-moving points at the given time, which is formed by way of a plurality of diverging ballistic particles, each of the plurality is selected from the plurality of particles of the model gas system by a diverging ballistic trajectory having the starting point in the general point of the plurality of non-moving points at the given time (S104);

defining a temporal rate of property change per unit volume in the general point of the plurality of non-moving points at the given time (S105);

forming an integral property balance equation for each of one or more properties being transported by the plurality of particles in each of the plurality of non-moving points (S106);

computing the flow of the model gas (S107), where computing the flow of the model gas includes resolving a system of one or more of integral property balance equations in each of the plurality of non-moving points at the given time.

The step S101 of approximating fluid flow includes approximating fluid flow in a fluid system as a model gas flow in a model gas system being identical to the fluid system, where the model gas facilitates a distant transport of one or more of properties including one or more of mass, momentum, and energy, which is implemented by way of a plurality of particles being in a constant state of mostly random motion and interaction by collisions, where each of the plurality of particles of the model gas is assigned to travel with a probability between any of two points of a plurality of points in space occupied by the model gas by following a ballistic trajectory governed by a law of motion, the ballistic trajectory having a starting point in one of a plurality of points of original collisions and an ending point in one of a plurality of points of ending collisions, and where each of the plurality of particles is adapted to transport a combination of one or more of properties including one or more of mass, momentum, and energy between one of the plurality of points of original collisions and one of the plurality of points of ending collisions.

The method for modeling transport processes in fluids where the approximating further includes:

treating each point of the plurality of points in space occupied by the model gas as a point of collisions for each of the plurality of particles having the ballistic trajectory having the ending point in one of the plurality of points at the same time;

treating each of a plurality of the points of collisions as either a point source for each of a plurality of diverging ballistic particles or a point sink for each of a plurality of converging particles; and treating each of the plurality of particles moving from the point source to the point sink as a property carrier created in the point source at time of original collision by obtaining one or more of properties of specific values being intrinsic to the model gas surrounding the point source, and ended in the point sink at time of ending collision by transferring one or more of properties of specific values in the point sink, where value of property delivered in the point sink by each of the plurality of converging ballistic particles or value of property taken away from the point source by each of the plurality of diverging ballistic particles is evaluated regarding whether value of the property is conserved or changed because of aging and whether value of property carried by each of the plurality of particles is modified because of interaction with an external field, and where the velocity of each of a plurality of point sources is assigned to be equal to the mass flow velocity of the model gas in each of a plurality of corresponding points of original collisions at time of the original collision.

The method where the approximating further includes:

treating each of a plurality of collisions on a gas-solid interface of the model gas system, which has resulted in diffuse particle scattering from the gas-solid interface, as an act of interaction involving a property transfer from the gas-solid interface to a scattered particle; and treating each of a plurality of points of diffuse particle scattering on the gas-solid interface as a heterogeneous point source for each of a plurality of scattered particles, where the gas-solid interface reveals mixed diffuse and specular particle scatterings, where the velocity of each of a plurality of heterogeneous point sources on the gas-solid interface is assigned to be equal to the velocity of the gas-solid interface in each of a plurality of corresponding points of diffuse particle scattering at time of diffuse particle scattering, and where point source strength of each of the plurality of heterogeneous point sources on the gas-solid interface is assigned to be directly proportional to a property accommodation coefficient in each of the plurality of corresponding points of diffuse particle scattering at time of diffuse particle scattering, the property accommodation coefficient which is probability, for an incident particle, to accommodate one or more of properties intrinsic to the gas-solid interface and to scatter back in the model gas as a diffuse particle, the property accommodation coefficient being in a range from zero to one.

Figure 2:
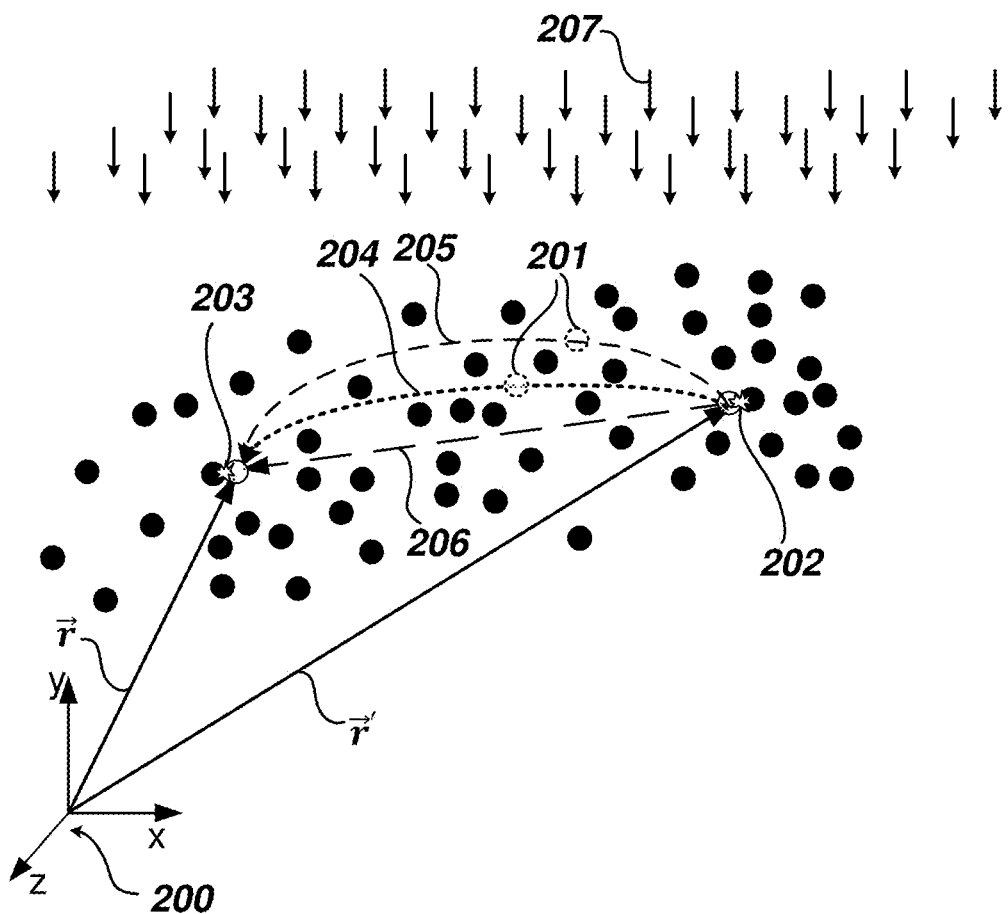
FIG. 2 illustrates ballistic traveling of a particle between two consecutive collisions in a fluid system composed of the model gas particles.

FIG. 2 illustrates ballistic traveling of the particle between two consecutive collisions in a fluid system composed of the model gas particles. In the example of FIG. 2, a schematic diagram of the model gas system composed of identical randomly moving particles B and positioned in the observer's Cartesian coordinate system 200 is shown. For clarity, the schematic presents a three-dimensional (3D) configuration. Note that in the specification and accompanying figures, the observer's coordinate system is designated by index "200." To locate the position of the event, the observer needs only to read the space coordinates at the location of an event. The clocks at any location within a system are synchronized. The observer, therefore, allocates space coordinates and time by recording both the space coordinates and time at the clock nearest the event position. In the example of FIG. 2, for clarity with no limitation of the invention, the observer's Cartesian coordinate system 200 is oriented so y-axis is along the negative direction of an applied field of external force 207 which provides, for each of a plurality of particles, an acceleration $\vec{g}$.

In the specification, claims, and figures herein, the acceleration is symbolized as $\vec{g}$ in a three-dimensional configuration and as g in one-dimensional configuration. Each of the plurality of particles (shown as black disks), particularly a particle 201 (shown as transparent disks), travels in space between its two consecutive collisions: an original collision, 202, and an ending collision, 203, by following a trajectory 204 or 205 governed by an appropriate law of motion such as Newton's laws of motion. In a lack of external force, all ballistic trajectories between consecutive collisions will be just straight lines, respectively, as indicated by a trajectory 206.

Specifically, referring to FIG. 2, particle 201 obtains a set of properties of specific values in a point source 202 at time of the original collision, the set of properties including a set of one property of value, $\Psi$, which includes but not limited to a scalar property of value $\Psi$ or a vector property value $\vec{\Psi}$ (3D), which is intrinsic to the model gas near point source 202 at the time of the collision, $t'_i$.

In point source 202 moving with velocity being equal to the mass flow velocity $\vec{u}(t'_i, \vec{r}')$ of the model gas in $\vec{r}'$ at time $t'_i$, each of the plurality of particles having an original collision in the point source obtains, as a properties carrier, a specific magnitude of thermal velocity, $v_T(t'_i, \vec{r}')$, and one or more of model gas properties being intrinsic to the model gas surrounding the point of the original collision at a time of the original collision and may move in an arbitrary direction relatively to the point source. Each of the property carriers converging in point sink 203 transfers in the point of the ending collision one or more of a set of properties, which in some embodiments includes just one property $\Psi_{in}$, carried by each of the plurality of particles at the time of the ending collision.

Next, the step S102 of specifying the geometry model, for example, further includes steps of:

establishing geometry and boundary conditions, where geometry and boundary conditions are established during a period from a pre-initial time until the given time; and establishing a dynamic history of the model gas, where the dynamic history of the model gas, which is in one or more of instant distribution patterns of the model gas properties within the model gas system at a set of different sequential moments in time, is established during a pre-initial period from the pre-initial time until the initial time, and where the pre-initial period is set to be not less than a reliable period before the initial time.

Some have recognized that to model the model gas flow at the given time, t, which is greater than or equal to initial time, $t_0$, setting of initial flow conditions is needed. This, for example, is done by establishment of the model gas system geometry and model gas flow characteristics during some period of time advancing the initial time. The initial time, $t_0$, is associated with the time of a specific modification of the model gas system in a specific location, which, for example, includes changing of the temperature or/and velocity of a gas-solid interface, and/or application of an external field that modifies a property content. It has been also recognized that the specific modification of the model gas system in the specific location can be sensed in a remote point in space at a delayed time, which depends of the nature of a transporting carrier. Specifically, modification of the model gas system in the specific location, for example on a gas-solid interface, will be delivered in the distant point in space by diffuse ballistic particles and will initiate modification of property in the distant point a local initial time according to Equation (1)

$$t_{i0} = t_0 + \varphi'_{ar}, \quad (1)$$

where $\varphi'_{ar}$ is a traveling time along the ballistic trajectory having a starting point in one of a plurality of points of original collisions and an ending point in one of a plurality of points of ending collisions.

The model gas system geometry, for example, is specified by identifying both boundaries, which includes the gas-solid interfaces defining boundary conditions and being characterized by specific properties such as surface temperature distributions and/or dynamics of geometry modification, and an available set of external fields of certain spatial configurations and certain known dynamics of modification, which are being a part of the geometry and are prone to affect the properties carried by each particle during its free path traveling.

The step of establishing geometry and boundary conditions in some embodiments is utilized:

in the model gas system with no gas-solid interfaces, by providing predefined dynamics of modification of an available set of external fields during the period from a pre-initial time until the given time;

in the model gas system bounded by gas-solid interfaces showing either purely diffuse or mixed diffuse and specular particles scattering, by providing predefined dynamics of modification of both an available set of external fields and boundary conditions on gas-solid interfaces; and in the model gas system having an open-channel geometry providing model gas flow passage through a channel having an inlet opening and an outlet opening, by providing additional boundary conditions associated with an effect of surrounding (model gas pressure gradient, temperature gradient).

The step of establishing a dynamic history of the model gas system includes, for example, defining dynamics of the transported property modification during particle's ballistic traveling and defining the dynamic history of model gas properties modifications during the model gas system evolution.

We have recognized that if the property, $\Psi_0$, acquired by the particle at the moment of original collision, $t'_i$, or property, $\Psi_{ob}$, acquired by the particle at the moment of original diffuse scattering from the gas-solid interface, $t'_{ib}$, may be vulnerable to some internal aging process during particle's ballistic traveling, then the value of the property upon arriving in point y at the given time t is changed. Internal radioactive decay, in which an unstable atomic nucleus is transformed into a lighter nucleus accompanied by the emission of particles or radiation, is an example of internal aging process. The mass of the particle is decreased during a ballistic traveling time.

By the invention, for the particle having initial property $\Psi_0$, the property at time t is calculated from Equation (2) given below:

$$\Psi_\lambda = \Psi_0 e^{-\lambda \varphi i}, \quad (2)$$

where $\Psi_0$ is a starting function characterizing property value carried by each of the plurality of particles in the starting point of the ballistic trajectory at a starting time, $\Psi_\lambda$ is an age function characterizing property value in the ending point of the ballistic trajectory, $\lambda$ is an aging coefficient, which is in the range from negative to positive values including zero value, $\varphi_i$ is a gas-gas ballistic traveling time defined as follows $$\varphi_i = t - t'_i. \quad (3)$$

A particle incident on the gas-solid interface is scattered back according to either a diffuse, or a specular, or a mixed diffuse-specular model. A gas-solid interface revealing particle scattering according to the mixed diffuse-specular model is characterized by a property accommodation coefficient, $\sigma$, which is treated as the probability of an incident particle to be "absorbed" into the surface with further its accommodation on the gas-solid interface by obtaining one or more of properties of specific values being intrinsic to a point of the incidence followed by "evaporation" back and carrying the obtained properties.

For the particle having initial property, $\Psi_{0b}$, the property, $\Psi_{\lambda b}$, at time t is calculated from Equation (4) given below:

$$\Psi_{\lambda b} = \Psi_{0b} e^{-\lambda \varphi ib}. \quad (4)$$

where $\varphi_{ib}$ is solid-gas ballistic traveling time defined as follows $$\varphi_{ib} = t - t'_{ib} \quad (5)$$

Notoriously, when $\lambda=0$ then the property is conserved during the ballistic traveling time. It is to be understood the limitation that $\lambda$ is constant in the equation above is made without departing from the scope of the claimed subject matter, and those skilled in the art may calculate the property, $\Psi_\lambda$ or $\Psi_{\lambda,b}$, by using time dependent decay or growth coefficient with no difficulty.

We have also recognized that the acceleration field g modifies the velocity of each particle during ballistic traveling. For clarity and with no limitation of the scope of the invention, acceleration, g, is chosen to be a constant within the fluid system. Additional value of the property $\Psi_g(t'_i, t, g)$, in the velocity modification, $v_g$, during the ballistic traveling time, $\varphi_i$, for example, is calculated from Equation (6) given below:

$$\Psi_g(t'_i,t,g) \equiv v_g = g(t-t'_i) \quad (6)$$

An example of externally coupled force, which acts on gas particles directly through the field during particle's ballistic traveling and comes with particle displacement in the direction of the force, is a gravitation force or electrostatic force if the particles are charged.

Under the invention, the property delivered in the point sink at time t or the property, $\Psi_{in}(t'_i, y', t, y)$, carried by each particle at the moment of the convergence in the point sink positioned in general non-moving point y at the given time t, includes both an acquired property, which is obtained by each particle in the point of the original collision in the model gas at time $t'_i$, $\Psi_0(t'_i, y')$, which, in some cases can be a subject to decay or growth during the ballistic traveling time, and the generated property, which is accumulated or lost by each particle during its ballistic traveling time, $\Psi_g(t'_i, t, g)$ is the property, which is accumulated or lost during the ballistic traveling time because of interaction with an external field such as acceleration, g. For clarity, in this embodiment, $\Psi_g(t'_i, t, g)$ is a well-defined function having arguments associated with traveling time $\varphi_i$ and with external well defined field including acceleration, g.

Symbolically, if the preceding collision is within the model gas space, the discussed above is expressed:

$$\Psi_{in}(t'_i,y',t,y) = \Psi_\lambda(t'_i,y',\lambda,\varphi_i) + \Psi_g(t'_i,t,g) \quad (7)$$

where $\Psi_g$ is a field function characterizing property value of known measure, which is changed during traveling time, $\varphi_i$, because of interaction with an external field including modification of momentum in a gravitation field $\Psi_\lambda$ is an age function characterizing property value in an ending point of the ballistic trajectory, which is defined by Equation 2). Analogously, under the invention, the property $\Psi_{b\_in}(t'_i, y', t, y)$ carried by each particle at the moment of the convergence in a point sink positioned in a general non-moving point y at the given time t, includes both the acquired property, which is obtained by each particle in point $y_b$ of its preceding diffuse scattering from the gas-solid interface at time $t'_{ib}$, $\Psi_{0b}(t'_{ib}, y_b)$, which, in some cases, can be a subject to decay or growth during the ballistic traveling time, and the generated property, which is accumulated or lost by each particle during its ballistic traveling time, $\Psi_g(t'_{ib}, t,g)$:

$$\Psi_{b\_in}(t'_{ib},y_b,t,y) = \Psi_{\lambda,b}(t'_{ib},y_b,\lambda,\varphi_i) + \Psi_g(t'_{ib},t,g) \quad (8)$$

In Equation (8), $\Psi_{\lambda,b}$ is defined by Equation (4). In this embodiment, the generated on the gas-solid interface property $\Psi_{0b}(t'_{ib}, y_b)$ is a well-defined function if the mentioned gas-solid interface is a part of the external surface bounding the system. The model gas flow is characterized microscopically by the group of particles of mass, m, having the number density of particles in the model gas, n, which are randomly moving and interacting by collisions and having the magnitude of the random component of velocity or thermal velocity, $v_T$, and the particle's effective collision cross-section, $\sigma_c$. In addition, near any point of space occupied by the model gas, this group of particles is characterized by the vector of mass flow velocity, u.

By the invention, each of the model gas properties, $\Psi_0(t_i, y'')$ in each of the plurality of points in space of the model gas system, is treated depending on the time of inquiry or the event time either as property, $\Psi_{0-}(t_i, y'')$, when event time, $t_i$, is advanced to a local initial time, $t_{i0}$, namely, $t_i < t_{i0}$, which is specified by establishing a spatial distribution of each of the model gas properties before the local initial time $t_{i0}$, or as property, $\Psi(t_i, y'')$, when the event time is greater than or equal to local initial time $t_{i0}$, namely, $t_i \geq t_{i0}$, which generally has an unknown spatial distribution of the property greater than or equal to initial time $t_{i0}$ and is the subject of determination. Using an Iverson bracket, the discussed above is expressed as:

$$\Psi_0(t_i,y'') = \Psi_{0-}(t_i,y'')[t_i<t_{i0}] + \Psi(t_i,y'')[t_i \geq t_{i0}], \quad (9)$$

where each of the expressions enclosed in the bracket is the Iverson bracket, which converts a statement inside the bracket into a number that is one if the statement is satisfied, and is zero otherwise, $\Psi_{0-}$ is a pre-established property value in each of the plurality of points in space of a model gas system at the starting time ahead of the local initial time, and $\Psi$ is a present property value in each of the plurality of points in space of a model gas system at the starting time greater than or equal to the local initial time.

2. Defining a Net Rate of Total Property Influx Formed by Converging Ballistic Particles from the Model Gas In this specification, claims, and figures, a plain symbol is used for notating a scalar value and a symbol having a rightwards arrow above is used for notating a vector value in the three-dimensional configuration. In addition, by convention in this patent application and to simplify the notations, the terms relating to the vectors in one-dimensional configuration, which will appear later, are represented by the corresponding usual letters. Still, for more clarity, each of the vector terms in one-dimensional configuration will be specifically denoted as a vector in the tables afterward in the column "Short description" or in the specification or the claims. Various terms used in the equations are listed in Table 1.

TABLE 1

| Symbol | Short description |
|---|---|
| $\frac{\partial}{\partial y}$ | the divergence operator in a one-dimensional configuration |
| $B_{in}^{\Psi\lambda\_F}$ | the net rate of property influx per unit volume from the surrounding model gas |
| t | the given time |
| $t'_i$ | the time of the original collision |
| y | position of the ending point of each of a plurality of converging ballistic particles |
| y' | is position of the starting point of one of the plurality of converging ballistic trajectories |
| $v_T(t'_i, y')$ | average magnitude of thermal velocity in the starting point at the time of original collision |
| $Z_T(t'_i, y')$ | rate of collisions per unit volume in the starting point at time of original collision |

TABLE 1-continued

| Symbol | Short description |
|---|---|
| v(t$_i$', y',t, y) | a velocity vector in the ending point at the given time, |
| Q$_i$(t, t$_i$') | probability of traveling along the ballistic trajectory |
| Ψ$_{in}$(t$_i$', y', t, y | a property value delivered in the ending point at the given time by one the first plurality of converging ballistic particles |
| yb1 | a lower limit of integration over the volume of space occupied by the model gas |
| yb2 | an upper limit of integration over the volume of space occupied by the model gas. |

Figure 1A:
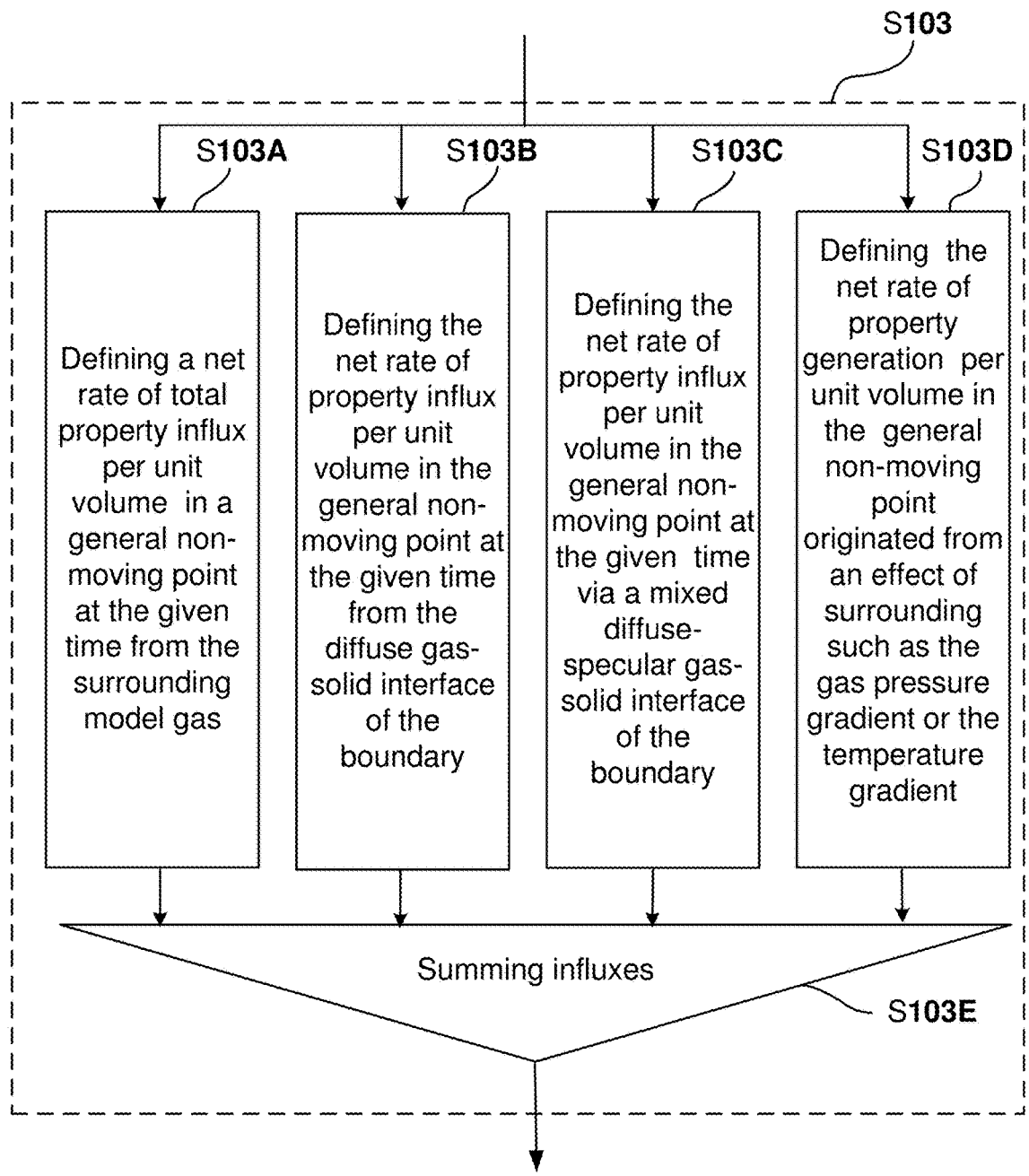
FIG. 1A is a block diagram of an alternative approach employed to define different components of net rate of property influx from the model gas system in a general non-moving point.

FIG. 1A is a block diagram employed to define different components of net rate of property influx from the model gas system in a general non-moving point.

The step S103 of defining the net rate of property influx per unit volume from the model gas system further includes a step of defining a net rate of total property influx per unit volume from a surrounding model gas (S103A), where the net rate of total property influx per unit volume is formed by way of a first plurality of converging ballistic particles, each of the first plurality of converging ballistic particles is selected from the plurality of converging ballistic particles by the ballistic trajectory having the starting point in one of a plurality of points of original collisions within space occupied by the model gas, and where each of the plurality of points of original collisions is treated as a point source.

By the invention, each particle traveling from the point of an original collision within the space occupied by the model gas to a destination point at the given time, t, is treated as property carrier delivering in this point some property obtained in the location and time of the original collision. Again, during the ballistic traveling time, the carried by the particle property may, however, be vulnerable to some internal aging process and be changed because of interaction with the external field.

It is recognized and is explained afterward that there exists a combination of a specific direction of an initial instant vector of thermal velocity $v_T(t'_i, y')$ and a vector of mass flow velocity $u(t'_i, y')$, which provides an opportunity for each of the selected particles to arrive in a given non-moving point at a given time. These particles, which are from original collisions within the entire model gas system, form a converging flux in the given non-moving point of the space occupied by the model gas at the given time.

In these embodiments, for certainty, the magnitude of thermal velocity is chosen to be higher than the magnitude of mass flow velocity, namely, $v_T > |u|$. This limitation is made without departing from the scope of the claimed subject matter.

Figure 3:
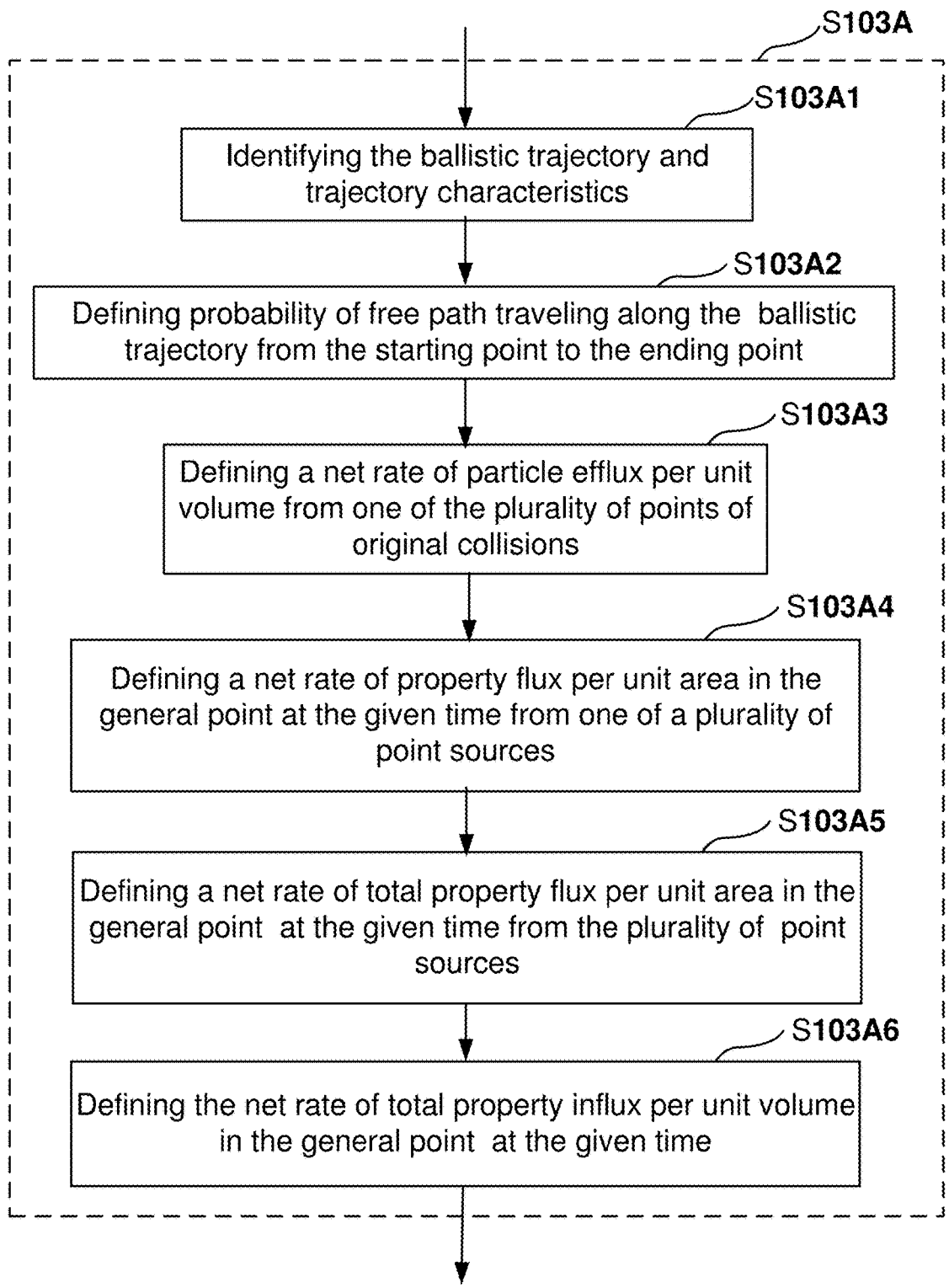
FIG. 3 is a block diagram of an alternative approach employed to define major steps needed to calculate the net rate of property influx from the model gas in the general non-moving point at the given time.

FIG. 3 is a block diagram of an alternative approach employed to define major steps of step S103A needed to calculate the net rate of property influx from the model gas in the general non-moving point y at the given time t.

The step S103A of defining the net rate of total property influx per unit volume from the surrounding model gas includes steps of:

identifying, for each of the first plurality of converging ballistic particles, the ballistic trajectory (S103A1);

defining the probability of traveling along the ballistic trajectory (S103A2);

defining a net rate of particle efflux per unit volume from one of the plurality of points of original collisions at the time of the original collision (S103A3), where the ballistic trajectory identifies the time of the original collision for each of the plurality of converging ballistic particles, and where the velocity of the point source for each of the first plurality of converging ballistic particles is assigned to be equal to the mass flow velocity of the model gas in a corresponding point of original collisions at time of the original collision;

defining a net rate of property flux per unit area in the general point at the given time from one of a plurality of point sources (S103A4);

defining a net rate of total property flux per unit area in the general point at the given time from the plurality of point sources (S103A5); and defining the net rate of total property influx per unit volume in the general point at the given time by applying divergence operator to the net rate of total property flux (S103A6).

The step of identifying the converging ballistic trajectory includes:

determining one or more of characteristics of the converging ballistic trajectory including the time of the original collision, an appropriate instant unit vector defining the ballistic trajectory in starting point, and a velocity vector in the ending point of the ballistic trajectory at the given time; and defining a size of an expansion zone.

Figure 4:
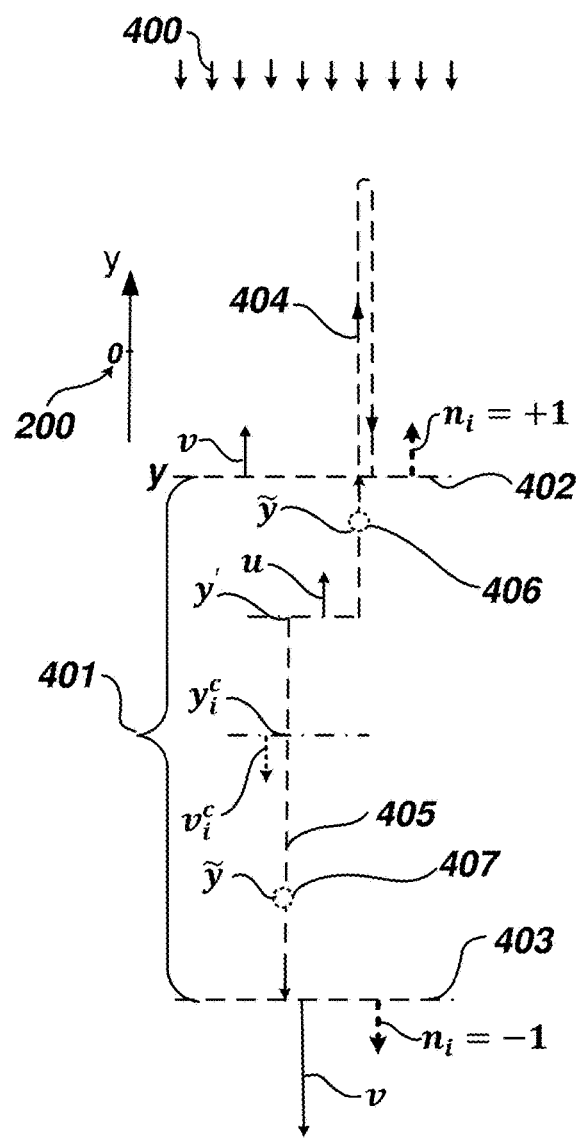
FIG. 4 is a schematic view of a one-dimensional configuration for explaining the ballistic movement of the particle in a field of the external force.

FIG. 4 is an example of a schematic view of a one-dimensional configuration for explaining a ballistic movement of the particle in a field of the external force. In the example of FIG. 4, the observer's Cartesian coordinate system 200 is oriented with y-axis directed along the negative direction of applied acceleration field, 400. FIG. 4 shows a particle 406 having a collision in the event point y''=y' at the event time $t_i = t'_i$, which resulted in acquiring by the particle thermal velocity, $v_T(t'_i, y')$ and mass flow velocity vector $u(t'_i, y')$, which are intrinsic to the nearby volume of the model gas surrounding point y' at time $t'_i$.

In one embodiment, the step of identifying a trajectory of a ballistic movement of the particle that converges in the general non-moving point y at the given time t includes a step of formulating position vector $\tilde{y}$ of particle 406 on trajectory 404 or particle 407 on trajectory 405 and velocity vector $\tilde{v}$ (not shown) at time $\tilde{t}$ by applying Equations (10) and (11), respectively, given below:

$$\tilde{y}=y(\tilde{t})=y'+[v_T(t'_i,y')n_i+u(t'_i,y')](\tilde{t}-t'_i)+\tfrac{1}{2}g(\tilde{t}-t'_i)^2 \qquad (10)$$

and $$\tilde{v}=v(\tilde{t})=v_T(t'_i,y')n_i+u(t'_i,y')+g(\tilde{t}-t'_i). \qquad (11)$$

where $t \geq \tilde{t} \geq t'_i$. In the equations above, $n_i = \pm 1$ is a unit vector of arbitrary direction.

The step of determining the time of the original collision, $t'_i$, in point y' for each of the ballistic traveling particles includes a step of resolving the equation of motion, Equation (12) given below, with respect to the ballistic traveling time, $\varphi_i$:

$$\tfrac{1}{2}g\varphi_i^2+[v_T(t'_i,y')n_i+u(t'_i,y')]\varphi_i+y'-y=0, \qquad (12)$$

which is obtained by assigning $\tilde{t}=t$ and substitution $\varphi_i = t - t'_i$ in Equation (10) and rearrangement of the terms.

The step of defining an appropriate instant unit vector directing thermal velocity component of each particle in point y' at time $t'_i$ includes steps of:

presenting Equation (12) in the following form:

$$\varphi_i v_T n_i = y - y_i^c, \quad (13)$$

where $$y_i^c = y' + \varphi_i u(t'_i, y') + \tfrac{1}{2} g (\varphi_i)^2; \quad (14)$$

deriving $n_i$ from Equation (13), which is given as $$n_i = \frac{y - y_i^c}{|y - y_i^c|}, \quad (15)$$

where referring to FIG. 4, $n_i$ is interpreted as a unit exterior facing outside of control volume or an expansion zone 401 having a point of origin $y_i^c$ at time t. In this, vector $y_i^c$ is interpreted as a position vector of the center of the expansion zone at time t or the position of a particle having zero magnitude of thermal velocity in point y' at time $t'_i$, which is observed at time t.

The step of defining the velocity of each particle reaching the general non-moving pointy at the given time t includes a step of applying Equation (16) given below:

$$v(t,y) = v_T(t'_i, y') n_i + u(t'_i, y') + g\varphi_i. \quad (16)$$

which is obtained by assigning $\tilde{t} = t$ and substitution of $$\varphi_i = t - t'_i \quad (17)$$

in Equation (11) given above and rearrangement of the terms.

The step of defining the size of the expansion zone includes a step of executing multiplication of Equation (13) on itself resulted and averaging as:

$$\varphi_i^2 v_T^2 = (y - y_i^c)^2. \quad (18)$$

where the size or half width of the expansion zone 401 at time t is computed as follows $$Y_i^{exp} = v_T(t'_i, y')\varphi_i = |y - y_i^c| \quad (19)$$

and the velocity of the center of the expansion zone, $v_i^c$, 401 is computed as $$v_i^c = u(t'_i, y') + g\varphi_i. \quad (20)$$

The step of formulating the probability of ballistic traveling along the ballistic trajectory includes steps of:
defining the average magnitude of the relative velocity or the velocity of the traveling particle with respect to nearby passed particles at a particular point of a trajectory; and
representing the probability of traveling along the ballistic trajectory from the starting point to the ending point in one-dimensional configuration by following Equation (21) given below:

$$Q_i(t,t'_i) = \exp(-\int_{t_i}^{t} P_c(\tilde{y}(\tilde{t})) v_{rel}(\tilde{y}(\tilde{t})) d\tilde{t}), \quad (21)$$

where $\tilde{t}$ is a parametric time $t'_i \leq \tilde{t} \leq t$, $\tilde{y}(\tilde{t})$ is a trajectory point of the ballistic trajectory at the parametric time $\tilde{t}$, $v_{rel}(\tilde{y}(\tilde{t}))$ is an average magnitude of relative velocity in the trajectory point, and $P_c(\tilde{y}(\tilde{t}))$ is average number collisions per unit length in the trajectory point, and
where Equation (21) is obtained by defining $Q(\tilde{t}+d\tilde{t})$ and $Q(\tilde{t})$ as probabilities that a given particle traveling along the ballistic trajectory has survived at times $\tilde{t}+d\tilde{t}$ and $\tilde{t}$, respectively;
defining $\tilde{y}(\tilde{t})$ as the position of the converging ballistic particle along the ballistic trajectory designated at time $\tilde{t}$, and $t'_i$ is the time of the original collision, representing $P_c(y(\tilde{t}, t'_i))$ by Equation (22) given below:

$$P_c(\tilde{y}(\tilde{t})) = \sigma_c n(\tilde{y}(\tilde{t})), \quad (22)$$

where $\sigma_c$ is the cross-section of collisions and $n(\tilde{y}(\tilde{t}))$ is particle density in point $\tilde{y}(\tilde{t})$ of the converging ballistic trajectory at time $\tilde{t}$;
defining $v_{rel}$ as an average magnitude of the velocity of the traveling particle with respect to a nearby passed particle along the ballistic trajectory of the traveling particle in a particular point of the trajectory at the designated time $\tilde{t}$;
establishing the following quantity:

$$Q(\tilde{t}+d\tilde{t}) = Q(\tilde{t})[1 - P_c(y(\tilde{t})) v_{rel}(y(\tilde{t})) d\tilde{t}], \quad (23)$$

solving a differential based Equation (23) given above and applying limits for integration from $t'_i$ to t.

Figure 5:
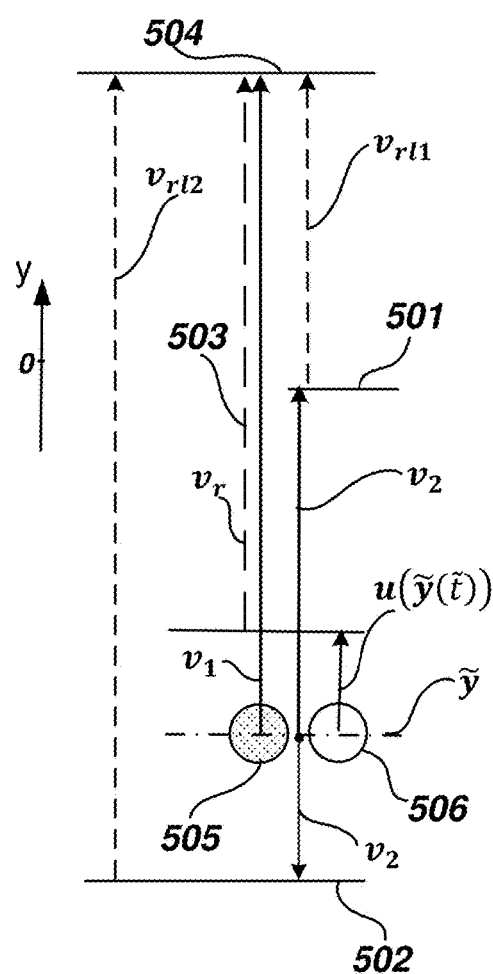
FIG. 5 is a schematic view for explaining a method for determining the average magnitude of the instant velocity of the traveling particle with respect to a nearby passed particle along a ballistic trajectory of the traveling particle in one-dimensional configuration.

FIG. 5 is a schematic view for explaining a method for determining the average magnitude of the instant velocity of the traveling particle with respect to a nearby passed particle along the ballistic trajectory of the traveling particle in one-dimensional configuration.

The embodiments of this and the following sub-sections dealing with the average magnitude of the relative velocity or the velocity of the traveling particle with respect to nearby passed particles are explained where traveling particles are non-relativistic. The present invention, however, is not limited to the case but can be generalized to the transport processes involving relativistic particles, as would be apparent to one skilled in the art.

The step of defining the average magnitude of relative velocity or average velocity of a traveling particle 505 with respect to one of nearby passed particles 506 at a particular point of the trajectory $\tilde{y}$ at specified time $\tilde{t}$ is calculated by steps of:
defining an instant magnitude of the velocity of one of the plurality of converging ballistic particles in the trajectory point with respect to one of a plurality of nearby passed particles in the trajectory point, which includes:
defining in a rest frame the instant velocity vector of the traveling particle 505 in a particular point of the trajectory $y(\tilde{t})$ at specified time $\tilde{t}$, $v_1$, by Equation (24) given below:

$$v_1 = v_T(t'_i, y') n_1 + u(t'_i, y') + g(\tilde{t} - t'_i), \quad (24)$$

where $n_1$ is a unit vector of a specific direction having the point of origin y';
specifying instant vector-velocity in the rest frame, $v_2(\tilde{t}, \tilde{y})$, of the nearby particle 506 being passed by the traveling particle 505 at the same time $\tilde{t}$ by Equation (25) given below:

$$v_2 = n_i v_T(\tilde{y}(\tilde{t})) + u(\tilde{y}(\tilde{t})). \quad (25)$$

where $v_T(\tilde{y}(\tilde{t}))$ and $u(\tilde{y}(\tilde{t}))$ are a thermal and a mass flow velocity in the rest frame of the model gas in point $\tilde{y}$ at time $\tilde{t}$, which are acquired by the nearby particle 506, and $n_i$ is defined as a unit vector of an arbitrary direction having the point of origin in point $\tilde{y}$, at time $\tilde{t}$;
forming an instant vector of relative velocity, $v_{rl}$, which is represented in the example of FIG. 5 as $v_{rl1}$ or $v_{rl2}$ by connecting the end of the instant vector-velocity, $v_2(\tilde{t}, \tilde{y})$, positioned in point 501 or 502 and the end of the vector-velocity $v_1(t'_i, y', \tilde{t})$ positioned in point 504, which is formulated by Equation (26) given below:

$$v_{rl}(\tilde{t}, \tilde{y}) = v_1(t'_i, y', \tilde{t}) - v_2(\tilde{y}(\tilde{t})), \quad (26)$$

where $$v_r = v_1(t'_i, y', \tilde{t}) - u(\tilde{y}(\tilde{t})) \quad (27)$$

is the vector-velocity $v_r$ shown in FIG. 5 as 503;
defining the magnitude of the instant relative velocity between the traveling particle 505 and the nearby particle

506 by executing the square root of the scalar product of the velocity vector of Equation (26) with itself, which is expressed in formula form by Equation (28) given below:

$$|v_{rl}|=\sqrt{v_{rl}v_{rl}}=\sqrt{v_r^2+[v_T(\tilde{y}(\tilde{t}))]^2-2v_rv_T(\tilde{y}(\tilde{t}))n_i}, \quad (28)$$

where $n_i$ is a unit vector of an arbitrary direction, namely, it accepts value +1 or −1, and where, in the example of FIG. 5, $|v_{rl}|$ is represented by $v_{rl1}$ and $v_{rl2}$; and calculating the average magnitude of a relative velocity of the particle traveling along the ballistic trajectory over all possible directions of the random instant relative velocity vector component of a passed nearby particle by applying Equation (29) given below:

$$v_{rel} = \frac{|v_r - v_T| + |v_r + v_T|}{2}, \quad (29)$$

which is obtained by averaging the instant magnitudes of two components of a relative velocity between the particles as of Equation (28) since $n_i$ accepts either value +1 or −1.

In most realistic situations, the magnitude of a mass flow velocity component of either traveling particle 505 or the magnitude of a mass flow velocity component of nearby passed particle 506 particle is insignificant in comparison with the magnitude of the thermal velocity of either particle 505 or particle 506.

In a one-dimensional configuration, for example, an approximated average magnitude of the relative velocity of the traveling particle at a particular point of a trajectory, $\tilde{y}$, at time, $\tilde{t}$, is calculated from Equation (30) given below, which is obtained by substitution of $|v_r| \cong v_T(t'_i, y')$ in Equation (29):

$$v_{rel}(\tilde{y}(\tilde{t})) = \frac{|v_T(t'_i, y') - v_T(\tilde{y}(\tilde{t}))| + (v_T(t'_i, y') + v_T(\tilde{y}(\tilde{t})))}{2}, \quad (30)$$

where $v_{rel}(\tilde{y}(\tilde{t}))$ is the average magnitude of relative velocity in the trajectory point, $v_T(t'_i, y')$ is the average magnitude of thermal velocity component in the starting point of the ballistic trajectory, and $v_T(\tilde{y}(\tilde{t}))$ is the average magnitude of thermal velocity component of one of the plurality of nearby passed particles in the trajectory point. We have also recognized that, usually, the magnitudes of the thermal velocity of nearby particles are approximately identical. Under the invention, in a one-dimensional configuration, the approximated average magnitude of a relative velocity between each particle moving in arbitrary directions, which is originated from the proximity to each other, is calculated from Equation (31) given below, which is obtained by substitution of $v_T(\tilde{t}, \tilde{y}) = v_T(t'_i, y')$ in Equation (30):

$$v_{rel}(t'_i, y') = v_T(t'_i, y'). \quad (31)$$

A method for determining particle and property fluxes by ballistic particles retreated from a remotely located auxiliary control volume in a field of external forces is further illustrated in FIG. 4. As explained before, the model gas is characterized by the particle density, n, each particle diverges from a point of the original collision and converges in a point of the ending consecutive collision. Under the invention, upon recognizing that each traveling particle is being in both diverging and converging conditions simultaneously, the particle density of diverging ballistic particles in the vicinity of point y' at time $t'_i$ is chosen to be n/2.

The step of defining the particle flux production rate, $Z_V$, or the net rate of particle efflux per unit volume from a point source positioned in a point of the original collisions and moving with the mass flow velocity of the model gas in that point includes, for example, a step of representing $Z_V$ by applying Equation (32) given below:

$$Z_V(t'_i, y') = \tfrac{1}{2} P_c(t'_i, y') v_{rel}(t'_i, y') n(t'_i, y'), \quad (32)$$

which is obtained by steps of:

defining the vector field of the particle flux, $J_y^N$, along each of the ballistic trajectories in a point of the space around the point of the original collision includes a step of representing $J_y^N$, by applying Equation (33) given below:

$$J_y^N = \tfrac{1}{2} n(t'_i, y') Q_i(t, t'_i) v(t'_i, y', t, y), \quad (33)$$

where v is defined by Equation (16), $Q_i$ is a survival probability defined by Equation (21), and $n(t'_i, y')$ is particle density at a specific point y' at time $t'_i$;

representing, in a coordinate system associated with point $y_i^c$ moving with velocity $v_i^c$, the vector field of the particle flux, $J_{CV}^N$, through the in a control surface 402 or 403 of FIG. 4 in the following form:

$$J_{CS}^N = \tfrac{1}{2} n(t'_i, y') Q_i(t, t'_i) [v(t'_i, y') - v_i^c] = \tfrac{1}{2} n(t'_i, y') Q_i(t, t'_i) v_T(t'_i, y') n_i; \quad (34)$$

and applying and executing $$\frac{\partial}{\partial y'}$$

operator to the one-dimensional vector field of Equation (34) followed by shrinking volume of the auxiliary control volume to infinitely small volume, which, in formula form, is expressed as:

$$Z_V(t'_i, y') = \left\{\frac{\partial}{\partial y'}[J_{CS}^N]\right\}_{y \to y'} = \frac{1}{2}\left\{\frac{\partial}{\partial y'}[n(t'_i, y')Q_i(t, t'_i)v_T(t'_i, y')n_i]\right\}_{y \to y'}. \quad (35)$$

The above is obtained by recognizing that auxiliary control volume 401 is confined by inflated control surface 402 and control surface 403 is isolated (see FIG. 4) therefore the total particle efflux through surface 402 and surface 403 at time t should be equal to the total particle efflux from the point at y' at time $t'_i$.

The step of formulating the net rate of the property flux originated from original collisions within entire space occupied by the model gas in a point sink positioned in a general non-moving point of the space occupied by the model gas at the given time includes steps of:

representing the property vector flux, $J_{y' \to y}^\Psi(t, y)$, originated from original collisions in point y' at time $t'_i$ and being sensed by a point sink positioned in a being at rest point y at the given time t by applying Equation (36) given below:

$$J_{y' \to y}^\Psi(t, y) = Q_i(t, t'_i) Z_V(t'_i, y') \frac{v(t'_i, y', t, y)}{2v_T(t'_i, y')} \Psi_{in}(t'_i, y', t, y) dy'; \quad (36)$$

and defining the rate of the property vector flux, $J_{FS \to y}^\Psi$, in point y at the given time t, which is originated from preceding collisions within entire space occupied by the model gas, includes applying Equation (37) given below, which is obtained by integrating Equation (36) over the volume of the model gas system:

$$J_{FS \to y}^{\Psi} = \frac{1}{2} \int_{y_{b2}}^{y_{b1}} Q_i(t, t_i') Z_V(t_i', y') \frac{v(t_i', y', t, y)}{v_T(t_i'y')} \Psi_{in}(t_i', y', t, y) dy', \quad (37)$$

where $\Psi_{in}$ ($t'_i$, y', t, y) is the property carried by each of the converging ballistic particles at the moment of the entering the model gas volume closely surrounding point y at the given time t.

Figure 6:
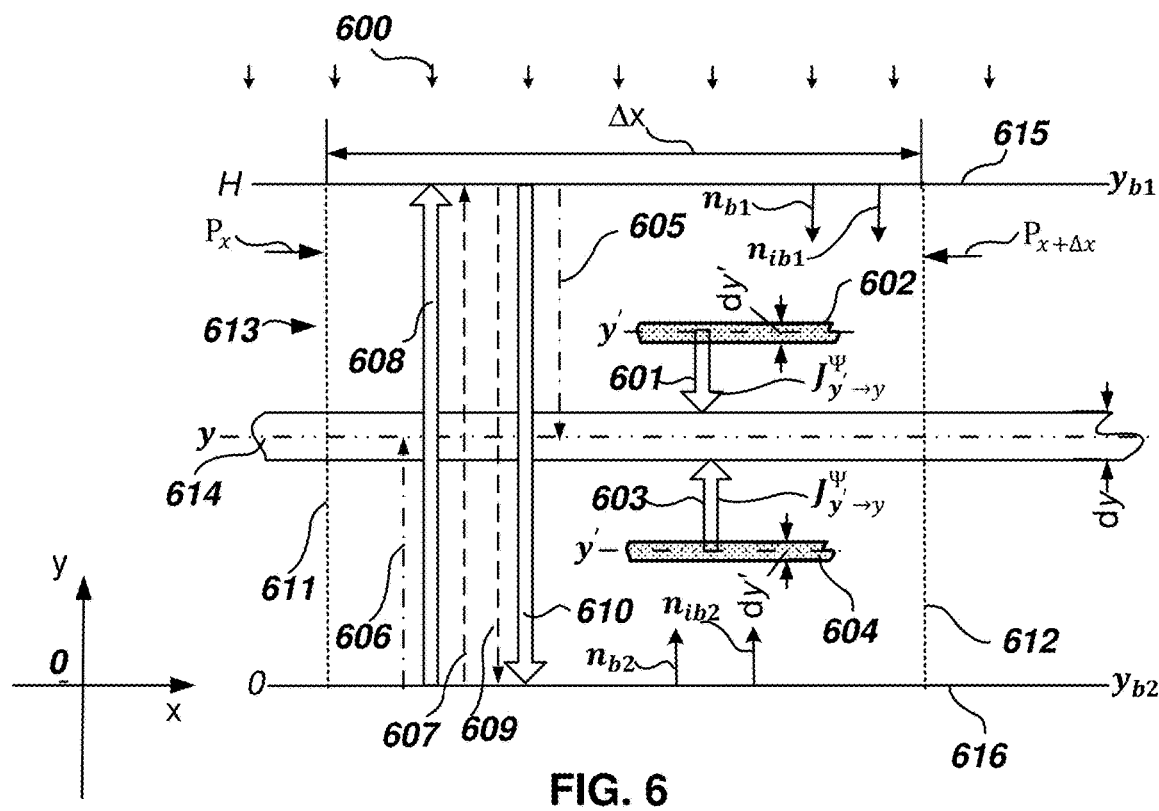
FIG. 6 is a schematic view of flow geometry and coordinate system showing model gas flow confined between two parallel plates.

FIG. 6 shows schematics of the model gas system having a uniform model gas flow along the x-direction, in which a main control volume 614 of volume $dV=\Delta x dy$ is at y within the model gas system confined by two parallel plates at $y_{b1}$ and $y_{b2}$. In the example of FIG. 6, the acceleration, 600, is directed in the negative to y-axis direction. The arrow 601 or 603 indicates schematically flux expressed by Equation (36) and associated with divergence of particles from an auxiliary control volume 602 or from an auxiliary control volume 604, respectively.

The step of defining the net rate of property influx per unit volume, $B_{in}^{\Psi_0\_F}$, formed by the flow of ballistic particles carrying property and converging from the space occupied by the model gas in the general non-moving point of the space occupied by the model gas at the given time further includes a step of representing $B_{in}^{\Psi_0\_F}$ by applying Equation (38) given below, which is obtained by executing $$\frac{\partial}{\partial y}$$

operator to the one-dimensional vector field of Equation (37):

$$B_{in}^{\Psi\_F}(y, t) = \quad (38)$$
$$-\frac{1}{2} \frac{\partial}{\partial y} \int_{y_{b2}}^{y_{b1}} Q_i(t, t_i') Z_V(t_i', y') \frac{v(t_i', y', t, y)}{v_T(t_i'y')} \Psi_{in}(t_i', y', t, y) dy'.$$

Figure 7:
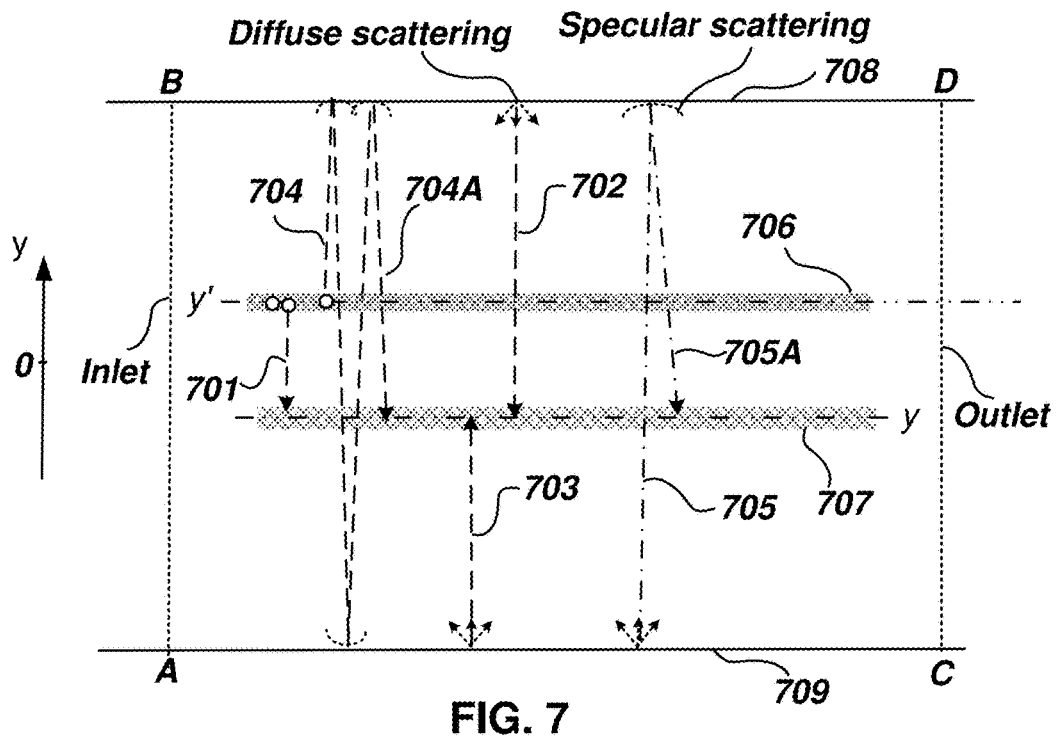
FIG. 7 is a schematic view of a model gas system confined between parallel plates, shown to illustrate a variety of ballistic trajectories of particles in the model gas system having gas-solid interfaces with mixed diffuse and specular components of particle scattering.

3. Defining a Net Rate of Property Influx Formed by Converging Ballistic Particles Originated from Gas-solid Interfaces FIG. 7 is a schematic view of the model gas system confined between parallel plates, shown to illustrate a variety of ballistic trajectories of particles in the model gas system having gas-solid interfaces with mixed diffuse and specular components of particle scattering. In the example of FIG. 7, the one-dimensional model gas system is confined between spaced a top plate 708 and a bottom plate 709. A channel formed by spaced plates has an inlet opening on the left side, shown in the schematic by line AB, and the outlet opening on the right side, shown by line CD. The schematics shows a variety of types of ballistic trajectories in a system with gas-solid interfaces revealing both diffuse and specular scattering components, which are arranged for illustration and do not intend to limit the invention. The first type, ballistic trajectory 701 shows a way for transporting property carried by the particle leaving an auxiliary control volume 706 in y' and coming directly in point y of a main control volume 707. The second type, ballistic trajectories 702 or 703 show ways for transporting property carried by particles leaving after diffuse scattering from plate 708 and plate 709, respectively, and coming directly in point y of the control volume. The third type, ballistic trajectory 704 with the final segment 704A shows a possible way for transporting a property carried by the particle leaving auxiliary control volume 706 toward plate 708, then is specularly scattered back into model gas toward plate 709 and may follow one or more of specular scatterings from gas-solid interfaces until it finally makes final ending collision in point y of main control volume 707. The fourth type, ballistic trajectory 705 and the final trajectory segment 705A shows a way for transporting a property carried by particles leaving by diffusive scattering plate 709 toward plate 708, then is specularly scattered back into model gas toward plate 709 and may follow one or more of specular scatterings from gas-solid interfaces until it finally makes final following collision in point y being within the main control volume. Specifically, according to the example of FIG. 7, determining total influx of property delivered into main control volume 707 by traveling particles includes integration of property intake according to 701, 702, 703, 704A and 705A ending segments of ballistic trajectories.

It is well known that since the solid surface is not ideal, it contains both diffuse and specular components of particle scattering. The diffuse scattering implies that each particle that hits a plate transfers its momentum/energy or other property completely to the plate and that all particles diffusively scattered from the plate leave it accepting streamwise velocity and temperature or other property of the plate. If particle collisions are specular, the incident on a plate property, which is carried by the particle such as energy, will be returned intirely into the model gas system.

By the invention, the diffuse reflection is characterized by the property accommodation coefficient $0<\sigma \leq 1$, and the specular reflection is characterized by $1-\sigma$. Each particle diffusively scattered from the plate I leaves it accepting one or more properties intrinsic to the gas-solid interface of the plate such as the thermal velocity.

For clarity, all gas-solid interfaces bounding the model gas flow are considered to have identical gas-solid interfaces, which are characterized by unchangeable property accommodation coefficient, $\sigma$. It is to be understood this limitation is made without departing from the scope of the claiming subject matter.

For diffuse scattering with no adsorption effects after colliding with the surface, the particle flux per unit time diffusively scattered back from the gas-solid interface into the model gas system equals to the particle flux per unit time incident on the surface of the boundary with a negative sign. Here we have also accepted that particles diffusively scattered back from the gas-solid interface will accommodate a thermal velocity and other properties at the moment of the contact with the surface of the boundary at a particular place of the boundary. Also, we have recognized that only a half of the particles near scattering surface had a recent departure from the surface with the magnitude of velocity equal to the magnitude of thermal velocity corresponding to the temperature of the reflecting gas-solid interface.

The step S103 of defining the net rate of property influx per unit volume from the model gas system further includes a step of defining a net rate of total property influx per unit volume from a gas-solid interface exhibiting mixed diffuse and specular particle scattering, where the net rate of total property influx per unit volume from the gas-solid interface is formed by way of a second plurality of converging ballistic particles, each of the second plurality of converging ballistic particles is selected from the plurality of converging ballistic particles by the ballistic trajectory having the starting point in one of a plurality of points of original collisions on the gas-solid interface, and where each of the plurality of points of original collisions resulted in diffuse particle scattering from the gas-solid interface is treated as a heterogeneous point source.

Figure 8:
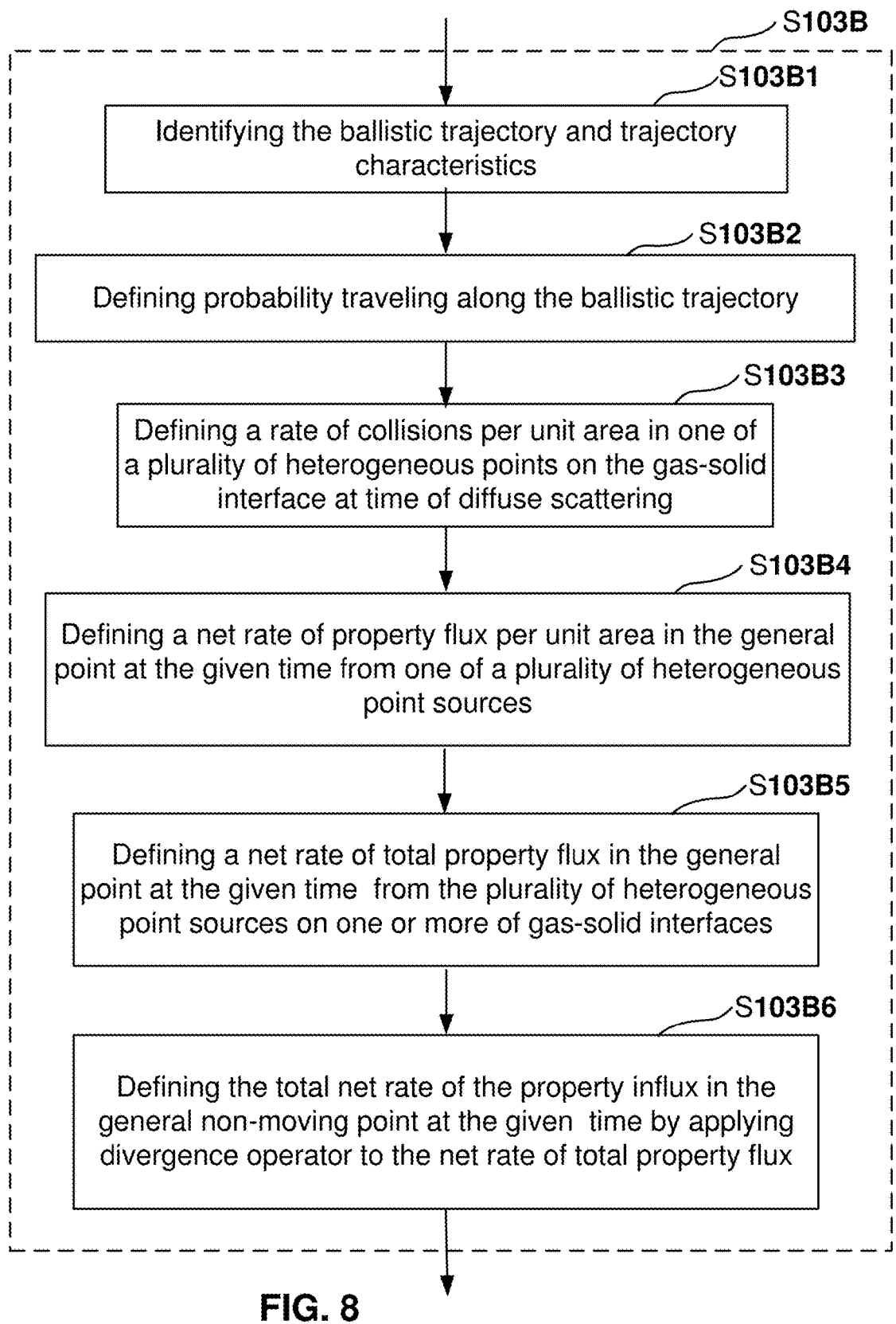
FIG. 8 is a block diagram of an alternative approach employed to define the steps needed to calculate the net rate of property influx per unit volume from a diffuse gas-solid interface in the general non-moving point y at the given time t.

FIG. 8 is a block diagram of an alternative approach employed to define major steps needed to calculate the net rate of property influx per unit volume from the diffuse gas-solid interfaces of the boundary in the general non-moving point y at the given time t.

In some embodiments, the step S103B in the example of FIG. 1A of defining the net rate of property influx per unit volume in the general non-moving point at the given time from the gas-solid interface of the boundary includes steps of:

identifying the ballistic trajectory, for each of the second plurality of converging ballistic particles (S103B1), where the velocity of the heterogeneous point source for each of the second plurality of converging ballistic particles is assigned to be equal to the velocity of the gas-solid interface in a corresponding point of original collisions on the gas-solid interface at the time of diffuse particle scattering;

defining the probability of traveling along the ballistic trajectory (S103B2);

defining a rate of collisions per unit area in one of a plurality of heterogeneous points on the gas-solid interface at the time of diffuse particle scattering (S103B3), where the ballistic trajectory identifies the time of diffuse particle scattering for each of the second plurality of converging ballistic particles;

defining a net rate of property flux per unit area in the general point at the given time from one of a plurality of heterogeneous point sources (S103B4);

defining a net rate of total property flux in the general point at the given time from the plurality of heterogeneous point sources on one or more of gas-solid interfaces (S103B5); and defining the net rate of total property influx per unit volume in the general point at the given time by applying divergence operator to the net rate of total property flux (S103B1).

In the example of FIG. 6, plate 615 and plate 616 confine across y-axis a model gas flow along the x-axis and surfaces 611 and 612 positioned at distance Δx bound a portion of the model gas system along the x-axis. In the model gas system having gas-solid interfaces with purely diffuse scattering of particles, each particle originated from preceding diffuse scatterings from the interfaces delivers in the main control volume 614 some property obtained from the location and time of the original diffuse scattering (ballistic trajectory 606 from plate 616 and ballistic trajectory 605 from plate 615 of FIG. 6).

To calculate property fluxes in a originated from diffuse particle scattering from the gas-solid interfaces of two stationary parallel plate s it is needed to determine departing time $t'_{ib1}$ and $t'_{ib2}$ from plate 615 and plate 616, respectively, which provide an opportunity for departing the plate particles to arrive in point y at time t. We have also recognized that departing time from plate 615 or plate 616 is needed to indicate time at which the departing particle has obtained a particular transported property. Referring again to the example of FIG. 6, determining departing time $t'_{ib1}$ and $t'_{ib2}$ from plate 615 and plate 616, respectively, includes applying formulas:

$$t'_{ib1} = t - \varphi'_{ib1} \text{ and } t'_{ib2} = t - \varphi'_{ib2}, \tag{39}$$

where $\varphi'_{ib1}$ and $\varphi'_{ib2}$ are ballistic traveling times from plate 615 and plate 616, respectively, to point y, which can be determined by solving corresponding equations of projectile motion with respect to corresponding traveling times $\varphi'_{ib1}$ and $\varphi'_{ib2}$.

Referring again to FIG. 6 showing schematically model gas flow confined by two being at rest parallel plates plate 615 and plate 616 at $y_{b1}$ and $y_{b2}$ and having normal vectors $n_{b1}$ and $n_{b2}$, respectively, upon recognizing that the property flux in a general non-moving point y at time t, is originated from the original collisions with gas-solid interfaces of plate 615 and plate 616, the property vector fluxes per unit time from plate 615 along ballistic trajectory 605 and plate 616 along ballistic trajectory 606 is calculated from Equations (40) and (41), respectively, given below:

$$J^{\Psi}_{y_{b1} \to y}(t, y) = \tag{40}$$
$$\sigma Q_{ib1}(t, t'_{ib1}) Z_{b1}(t'_{ib1} - y_{b1}) \frac{v_{b1}(t'_{ib1}, y_{b1}, t, y)}{v_{Tb1}(t'_{ib1}, y_{b1})} \Psi_{\lambda b1}(t'_{ib1}, y_{b1}, \lambda, \varphi_{ib1})$$

and $$J^{\Psi}_{y_{b2} \to y}(t, y) = \tag{41}$$
$$\sigma Q_{ib2}(t, t'_{ib2}) Z_{b2}(t'_{ib2}, y_{b2}) \frac{v_{b2}(t'_{ib2}, y_{b2}, t, y)}{v_{Tb2}(t'_{ib2}, y_{b2})} \Psi_{\lambda b2}(t'_{ib2}, y_{b2}, \lambda, \varphi_{ib2})$$

where $Z_{b1}(t'_{ib1}y_{b1})$ or $Z_{b2}(t'_{ib2}y_{b2})$ is the total number of collisions per unit area per unit time on surfaces positioned in $y_{b1}$ or $y_{b2}$ at time $t'_{ib1}$ or $t'_{ib2}$ respectively; or $Q_{ib1}(t, t'_{ib1})$ or $Q_{ib2}(t, t'_{ib2})$ is the probability of ballistic traveling along the trajectory beginning from $y_{b1}$ or $y_{b2}$ at time $t'_{ib1}$ or $t'_{ib2}$ respectively, allowing to each of the traveling particles to arrive in point y at time t, $\Psi_{\lambda b1}(t'_{ib1}y_{b1}, \lambda, \varphi_{ib1})$ or $\Psi_{\lambda b2}(t'_{ib2}, y_{b2}, \lambda, \varphi_{ib2})$ is property obtained by the traveling particle from plate 615 or plate 616, respectively; $v_{b1}(t'_{ib1}y_{b1}, t, y)$ or $v_{b2}(t'_{ib2}y_{b2}, t, y)$ is the velocity of the traveling particle targeting point y at the time t which is originated from the particle's original diffuse scattering from point $y_{b1}$ or $y_{b2}$ at time $t'_{ib1}$ or $t'_{ib2}$ respectively; $v_{Tb1}(t'_{ib1}y_{b1})$ or $v_{Tb2}(t'_{ib2}y_{b2})$ is the magnitude of thermal velocity of the particle leaving the gas-solid interface of plate 615 or plate 616 at time $t'_{ib1}$ or $t'_{ib2}$, respectively.

In the model gas confined between two infinite parallel plates, the particles diffusively scattered from one plate have a chance to be delivered to the other plate without intermediate collisions in the model gas space.

In some embodiments, referring again to FIG. 6, defining the total number of collisions per unit area per unit time on a gas-solid interface of one of two stationary parallel plates confining the model gas flow and revealing the purely diffuse mechanism of the particle scatterings, namely, σ=1, includes steps of:

(1) determining particle vector flux, $N_2^1$, 607 incident on plate 615 at time $t'_{ib1}$, which is originated from diffuse scattering from the gas-surface interface of plate 616, by calculating Equation (42) given below, which is obtained by assigning $\Psi_{b1}=1$, $y=y_{b1}$, u=0, and $t=t'_{ib1}$ in Equation (41):

$$N_2^1 = Q_{ib}(t'_{ib1}, t'_{ib1} - \varphi_{b2-b1}) \tag{42}$$
$$Z_b(t'_{ib1} - \varphi_{b2-b1}, y_{b2}) \frac{v_b(t'_{ib1} - \varphi_{b2-b1}, y_{b2}, t'_{ib1}, y_{b1})}{v_{Tb1}(t'_{ib1} - \varphi_{b2-b1}, y_{b2}}$$

where $\varphi_{b2-b1}$ is traveling time from plate 616 to plate 615;

(2) determining the particle vector flux per unit time, $N_{21}^1$, shown schematically as 608 incident on plate 615 at time $t'_{ib1}$, which is associated with the incident on the gas-solid interface of plate 615 of ballistic particles from the gas in the range from $y_{b2}$ to $y_{b1}$, is calculated from Equation (43) given below, which is obtained by assigning $t=t'_{ib1}$, $t'_i=t'_{ib1}$, $-\varphi_{i1}$, $y=y_{b1}$, $\Psi_{in}=1$, and $u=0$ in Equation (37):

$$N_{21}^1 = \frac{1}{2} \int_{y_{b2}}^{y_{b1}} Q_i(t'_{ib1}, t'_{ib1} - \varphi'_{i1}) \qquad (43)$$

$$Z_V(t'_{ib1} - \varphi'_{i1}, y') \frac{v(t'_{ib1} - \varphi'_{i1}, y', t'_{ib1}, y_{b1})}{v_T(t'_{ib1} - \varphi'_{i1}, y')} dy'$$

where $\varphi'_{i1}$ is traveling time between $y'$ and plate 615, $Q_i(t'_{ib1}, t'_{ib1} - \varphi'_{i1})$ is the survival probability of the particle ballistic traveling along the ballistic trajectory from the point of the preceding collision on the boundary at $y_{b2}$ to the boundary at $y_{b1}$ at time $t'_{ib1}$, which, is expressed as follows $$Q_1(t'_{ib1}, t'_{ib1} - \varphi'_{i1}) = \exp(-\int_{t'_{ib1} - \varphi'_{i1}}^{t'_{ib1}} P_c(y(\tilde{t}, t'_{ib1} - \varphi_{i1})) v_{rel}(y(\tilde{t}; t'_{ib1} - \varphi_{i1})) d\tilde{t}) \qquad (44)$$

(3) determining the impingement rate, $J_{FS}^{yb1}$, or the total particle vector flux per unit time incident at time $t'_{ib1}$ on the surface of the plate 615 at $y_{b1}$, by calculating Equation (45) given below, which is obtained by summing Equations (42) and (43):

$$J_{FS}^{yb1} = N_{21}^1 + N_2^1; \qquad (45)$$

(4) determining the rate of collisions $Z_{b1}$ at time $t'_{ib1}$ on a surface of plate 615 having normal $n_{b1}$ or the impingement rate is calculated from Equation (46) given below:

$$Z_{b1} = -J_{FS}^{yb1} n_{b1}. \qquad (46)$$

Analogously, the impingement rate, $J_{FS}^{yb2}$, or the total vector flux of particles per unit area incident at time $t'_{ib2}$ on the surface of the plate at $y_{b2}$ is calculated as follows $$J_{FS}^{yb2} = N_{12}^2 + N_1^2, \qquad (47)$$

where $N_1^2$ is particle flux 609 on plate 616 at time $t'_{ib2}$ which is formed by ballistic traveling particles diffusively scattered from the plate 615, $N_{12}^2$ is the particle flux 610 incident at time $t'_{ib2}$ on the surface of plate 616;

Finally, the rate of collisions $Z_{b2}$ at time $t'_{ib2}$ on a surface of plate 616 having normal $n_{b2}$ or the impingement rate is calculated from Equation (48) given below:

$$Z_{b2} = -J_{FS}^{yb2} n_{b2}. \qquad (48)$$

The step S103B of defining the net rate of property influx per unit volume from the diffuse gas-solid interface of the boundary in the same general non-moving point at the same time includes, for example, a step of quantifying property supplied by converging ballistic particles originated from diffuse scatterings from gas-solid interfaces of plate 615 having normal $n_{b1}=-1$ and positioned at $y_{b1}$ and plate 616 having normal $n_{b2}=1$ and positioned at $y_{b2}$ by applying Equations (49) and (50), respectively, given below, which is obtained by executing $$\frac{\partial}{\partial y}$$

operator to the one-dimensional vector field of Equations (40) and (41) and multiplying by a negative sign, respectively:

$$B_{in}^{\Psi\lambda\_bd1} = -\frac{\partial}{\partial y}[J_{y_{b1} \to y}^\Psi] \text{ and} \qquad (49)$$

$$B_{in}^{\Psi\lambda\_bd2} = -\frac{\partial}{\partial y}[J_{y_{b2} \to y}^\Psi]. \qquad (50)$$

where $B_{in}^{\Psi\lambda\_bd1}$ and $B_{in}^{\Psi\lambda\_bd2}$ are the net rate of property influxes per unit volume from the diffuse gas-solid interface of the boundary formed by converging ballistic particles originated from diffuse scatterings from gas-solid interfaces of plate 615 and plate 616, respectively.

For the model gas system established to be a bounded model gas system providing a model gas flow passage through a channel formed by a boundary confining the channel and being in contact with the model gas through a model gas-solid interface exhibiting mixed diffuse and specular particle scattering, the step S103 in the example of FIG. 1A of defining the net rate of property influx per unit volume in the general non-moving point of the space occupied by the model gas at the given time from the surrounding model gas system in some embodiments includes steps of:

defining the net rate of property influx per unit volume in the general non-moving point at the given time from the surrounding model gas, which is formed by the converging ballistic traveling particles originated from the original collisions within the space occupied by the model gas (S103A in the example of FIG. 3);

defining the net rate of property influx per unit volume in the general non-moving point at the given time from the diffuse gas-solid interface of the boundary, which is formed by the converging ballistic traveling particles originated from the original scatterings from the gas-solid interface exhibiting diffuse particle scattering (S103B);

defining the net rate of property influx per unit volume in the general non-moving point at the given time via the mixed diffuse-specular gas-solid interfaces of the boundary (S103C), where the value of property delivered in the general non-moving point at the given time by each of the converging ballistic traveling particles in the model gas system is evaluated regarding whether the value of the property is conserved or changed because of aging such as change of mass with internal radioactive decay during the ballistic traveling time, where the value of property delivered in the general non-moving point at the given time by each of the converging ballistic particles in the model gas system is evaluated regarding whether the value of the property is modified because of interaction with an external field such as change of the velocity with a gravitational field during the ballistic traveling time;

defining the net rate of property generation per unit volume in the general non-moving point originated from the effect of surrounding such as the model gas pressure gradient or the temperature gradient (S103D); and summing influxes of steps S103A, S103B, 103C, and S103D according to step S103E.

The step S103D of defining the net rate of property generation per unit volume in the general non-moving point originated from the effect of surrounding such as the model gas pressure gradient or the temperature gradient includes, for example, a step of adding contribution of transported quantity within the model gas system, which is resulted from transmitting property across interfaces separating the model gas of the system and the model gas of the surroundings such as the surfaces of inlet and outlet openings.

In some embodiments of a bounded model gas system having an open-channel geometry providing fluid flow passage through a channel having an inlet opening and an outlet opening, which is defined by approximating to an identical bounded model gas system providing model gas flow passage through a channel formed by a boundary confining the channel and being in contact with the model gas through a gas-solid interface, additional generation of transported quantity within the model gas system is resulted from transmitting property across the surfaces of inlet and outlet openings. Symbolically, the net rates of property generation originated from the effect of the surrounding (model gas pressure gradient, temperature gradient) is expressed as $\dot{Q}_\Psi$.

If the property transport is the momentum transport, then the generation term in a confined model gas system is resulted from forces acting on the model gas in the form of the external pressure force, P, applied across the surface bounding the system. We have also recognized that normal gradient pressure force acting on the model gas and prompting model gas flow represents the effect of surrounding on the momentum change. Particularly, referring to FIG. 6, if external pressure $P_x$ is applied to surface 611 in the positive x-direction and external pressure $P_{x+\Delta x}$ is applied to surface 612 in the negative x-direction and the length of the model gas system is $\Delta x$, then the negative pressure gradient along the x-axis, $$-\frac{P_{x+\Delta x} - P_x}{\Delta x},$$

is treated as the force per unit volume motivating the model gas movement toward the resulting force:

$$\dot{Q}_\Psi = -\lim\left(\frac{P_{x+\Delta x} - P_x}{\Delta x}\right)_{\Delta x \to 0}. \quad (51)$$

If the property transport is the energy transport, the generation terms result from energy flow through the main control volume because of induced temperature gradients.

Figure 9:
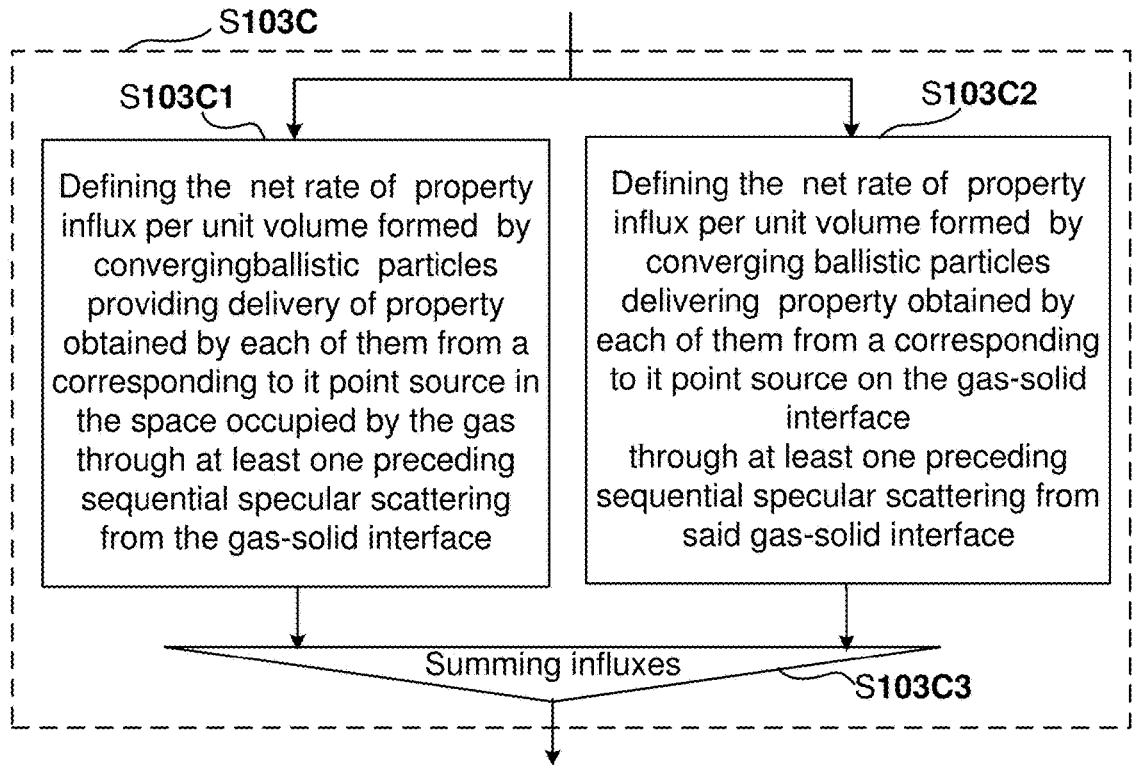
FIG. 9 is a block diagram of an alternative approach employed to define major steps needed to calculate the net rate of property influx per unit volume via one or more of mixed diffuse-specular gas-solid interfaces in the general non-moving point at the given time.

The embodiments of the following part of the specification are explained where property acquired by the particle in the point of the preceding collision or preceding diffuse scattering is not aged during a particle's ballistic traveling time, which implies that transported property is conserved during ballistic traveling and aging coefficient $\lambda=0$ FIG. 9 is a block diagram of an alternative approach employed to define major steps of step S103C needed to calculate the net rate of property influx per unit volume via one or more of mixed diffuse-specular gas-solid interfaces in the general non-moving point y at the given time t. The step S103C includes steps of:

defining the net rate of property influx per unit volume formed by the converging ballistic particles providing delivery of property obtained by each from a corresponding to it point source in the space occupied by the model gas through at least one preceding sequential specular scattering from the gas-solid interface (S103C1);

defining the net rate of property influx per unit volume formed by converging ballistic particles delivering property obtained by each from a corresponding to it point source on the gas-solid interface through at least one preceding sequential specular scattering from said gas-solid interface (S103C2), where point source strength on the gas-solid interface having both diffuse and specular particle scattering components must be proportional to the property accommodation coefficient σ;

summing influxes of steps S103C1 and S103C2 according to step S103C3.

Further, the embodiments of this and the following subsections dealing with mixed diffuse and specular scattering are explained in a case of one-dimensional incompressible steady-state model gas flow between being at rest infinite parallel plates having gas-solid interfaces with mixed both diffuse and specular particle scattering and at the uniform temperature implying that the thermal velocity of the particles is a constant. The present invention, however, is not limited to the case but can be preferably applied to numerous variations and modifications.

Figure 10:
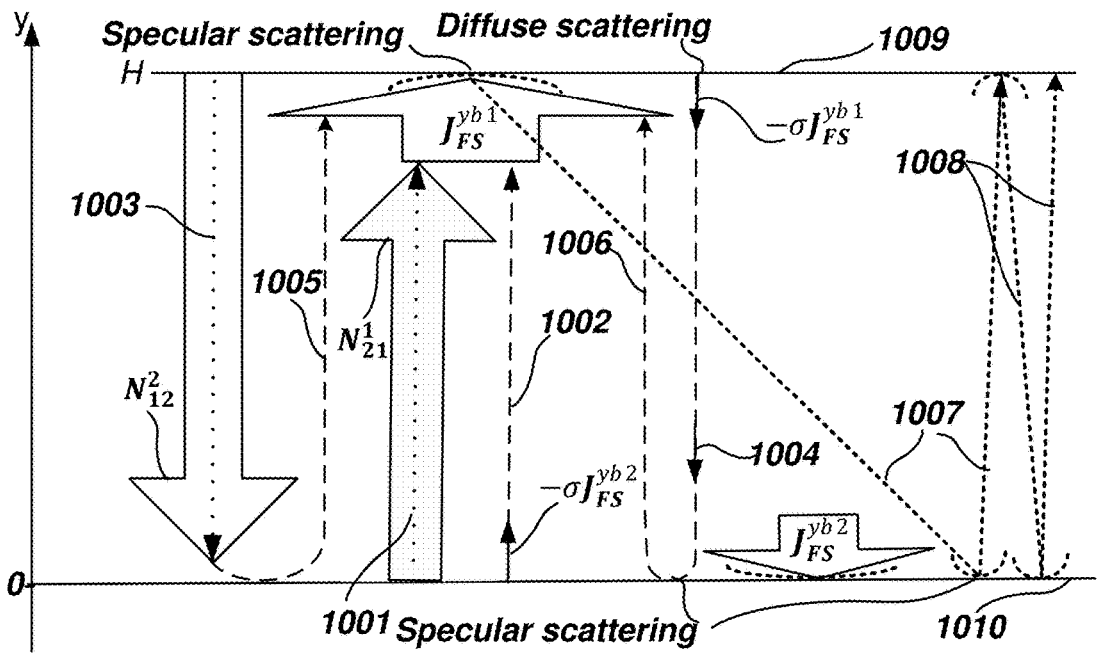
FIG. 10 is a schematic view of the one-dimensional model gas system between parallel infinite plates, shown to illustrate a schematic of defining diffuse and specular components of the impingement rate on the gas-solid interfaces the plates.

FIG. 10 is a schematic view of the one-dimensional model gas system between parallel infinite plates, shown to illustrate a schematic of defining diffuse and specular components of the impingement rate on the gas-solid interfaces the plates. Specifically, the impingement rate on the gas-solid interface of plate 1009 is associated with the particles incident on plate 1009, which are originated from preceding collisions within of both the model gas confined between the interfaces of two parallel plates, plate 1009 at $y_{b1}$ and plate 1010 at $y_{b2}$ with the property accommodation coefficient on both gas-solid interfaces, σ. The schematic shows also various particle paths from the model gas system on the plates and paths between the confining plates. In the example of FIG. 10, which shows the model gas system having gas-solid interfaces with mixed diffuse and specular components of particle scattering, a variety of particle paths are involved in the transport of the particles on a gas-solid interface, with each path being characterized by the probability of the ballistic traveling. Defining the impingement rate on a specific location of the gas-solid interface at the given time includes, for example, steps of:

defining a bulk component of an impingement rate formed by particles chosen from the plurality of converging ballistic particles originated from the original collisions in space occupied by the model gas (trajectory 1001);

defining a bulk-specular component of the impingement rate formed by particles chosen from the plurality of converging ballistic particles originated from the original collisions in space occupied by the model gas (trajectory 1003) and having at least the last preceding specular scattering (trajectory 1005);

defining a diffuse component of the impingement rate formed by particles chosen from the plurality of converging ballistic particles originated from one or more of heterogeneous point sources (trajectory 1002); and defining a diffuse-specular component of the impingement rate formed by particles chosen from the plurality of converging ballistic particles originated from original diffuse scatterings from one or more of heterogeneous point sources (trajectory 1004) and having at least the last preceding specular scattering (trajectory 1006); and summing the bulk component, the bulk-specular component, the diffuse component, and the diffuse-specular component of the impingement rate, where each of a plurality of impinging particles is selected by an impinging trajectory allowing to target the gas-solid interface in a specific location of the gas-solid interface at a specific time.

In the model gas confined between two infinite parallel plates, some of particles having original collisions within the model gas volume and some particles diffusively scattered from plate 1010 have a chance to travel to the other plate 1009 without intermediate collisions in the model gas space (according to ballistic trajectories 1001 and 1002, respectively). Some of particles having original collisions within the model gas volume and some particles diffusively scattered from plate 1009 have a chance to be delivered to plate 1010 without intermediate collisions in the model gas space (according to ballistic trajectories 1003 and 1004, respectively) and then specularly scattered again back to plate 1009 (according to ballistic trajectories 1005 and 1006, respectively. Also, since both gas-solid interfaces confining the model gas have specular components, some particles scattered back have a chance to bounce between the plates (as shown in FIG. 10 schematically by bouncing cycles 1007 and 1008.

Since the model gas system is kept at the uniform constant temperature, all particle fluxes per unit time within the model gas system are stable. Under the invention, property accommodation coefficient σ on the gas-solid interface having both diffuse and specular particle scattering is treated as the probability of incident particles to be "absorbed" into the surface with further its "evaporation" back with properties being acquired by the particle at the gas-solid interface at the moment of "absorption".

Referring again to FIG. 10, upon recognizing that the total number of particles colliding with a surface of a plate per unit area per unit time or the impingement rate is formed by the impinging particles according to ballistic trajectories described above and bouncing ballistic trajectories (shown as the first and the second bouncing cycles 1007 and 1008, respectively), the impingement rates or the particle vector fluxes on plate 1009, $J_{FS}^{yb1}$, and plate 1010, $J_{FS}^{yb2}$ are obtained from solving a system of Equations (52) and (53), given below $$J_{FS}^{yb1} = [N_{21}^{1} - (1-\sigma)N_{12}^{2}\exp(-P_cH) - \sigma J_{FS}^{yb2}\exp(-P_cH) + \sigma(1-\sigma)J_{FS}^{yb1}\exp(-2P_cH)]\mathbb{N} \quad (52)$$

and $$J_{FS}^{yb2} = [N_{12}^{2} - (1-\sigma)N_{21}^{1}\exp(-P_cH) - \sigma J_{FS}^{yb1}\exp(-P_cH) + \sigma(1-\sigma)\exp(-2P_cH)J_{FS}^{yb2}]\mathbb{N} \quad (53)$$

where, in the equations above, the first terms are $N_{21}^{1}$ and $N_{12}^{2}$, which are particle fluxes per unit time incident on plate 1009 and plate 1010 formed by the particles following ballistic trajectories 1001 and 1003, respectively, the second terms are $-(1-\sigma)N_{12}^{2}\exp(-P_cH)$ and $-(1-\sigma)N_{21}^{1}\exp(-P_cH)$, which are specular scattered back fluxes per unit time from plate 1010 and incident on plate 1009 (trajectory 1005) and from plate 1009 (top) and incident on plate 1010, respectively, the third terms are $-\sigma J_{FS}^{yb2}\exp(-P_cH)$ and $-\sigma J_{FS}^{yb1}\exp(-P_cH)$, which are the particle fluxes per unit time emitted diffusively from point sources, point source strength of each is directly proportional to σ, of plate 1010 and incident on plate 1009) (trajectory 1002) from plate 1009 and incident on plate 1010, respectively, and the fourth terms are $\sigma(1-\sigma)J_{FS}^{yb1}\exp(-2P_cH)$ and $+\sigma(1-\sigma)\exp(-2P_cH)J_{FS}^{yb2}$, which are the particle fluxes per unit time scattered diffusively from plate 1009 to plate 1010 and then specularly scattered back to plate 1009 (trajectory 1006) and from plate 1010 to plate 1009 and then specularly scattered back to plate 1010, respectively. In the equations above, N is the bouncing coefficient or a coefficient characterizing the total impact of the sequential specular bouncing on the impingement rates on both plate 1009 and plate 1010. Under the invention, the bouncing coefficient is calculated from Equations (54) given below:

$$\mathbb{N} = \sum_{n=0}^{\infty}(1-\sigma)^{2n}\exp(-2nP_cH) = \frac{1}{1-(1-\sigma)^2\exp(-2P_cH)} \quad (54)$$

where $(1-\sigma)^2\exp(-2P_cH)$ is the impact of one cycle of bouncing starting from both plate 1009 or plate 1010.

Referring again to FIG. 10, upon recognizing that, the model gas is confined between two infinite parallel plates having identical properties on the gas-solid interfaces, so that $$N_{12}^{2} = N_{21}^{1} \text{ and } J_{FS}^{yb2} = -J_{FS}^{yb1}, \quad (55)$$

and $N_{21}^{1}$ is calculated according to Equation (56) given below, which is obtained by integrating Equation (43) with $P_c$=constant and $Z_V$=constant at the uniform temperature:

$$N_{21}^{1} = \frac{Z_V}{2P_c}[1-\exp(-P_cH)], \quad (56)$$

then the impingement rate on plate 1009 or the rate of collisions, $J_{FS}^{yb1}$ is calculated from Equations (57), given below which is obtained by substitution of Equations (56) and (55) in Equation (52) or (53) and executing algebra operations:

$$Z_b = J_{FS}^{yb1} = -J_{FS}^{yb2} + \frac{Z_V}{2P_c} \quad (57)$$

Figure 11:
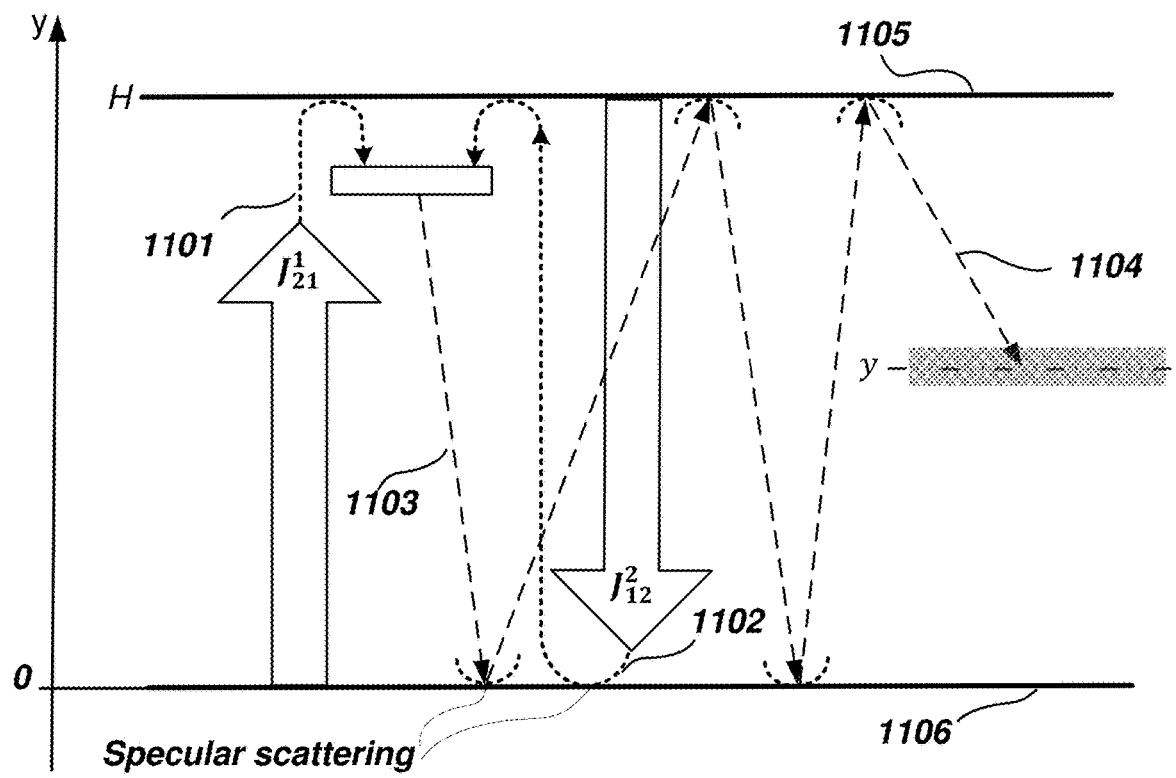
FIG. 11 is a schematic view of the one-dimensional model gas system, shown to illustrate a method for analytical representation of the net rate of property influx, which is formed by converging ballistic particles originated from diffuse and specular particle scatterings from confining parallel plates.

FIG. 11 is a schematic view of one-dimensional model gas system, shown to illustrate a method for analytical representation of the net rate of property influx in a general non-moving point y, which is formed by converging ballistic particles, each having at least one specular scattering from a gas-solid interface of plate 1105 or plate 1106.

In a stable or steady-state model gas system, any property characterizing model gas flow depends on only the position in space, y', but not time, namely, Ψ(y') and properties characterizing the gas-solid interfaces of plate 1105 positioned at $y_{b1}$=H and plate 1106 positioned at $y_{b2}$=0, $\Psi_{b1}$ and $\Psi_{b2}$, respectively, are constants. The embodiments of this part of the specification are explained where the values of the property on the plate is assigned to be zero, namely, $\Psi_{b1}=\Psi_{b2}=0$. This will cause eliminating fluxes associated with converging ballistic particles chosen from the group of particles originated from original diffuse scatterings from plate 1105 and plate 1106. This limitation is made for clarity without limiting the present invention.

In the stable system with the incompressible model gas flow, the probability of ballistic traveling, $Q_i$, between points y' and y is calculated from Equation (58) given below, which is obtained by substitution of $v_{rel}=v_T$, ŷ of Equation (10) with g=0 and u=0, and $P_c$=constant in Equation (21):

$$Q_i(y,y') = \exp(-P_c|y-y'|). \quad (58)$$

Concerning the example of FIG. 11, the net rate of property influx, $B_{in}^{\Psi 0\_F\_bs}$, formed by converging ballistic particles chosen from the group of particles originated from initial collisions within the model gas volume and having at least the last preceding specular scattering from gas-solid interfaces of both plate 1105 and plate 1106 is calculated from Equation (59) given below $$B_{in}^{\Psi 0\_F\_bs} = B_{in}^{\Psi 0\_F\_bs1} + B_{in}^{\Psi 0\_F\_bs2}, \quad (59)$$

where $B_{in}^{\Psi 0\_F\_bs1}$ and $B_{in}^{\Psi 0\_F\_bs2}$ are the net rate of property influxes associated with the last specular scatterings from plate 1105 and plate 1106, respectively. Specifically, $B_{in}^{\Psi\_F\_bs1}$ is formed by particles having ballistic trajectories 1101 and 1102, which are continued by segmented trajectory 1103 with the last trajectory segment 1104 released from plate 1105, as shown in FIG. 11 and is calculated from Equation (60) given below:

$$B_{in}^{\Psi 0\_F\_bs1} = \quad (60)$$
$$\frac{\partial}{\partial y}\{[[1-\sigma]J_{21}^1 - [1-\sigma]^2 J_{12}^2 \exp(-P_c H)]\mathbb{N}\exp(-P_c(H-y))\},$$

where $J_{21}^1$ and $J_{12}^2$ are the property fluxes per unit time, which are formed by ballistic particles incident on plate 1105 and plate 1106, respectively, and $\mathbb{N}$ is calculated from Equation (54).

The property vector fluxes $J_{21}^1$ and $J_{12}^2$ are calculated from Equations (61) and (62) given below:

$$J_{21}^1 = \tfrac{1}{2} z_1 \int_0^H \Psi(y')\exp(-P_c y')dy' \quad (61)$$

and $$J_{12}^2 = -\tfrac{1}{2}\exp(-P_c H) z_1 \int_0^H \Psi(y')\exp(P_c y')dy', \quad (62)$$

respectively. Analogously, using Equation (60) given above as a template, we obtain $$B_{in}^{\Psi 0\_F\_bs2} = \frac{\partial}{\partial y}\{[-[1-\sigma]J_{12}^2 + [1-\sigma]^2 J_{21}^1 \exp(-P_c H)]\mathbb{N}\exp(-P_c y)\}, \quad (63)$$

Next, to define and formulate the net rate of property efflux per unit volume into surroundings from the general non-moving point y at the given time, t, the linear dimensions of the main control volume surrounding point y are selected to be sufficiently small for preventing two and more consecutive collisions of the same particle within the main control volume.

Figure 12:
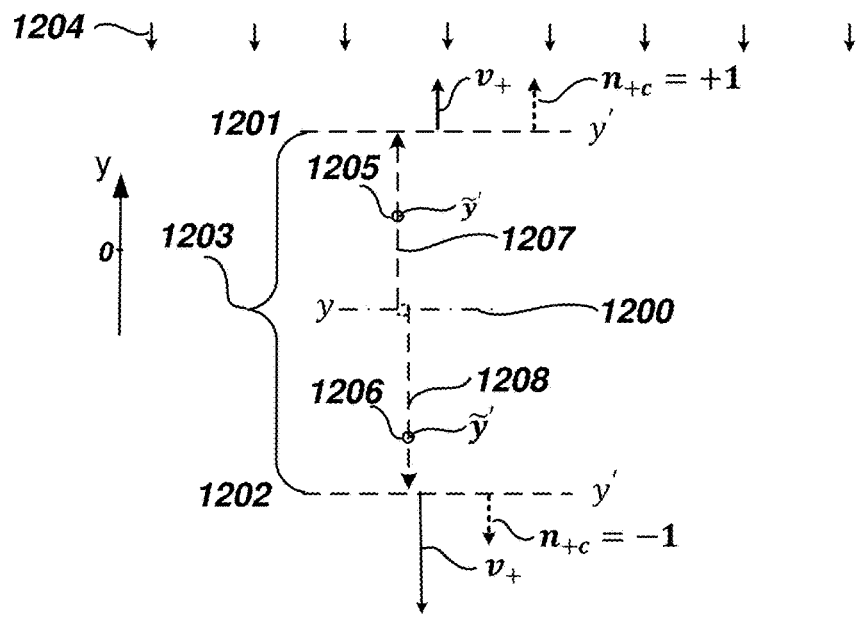
FIG. 12 is a schematic shown to illustrate a method for analytical representation of the net rate of property efflux from a stationary point in one-dimensional space occupied by the model gas.

4. Defining the Net Rate of Property Efflux Formed by Diverging Ballistic Particles FIG. 12 is a schematic shown to illustrate a method for analytical representation of the net rate of property efflux from a stationary point in one-dimensional space occupied by the model gas. According to the schematic, a particle 1200 in point y at the given time t diverges from the point source in this point and achieves velocity $v_+$ in point y' at time $t'_a$ while crossing a control surface 1201 or 1202 of a control volume 1203 surrounding the point source. We assume that property, $\Psi_{\lambda+}$ carried by the diverging ballistic particle at time $t'_a$ of crossing in point y' enclosing control surface 1201 or 1202 was initially obtained by the particle at the moment of the original collision in point y at time t. Specifically, in a point source in y at time t, (1) each particle diverging from a general non-moving point y at the given time, t, has acquired thermal velocity $v_T(t, y)$, mass flow velocity u(t, y), and one or more specific properties, $\Psi_{\lambda+}(t, y)$, of particular values including mass, momentum, and energy; (2) each traveling particle is being simultaneously in the states of both divergence from the point of preceding collision and convergence in the point of sequential collision; (3) equal number of converging and diverging ballistic particles is maintained at any point of collisions at any time, which provides maintaining continuity in the model gas. In the example of FIG. 12, the observer's coordinate system is oriented with y-axis directed along the negative direction of the applied acceleration field 1204 with acceleration g for each particle. The particle having a collision in point y at time t acquires a magnitude of thermal velocity, $v_T(t, y)$ and mass flow velocity u(t, y), which are intrinsic to the nearby volume of the model gas surrounding point y at time t. After a collision in point y at time t, the particle may move in any direction because of the arbitrary nature of the unit vector $n_{+c}$, thus forming an expansion zone 1203.

The step S104 of defining the net rate of property efflux per unit volume from the general point of the plurality of non-moving points at the given time in the model gas system in one-dimensional configuration includes steps of:

for each of the plurality of diverging ballistic particles, identifying the ballistic trajectory starting from the general point of the plurality of non-moving points at the given time and ending in one of the plurality of points in space surrounding the general point of the plurality of non-moving points;

defining probability of traveling along the ballistic trajectory from the point of the divergence y to point y' on the control surface 1201 or 1202;

defining a vector field of a property flux per unit area in the ending point of one of the plurality of points in space surrounding the general point;

defining the net rate of property efflux per unit volume by applying a divergence operator to the vector field of the property flux per unit area in the ending point; and shrinking volume of space surrounding the general point to the general point.

The step of identifying a trajectory and trajectory characteristics, for each particle diverging from the general non-moving point at the given time includes, for example, steps of:

defining a diverging ballistic trajectory of each particle diverging from the general non-moving point y at time, t;

determining traveling time needed, for each particle diverging from non-moving point y at the given time, t, to cross a control surface enclosing point y in point y' of control surface;

defining an appropriate instant unit vector directing thermal velocity component along the diverging ballistic trajectory of each particle diverging from the general non-moving point y at time t;

defining the velocity vector of each particle at the moment of crossing the control surface in point y'.

The step of defining the diverging ballistic trajectory of each particle diverging from the general non-moving point y at time, t includes a step of formulating position vector $\tilde{y}'$ 1205 or 1206 of the particle on trajectory 1207 or 1208, respectively, and velocity vector $\tilde{v}'$ (not shown) at time $\tilde{t}$ by applying Equations (64) and (65), respectively, given below:

$$\tilde{y}' = y'(t,y,\tilde{t}) = y + [v_T(t,y)n_{+c} + u(t,y)](\tilde{t}-t) + \tfrac{1}{2}g(\tilde{t}-t)^2, \quad (64)$$

and $$\tilde{v}'_+(\tilde{t}) = v'_+(t,y,\tilde{t}) = v_T(t,y)n_{+c} + u(t,y) + g(\tilde{t}-t), \quad (65)$$

where $n_{+c}=\pm 1$ is a unit vector of arbitrary direction with the initial point of origin y at time, t.

The step of determining a traveling time needed, for each particle diverging from non-moving point y at the given time, t, to cross a control surface enclosing point y in point y' of control surface includes a step of resolving the equation of projectile motion, Equation (66) given below, with respect to the ballistic traveling time, $\varphi_+$:

$$y'=y+[v_T(t,y)n_{+c}+u(t,y)]\varphi_+ + \tfrac{1}{2}g(\varphi_+)^2 \tag{66}$$

which is obtained by assigning $\tilde{t}=t'_a$ and substitution of $\varphi_+=t'_a-t$ in Equation (64) and rearrangement of the terms. Traveling time $\varphi_+$ is needed to indicate time $t'_a$ at which the departing particle has reached point y' on control surface 1201 or 1202 enclosing point y.

The step of defining an appropriate instant unit vector directing thermal velocity component along the diverging ballistic trajectory of each particle diverging from the general non-moving point y at time t in some embodiments includes the steps of:

presenting Equation (66) in the following form:

$$\varphi_+ v_T n_{+c} = y' - y_a^c, \tag{67}$$

where $n_+$ is a unit vector and $y_a^c$ (not shown) is a virtual position of a particle having zero magnitude of an arbitrary or thermal velocity at point y at time t, which is observed at time $t'_a$, and, in formula form, is expressed as:

$$y_a^c = y + u(t,y)\varphi_+ + \tfrac{1}{2}g(\varphi_+)^2; \tag{68}$$

and deriving $n_{+c}$ from Equation (67), which is given as:

$$n_{+c} = \frac{y' - y_a^c}{|y' - y_a^c|}, \tag{69}$$

where referring to FIG. 12, $n_{+c}$ (not shown) is interpreted as a unit vector of origin $y_a^c$ at time $t'_a$, which directs the vector of the thermal velocity component and $t'_a$ is the time of positioning in point y', which is on the control surface 1201 or 1202.

The step of defining the velocity vector, $v_+$, of each particle at the moment of crossing the control surface in point y' includes representing $v_+$ by applying Equation (70) given below:

$$v_+(t,y,t'_a,y') = v_T(t,y)n_{+c} + u(t,y) + g\varphi_+, \tag{70}$$

which is obtained by assigning $\tilde{t}=t'_a$ and substitution of $t'_a-t=\varphi_+$ in Equation (65).

The step of formulating the probability, $Q_+$, of ballistic traveling along the trajectory from point of the divergence y to point y' on the control surface 1201 or 1202 includes a step of representing $Q_+(t'_a, t)$ by applying Equation (71) given below:

$$Q_+(t'_a,t) = Q_+(0,\varphi_{i+}) = \exp(-\int_t^{t'_a} P_c(\tilde{y}'(\tilde{t}))v_{rel}(\tilde{y}'(\tilde{t}))d\tilde{t}), \tag{71}$$

where $t'_a=t+\varphi_+$ is a time of the particle positioning in point y' within the volume of the model gas system, $P_c(\tilde{y}'(\tilde{t}))$ is the number of particles within a collision tube placed in the model gas having particle density of $n(\tilde{y}'(\tilde{t}))$ at time $\tilde{t}$, $v_{rel}(\tilde{y}'(\tilde{t}))$ is an average magnitude of the relative velocity between the particle traveling along the diverging ballistic trajectory and nearby passed another particle being within the collision tube along the diverging ballistic trajectory at time $\tilde{t}$, with the method of its determining described above, $\tilde{y}'(\tilde{t})$ is defined by Equation (64).

The step of defining the vector field of the property flux, $J_y^\Psi$, along each of the ballistic trajectories in point $\vec{r}'$ of the trajectory includes a step of representing $J_y^\Psi$ by applying Equation (72) given below:

$$J_y^\Psi = \tfrac{1}{2}n(t,y)Q_+(t'_a,t)v_+(t,y,t'_a,y')\Psi_\lambda(t,y,t'_a,y'), \tag{72}$$

where $$\frac{\partial}{\partial y}$$

is the divergence operator in one-dimensional configuration, t is the given time, y is position of the starting point of a plurality of ballistic trajectories of diverging ballistic particles, y' is position of the ending point of one of the plurality of ballistic trajectories of diverging ballistic particles, $t'_a$ is a time of positioning in the ending point, $v_+(t, y, t'_a, y)$ is a velocity vector of each of the plurality of diverging ballistic particles at time of positioning the ending point, which is defined by Equation (70), $Q_+(t'_a, t)$ is probability of traveling along the ballistic trajectory of one of the plurality of diverging ballistic particles, which is defined by Equation (71), $\Psi_\lambda(t, y, t'_a, y)$ is property value carried by one of the plurality of diverging ballistic particles at time of positioning the ending point, and n(t, y) is particle density in point in the starting point at the given time.

The step of defining the net rate of property efflux per unit volume, $B_{out}^{\Psi\_FS}$, from a point source positioned in the general non-moving point y at the given time t includes a step of representing $B_{out}^{\Psi\_FS}$ by applying Equation (73) given below:

$$B_{out}^{\Psi\_FS}(t,y) = \left(\frac{\partial}{\partial y}J_y^\Psi\right)_{y'\to y} = \tfrac{1}{2}\left\{\frac{\partial}{\partial y}[n(t,y)Q_+(t'_a,t)v_+(t,y,t'_a,y')\Psi_\lambda(t,y,t'_a,y')]\right\}_{y'\to y}, \tag{73}$$

which is obtained by executing operator $$\frac{\partial}{\partial y}$$

to the vector field of Equation (72) followed by executing limit y'→y, which also leads to the limit $y_a^c$→y.

The step S105 of defining the temporal rate of the property change per unit volume, $\dot{A}^{fl}$, in the same general non-moving at the same time includes a step (not shown) of calculating by applying Equation (74) given below:

$$\dot{A}^{fl} = \frac{\partial}{\partial t}[n(t,y)\Psi_\lambda(t,y)], \tag{74}$$

where $\Psi_\lambda$ is scalar or vector property possessed by each particle in point y at time t; n is particle density in point y at time t.

5. Modeling Transport Processes for Fluid Flow in a Stable Condition

We have also recognized that the model gas system can be in a stable condition or a steady state, in which properties or variables characterizing the model gas system and defining its behavior are unchanged in time. It implies that properties or variables characterizing the model gas system are dependent on the position in space but not time. We have recognized the model gas system may be in a stable state before the initial time and may be in an unstable state at times after the initial time if it is affected by an external force or geometry modification at the moment of the initial time. Approximating fluid by the model gas in a stable condition in some embodiments further includes:

treating each point of the plurality of points in space occupied by the model gas as a point of collisions for each of the plurality of particles having the ballistic trajectory having the ending point in one of the plurality of points;

treating each of a plurality of the points of collisions as either a point source for each of a plurality of diverging ballistic particles or a point sink for each of a plurality of converging particles; and treating each particle of the plurality of particles moving from the point source to the point sink as a property carrier created in the point source by obtaining one or more of properties of specific values being intrinsic to the model gas surrounding the point source, and ended in the point sink by transferring one or more of properties of specific values in the point sink, where each of the plurality of particles is assigned to travel with a probability between any of two points of a plurality of points of consecutive collisions in space occupied by the model gas by following a ballistic trajectory governed by a law of motion, the ballistic trajectory having a starting point in one of a plurality of points of original collisions and an ending point in one of a plurality of points of ending collisions, and where the velocity of each of a plurality of point sources is assigned to be equal to the mass flow velocity of the model gas in each of a plurality of corresponding points of original collisions;

treating each of a plurality of collisions on a gas-solid interface of the model gas system, which has resulted in diffuse particle scattering from the gas-solid interface, as an act of interaction involving a property transfer from the gas-solid interface to a scattered particle; and treating each of a plurality of points of diffuse particle scattering on the gas-solid interface as a heterogeneous point source for each of a plurality of scattered particles, where the gas-solid interface reveals mixed diffuse and specular particle scatterings, where the velocity of each of a plurality of heterogeneous point sources on the gas-solid interface is assigned to be equal to the velocity of the gas-solid interface in each of a plurality of corresponding points of diffuse particle scattering, and where point source strength of each of the plurality of heterogeneous point sources on the gas-solid interface is assigned to be directly proportional to a property accommodation coefficient in each of the plurality of corresponding points of diffuse particle scattering, the property accommodation coefficient which is probability, for an incident particle, to accommodate one or more of properties intrinsic to the gas-solid interface and to scatter back in the model gas as a diffuse particle, the property accommodation coefficient being in a range from zero to one.

In some embodiments, modeling transport processes for model gas flow in a stable condition includes the steps of:

specifying geometry model and boundary conditions;

defining a net rate of property influx per unit volume from the model gas system in a general point of a plurality of non-moving points in space occupied by the model gas, the net rate of property influx per unit volume, which is formed by way of a plurality of converging ballistic particles, each of the plurality of converging ballistic particles is selected from the plurality of particles by the ballistic trajectory having the ending point in the general point of the plurality of non-moving points in space occupied by the model gas, defining a net rate of property efflux per unit volume from the general point, the net rate of property efflux per unit volume, which is formed by way of a plurality of diverging particles, each of the plurality of diverging ballistic particles is selected from the plurality of particles by the ballistic trajectory having the starting point in the general point of the plurality of non-moving points;

forming an integral property balance equation for each of one or more properties being transported by the plurality of particles in each of the plurality of non-moving points, where the integral property balance equation is established in a way that, in the general point, a term of the net rate of property influx per unit volume is equated a term of the net rate of property efflux per unit volume; and computing the flow of the model gas, where computing the flow of the model gas includes resolving a system of one or more of integral property balance equations in each of the plurality of non-moving points.

6. Integral Property Balance Equations in the One-dimensional Model Gas System The step S106 includes establishing an integral property balance equation for each of one or more properties being transported by the plurality of particles in each of the plurality of non-moving points in a way that, in the general point at the time, a term of the net rate of property influx per unit volume is equated to sum of a first term of temporal rate of a property change per unit volume and a second term of the net rate of property efflux per unit volume.

What is needed to form property balance in the model gas system is to recognize that each point of collisions is both a collector of property delivered by converging ballistic particles from the entire model gas system and a disperser into surrounding of property taken away by diverging ballistic particles.

Figure 13:
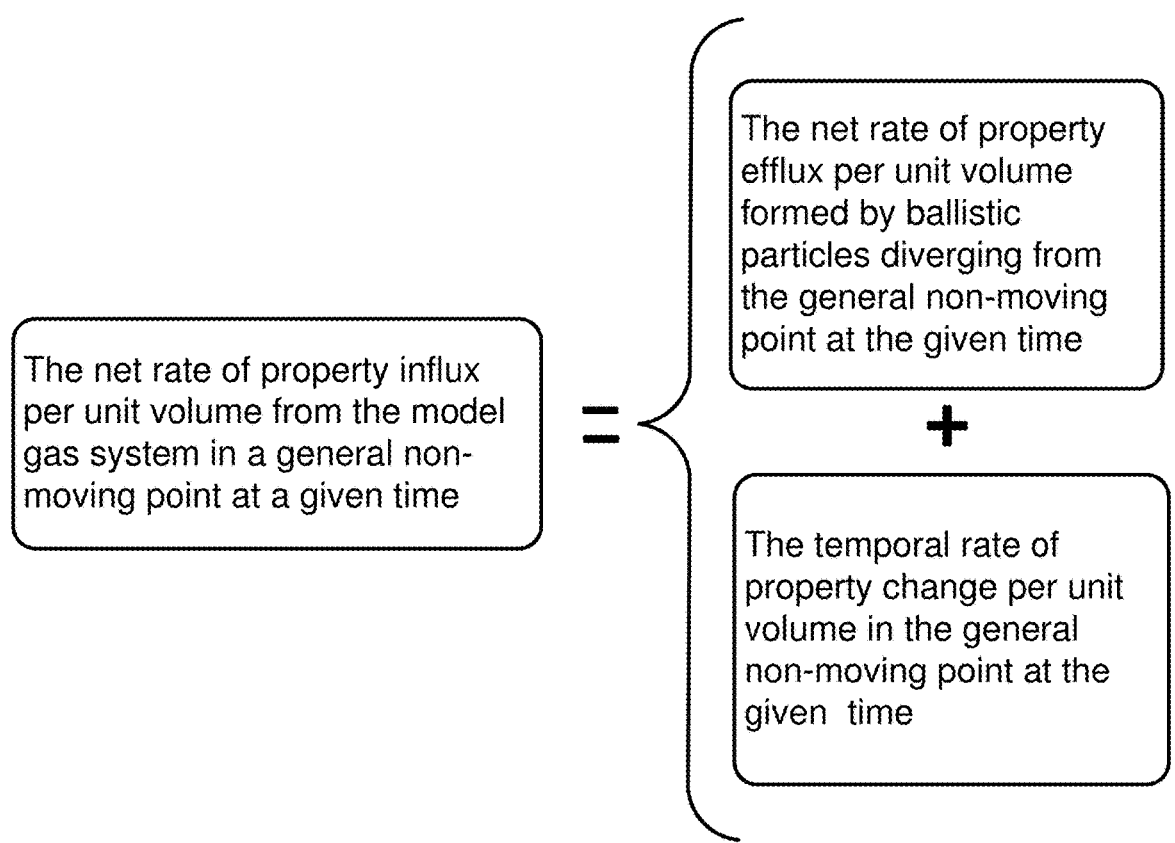
FIG. 13 is a block diagram of a word equation of a general property balance in the model gas system according to the principles of the invention.

FIG. 13 is a block diagram of a word equation of a general property balance in a model gas system according to the principles of the invention. According to the invention, it is constructed in such way that the net rate of property influx per unit volume from the surrounding model gas system, $B_{in}^{\Psi\_FS}$, is equated to the sum of the temporal rate of property change per unit volume in the same point at the same time, $$\frac{\partial}{\partial t}[n\Psi_\lambda],$$

and the net rate of property efflux per unit volume from the same point at the same time, which is a source point for the diverging ballistic particles originated from the collisions in this point, each taking away property intrinsic to the model gas near the same point simultaneously and dispersing it into surrounding model gas, $B_{out}^{\Psi\_FS}$, which is expressed in formula form as:

$$B_{in}^{\Psi\_FS}(y, t) = B_{out}^{\Psi\_FS}(y, t) + \frac{\partial}{\partial t}[n(t, y)\Psi_\lambda(t, y)], \quad (75)$$

In a steady-state model gas system, the equation above is reduced to Equation (76) given below, $$B_{in}^{\Psi\_FS}(y,t) = B_{out}^{\Psi\_FS}(y,t), \quad (76)$$

With reference to FIG. 1 and FIG. 1A, steps S103A, S104, and S105 are needed to define the property balance equation for a model gas system with no gas-solid interfaces. In this, the step S103 of defining the net rate of property influx per unit volume from the surrounding model gas system, $B_{in}^{\Psi\_FS}$, includes a step of representing $B_{in}^{\Psi\_FS}$ by applying Equation (77) given below:

$$B_{in}^{\Psi\_FS} = B_{in}^{\Psi\_F}, \quad (77)$$

where $B_{in}^{\Psi\_F}$ is computed according to step S103A.

In this embodiment, formulation of the integral form of the property balance equation in a one-dimensional model gas system with no boundaries includes applying Equation (78) given below, which is obtained by substitution of Equations (38) and (73) in Equation (75):

$$-\frac{1}{2}\frac{\partial}{\partial y}\int_{y_{b2}}^{y_{b1}} Q_i(t, t'_i) Z_V(t'_i, y') \frac{v(t'_i, y', t, y)}{v_T(t'_i, y')} \Psi_{in}(t'_i, y', t, y) dy' = \quad (78)$$

$$\frac{\partial}{\partial t}[n(t, y)\Psi_\lambda(t, y)] +$$

$$\frac{1}{2}\left\{\frac{\partial}{\partial y}[n(t, y)Q_+(t'_a, t)v_+(t, y, t'_a, y')\Psi_\lambda(t, y)]\right\}_{y'=y}$$

where, in the left-hand of the equation, $Q_i(t, t'_i)$, $Z_V(t'_i, y')$, $v(t'_i, y', t, y)$ are obtained from Equations (21), (32), and (16), respectively, and, in the second right-hand term, $Q_+(t'_a, t)$ and $v_+(t, y, t'_a, y')$ are expressed by Equations (71) and (70), respectively.

In the first term of the equation above, the probability of ballistic traveling a distance from point in y' to point in y is a limiting factor defining the range of the property influx impact in the property balance. When executing numerical calculations by any suitable computer system, the values of the probability of ballistic traveling are stored and executed accurately if they fall above the minimum absolute value (MAV) corresponding to a suitable format such as Single, Double, or Extended. Symbolically, the above is represented:

$$Q_i(t,t'_i) = \exp(-\int_{t'_i}^{t} P_c(y(\tilde{t},t'_i)) v_{rel}(y(\tilde{t},t'_i))) d\tilde{t}) \geq MAV. \quad (79)$$

The corresponding estimate of the non-equality above is given by:

$$\varphi_i^{max} \leq -\frac{\ln(MAV)}{P_c(y, t) v_{rel}(y, t)}, \quad (80)$$

where $\varphi_{i\_max}$ is an approximate value of the longest traveling time for the particle to reach point y at time t and being detected in the numerical calculation by the computer system.

Also, we have recognized that a predetermined dynamic history during some period immediately preceding the initial time $t_0$ ("past") will maximize the accuracy of prediction of the dynamic evolution of the model gas system especially in the most recent times following the initial time $t_0$ ("future"). Under the invention, an approximate reliable period of time, $\varphi_{i0}^{rel}$, with an established dynamic history, which has immediately preceded the initial time $t_0$, is calculated according to Equation (81):

$$\varphi_{i0}^{rel} = -\frac{\ln(MAV)}{[P_c v_{rel}]_{max}}, \quad (81)$$

where $\varphi_{i0}^{rel}$ is the reliable period before the initial time, MAV is a minimum absolute value corresponding to a precision format supported by a computer hardware, $P_c$ is a number of particles within a collision tube of a unit length placed in the model gas, $v_{rel}$ is an average magnitude of the velocity of a traveling particle with respect to the plurality of nearby passed particles, and $[P_c v_{rel}]_{max}$ is a highest value of product of $P_c v_{rel}$ in the model gas system.

Here we have recognized that if a period with a pre-established dynamic history is less than the approximate reliable period then not all possible property flux or information from the "past" ($t<t_0$) will be reliably transported in the "future" ($t \geq t_0$). Therefore, the period of the pre-established dynamic history is set to be not less than the approximate reliable period of time, $\varphi_{i0}^{rel}$.

Adding to steps S103A, S104, and S105 of steps S103B and S103D will provide defining the property balance equation for the model gas system with gas-solid interfaces revealing a purely diffuse scattering of the particles in the "open channel" geometry.

FIG. 6 shows schematically a one-dimensional model gas system, in which the main control volume of the unit length volume $dV = \Delta x \Delta y$ is at y within the model gas flow confined by two parallel plates at $y_{b1}$ and $y_{b2}$ and having normal vectors $n_{b1}$ and $n_{b2}$, respectively, that are directed toward the confined model gas. Here we assume diffusive scattering with no adsorption effects after colliding with the surface.

For further clarity, the property balance of model gas flow in one-dimensional configuration with a lack of the external field of force in the y-direction ($B_{in}^{\Psi g\_FS} = 0$) is analyzed.

In this, the step S103 of defining the net rate of property influx per unit volume from the surrounding model gas system, $B_{in}^{\Psi\_FS}$, includes, for example, a step of representing $B_{in}^{\Psi\_FS}$ by applying Equation (82) given below:

$$B_{in}^{\Psi\_FS} = B_{in}^{\Psi\lambda\_F} + B_{in}^{\Psi\lambda\_bd1} + B_{in}^{\Psi\lambda\_bd2} + \dot{Q}_\Psi, \quad (82)$$

where $B_{in}^{\Psi\lambda\_F}$, $B_{in}^{\Psi\lambda\_bd1} + B_{in}^{\Psi\lambda\_bd2}$, and $\dot{Q}_\Psi$ are the net rate of property influxes calculated by performing steps S103A, S103B, and S103D, respectively.

In this embodiment, formulation of the integral form of the property balance equation in a one-dimensional model gas system having boundaries with diffuse scattering from model gas-surface interfaces includes applying Equation (83) given below, which is obtained from Equation (75) by substitution of it's the first left-hand term by Equation (82):

$$B_{in}^{\Psi\lambda\_F}(y, t) + B_{in}^{\Psi\lambda\_b1}(y, t) + B_{in}^{\Psi\lambda\_b2}(y, t) + \dot{Q}_\Psi(y, t) = \quad (83)$$

$$B_{out}^{\Psi\_FS}(y, t) + \frac{\partial}{\partial t}[n(t, y)\Psi_\lambda(t, y)],$$

which further expands by substitution of the first, second, and the third left-hand terms by Equations (38), (49), and (50), respectively, and by substitution of the first right-hand terms by Equation (73):

$$-\frac{1}{2}\frac{\partial}{\partial y}\int_{y_{b2}}^{y_{b1}}Q_i(t,t'_i)Z_V(t'_i,y')\frac{v(t'_i,y',t,y)}{v_T(t'_i,y')}\Psi_{in}(t'_i,y',t,y)dy'-\qquad(84)$$

$$\frac{\partial}{\partial y}\bigg[Q_{ib}(t,t'_{ib1})Z_b(t'_{ib1},y_{b1})\frac{v_{b1}(t'_{ib1},y_{b1},t,y)}{v_{Tb}(t'_{ib1},y_{b1})}$$

$$\Psi_{\lambda b1}(t'_{ib1},y_{b1},\lambda,\varphi_{ib1})\bigg]-$$

$$\frac{\partial}{\partial y}\bigg[Q_{ib}(t,t'_{ib2})Z_b(t'_{ib2},y_{b2})\frac{v_{b2}(t'_{ib2},y_{b2},t,y)}{v_{Tb}(t'_{ib2},y_{b2})}$$

$$\Psi_{\lambda b2}(t'_{ib2},y_{b2},\lambda,\varphi_{ib2})\bigg]+\dot{Q}_\Psi(y,t)=$$

$$\frac{1}{2}\bigg\{\frac{\partial}{\partial y}[n(t,y)Q_+(t'_a,t)v_+(t,y,t'_a,y')\Psi_\lambda(t,y,t'_a,y')]\bigg\}_{y'\to y}+$$

$$\frac{\partial}{\partial t}[n(t,y)\Psi(t,y)]$$

In the stable model gas system not affected by the external field of force, with model gas confined between two infinite parallel plates having gas-solid interfaces with identical mixed diffuse and specular scattering components, formulating the property balance includes applying Equation (85) given below:

$$B_{in}^{\Psi\_F}+B_{in}^{\Psi0\_F\_bs1}+B_{in}^{\Psi0\_F\_bs2}+\dot{Q}_\Psi(t,y)=\qquad(85)$$

$$\frac{1}{2}\bigg\{\frac{\partial}{\partial y}[n(t,y)Q_+(y,y')v_+(y,y')\Psi(y,y')]\bigg\}_{y'\to y},$$

which is obtained by substitution of Equations (73) and (59) in Equation (75) and considering that $$\frac{\partial}{\partial t}[n(t,y)\Psi(t,y)]=0.\qquad(86)$$

The present analytical tools and method are further described by way of the following one-dimensional fluid flow computer simulations accompanied by corresponding comparative analytical solutions, which are provided by way of illustration and are not intended to limit the present invention. Lastly, additional analytical tools needed to simulate fluid flows in the three-dimensional configuration are provided.

These embodiments are limited to a one-dimensional model gas system including incompressible model gas at a uniform temperature with no external field of the force applied in y direction. The present invention, however, is not limited to the case, but can be preferably applied to two- and three-dimensional configurations of the model gas system with no limitations mentioned above. The method can also be generalized to the model gas flow affected by the external field of force with no difficulty.

In these simulations and computations, consideration has been made that transported properties that are not vulnerable to any aging process. By other words, the property acquired by each particle in a point at the time of the preceding collision delivered unchangeable in the point of the following collision. However, the method can be generalized to the transport of property/properties having limited life expectancy with no difficulty.

FIG. 6 illustrates the diversity of ballistic trajectories of particles involving in the property transport by the present method in one-dimensional configuration. Ballistic trajectories 603 and 606 show movement of particles in the positive direction. Ballistic trajectories 601 and 605 show movement of the particles in the negative direction. Ballistic trajectories 601 and 603 show movement of particles from the model gas volume into targeting point, y. Ballistic trajectories 605 and 606 show movement of particles from plate 615 and plate 616, respectively, into targeting point y.

Usually, the magnitude of thermal velocity of the particles is much higher than the magnitude of mass flow velocity vector u along the y-direction, namely, $|u|<<v_T$.

The following Table 2, referring to FIG. 6, summarizes symbols and their meanings, which are applicable to the simulations and calculations described below with additional reference to the figures and the specification.

TABLE 2

| Symbol | Value | Short description |
|---|---|---|
| $v_T$ | constant | uniform temperature; thermal velocity is uniform within the model gas system |
| n | constant | particle density |
| $\sigma_c$ | constant | the cross-section of collisions |
| $\lambda$ | 0 | aging or decay coefficient |
| u | 0 | mass flow velocity along y axis |
| $n_i$ | $\dfrac{y-y'}{|y-y'|}$ | arbitrary unit vector with point of origin y' |
| v | $v_T n_i$ | the velocity of the particle in point y' |
| $n_+$ | $\dfrac{y'-y}{|y'-y|}$ | arbitrary unit vector with the point of origin y |
| $v_+$ |  | the velocity of the particle reaching point y' after its original collision in point y at time t |
| $v_{rel}$ | $v_T$ | the average magnitude of the relative velocity at the uniform temperature |
| ZV = ZV' | $\frac{1}{2}nP_c v_{rel}$ | the rate of collisions per unit volume per unit time or the particle flux production strength |
| $P_c$ | $\sigma_c n$ | the number of particles within a collision tube of a unit length |
| $Q_i$ | $\exp(-P_c|y-y'|)$ | the probability of ballistic traveling between y' and y |
| $Q_+$ | $\exp(-P_c|y'-y|)$ | the probability of ballistic traveling between y and y' |
| $y_{b1}$ | = H | position vector of plate 615 |
| $y_{b2}$ | = 0 | position vector of plate 616 |
| $n_{b1}$ | = −1 | the normal vector to plate 615 |
| $n_{b2}$ | = +1 | the normal vector to plate 616 |
| $n_{ib1}$ | = −1 | direction vector of the particle scattered from plate 615 |
| $n_{ib2}$ | = +1 | direction vector of the particle scattered from plate 616 |
| $v_{Tb1}, v_{Tb2}$ | $v_{Tb1}=v_{Tb2}=v_T$ | the magnitude of the velocity of particles scattered from being at rest plate 615 and plate 616 at the uniform temperature |
| $v_{b1}$ | $v_T n_{ib1}$ | velocity vector of the particle scattered from plate 615 |
| $v_{b2}$ | $v_T n_{ib2}$ | velocity vector of the particle scattered from plate 616 |
| $Z_{b1}=Z_{b2}$ | $\dfrac{Z_V}{2P_c}$ | the rate of collisions on plate 615 or plate 616 at the uniform temperature |
| $Q_{ib1}$ | $\exp(-P_c(H-y))$ | the probability of ballistic traveling from $y_{b1}$ = H to y |
| $Q_{ib2}$ | $\exp(-P_c y)$ | the probability of ballistic traveling from $y_{b2}$ = 0 to y |

TABLE 2-continued

| Symbol | Value | Short description |
|---|---|---|
| $t_{ib2}'$ | $t - \dfrac{y}{v_T}$ | the time of scattering from plate 616 for the particle targeting point y and time t |
| $t_i'$ | $t - \dfrac{|y - y'|}{v_T}$ | the time of an original collision in point y' |
| $\varphi_i'$ | $\dfrac{|y - y'|}{v_T}$ | a traveling period needed to travel from y' to y |
| $\varphi_{ar}'$ | $\dfrac{y'}{v_T}$ | a traveling period needed for the converging ballistic particle to deliver property from plate 616 to point y' |
| $\varphi_{ar}$ | $\dfrac{y}{v_T}$ | a traveling period needed for the converging ballistic particle to deliver property from plate 616 to point y |
| $\Psi_{ob2}$ | | the value of the property obtained by a diffusively scattered particle from plate 616. |

To formulate a general integral form of the property balance adapted to a particular model gas system in a general non-moving point y at the given time, t, there is need to perform the following.

First, a trajectory and associated with it an appropriate instant unit vector directing thermal velocity component, the point of the original collision in y', the time, $t_i'$, of the original collision are formulated. This is done by the steps of:

(1) formulating the velocity of the particle along y-direction arriving in point y at time t is calculated from Equations (87) given below, which is obtained from Equation (16):

$$v(t,y) = v_T n_i, \qquad (87)$$

where $n_i$ a unit is vector of arbitrary direction and is expressed:

$$n_i = \frac{y - y'}{|y - y'|}; \qquad (88)$$

(2) determining the position of the particle at traveling time $\tilde{t}$ is calculated from Equation (89) given below, which is obtained from Equation (10):

$$\tilde{y} = y' + v_T(\tilde{t} - t_i') n_i = v_T \tilde{t} + y' - v_T t_i' \qquad (89)$$

for the particles traveling in the positive direction and $$\tilde{y} = y' - v_T(\tilde{t} - t_i') = -v_T \tilde{t} + y' + v_T t_i' \qquad (90)$$

for the particles traveling in the negative direction.

(3) determining ballistic traveling time from point y' to point y, $\varphi_i$, by applying Equation (91) given below, which is obtained from Equation (12) in which the impacts of g and u are neglected:

$$\varphi_i = \frac{|y - y'|}{v_T}, \qquad (91)$$

(4) finding the departing time of the particle at y', $t_i'$, which is calculated from Equation (92) given below:

$$t_i' = t - \varphi_i; \qquad (92)$$

Second, probability function quantifying the probability of the ballistic traveling along the ballistic trajectory is formulated.

Here, upon recognizing the magnitude of the relative velocity between the component of the mass flow velocity of the traveling and nearby passed particles is insignificant in comparison with the magnitudes of thermal velocities of the particles, we obtain:

(1) the average magnitude of relative velocity between the particles at the uniform temperature is calculated from Equation (93) given below, which is obtained from Equation (30):

$$v_{rel} = v_T; \qquad (93)$$

(2) the survival probability that a particle will have traveled along the ballistic trajectory in incompressible model gas at the uniform temperature from y' and y is calculated from Equation (94) given below, which is obtained by substitution of Equation (93) in Equation (21) and considering that $P_c$=constant:

$$Q_i(y,y') = \exp(-P_c|y - y'|); \qquad (94)$$

(3) the survival probability, $Q_{ib1}(y, H)$, that a particle will have traveled along the ballistic trajectory in incompressible model gas at the uniform temperature from $y_{b1}$=H and y is calculated from Equation (95) given below:

$$Q_{ib}(t,t_{ib}') = Q_{ib1}(y,H) = \exp(-P_c(H-y)); \qquad (95)$$

(4) the survival probability, $Q_{ib2}(y, 0)$, that a particle will have traveled along the ballistic trajectory in incompressible model gas at the uniform temperature from $y_{b2}$=0 and y is calculated from Equation (95) given below:

$$Q_{ib}(t,t_{ib2}') = Q_{ib2}(y,0) \exp(-P_c y). \qquad (96)$$

Third, a functional representation of property being transported by ballistic particles is adapted to the particular model gas system, which is characterized by uniform temperature and lack of external field of force and internal aging processes. Equation (7) is modified as:

$$\Psi_{in}(t_i',y',t,y) = \Psi_0(t_i',y') \qquad (97)$$

For clarity, the value of property on the upper plate 615, is chosen to be $$\Psi_{ob1} = 0; \qquad (98)$$

The value of property on the lower plate 616 is defined as:

$$\Psi_{ob2} = \Psi_{ob2-}[t_{ib2}' < t_0] \Psi_{ob2+}[t_{ib2}' \geq t_0], \qquad (99)$$

where $t_0$ is an initial time for the model gas system, which is associated with a time of modification of property $\Psi_{ob2}$ on the gas-solid interface of plate 616. We have recognized that scattered from plate 616 diffuse particles will travel and initiate modification of property $\Psi_0(t_i', y')$ upon arriving in point y'. Symbolically, this is expressed according to Equation (100), which is obtained by substitution of $t_{i0} = t_0 + \varphi_{ar}'$ in Equation (9):

$$\Psi_0(t_i',y') = \Psi_{0-}(t_i',y')[t_i' < t_0 + \varphi_{ar}'] + \Psi(t_i',y')[t_i' \geq t_0 + \varphi_{ar}'] \qquad (100)$$

Finally, a modified integral form of the property-balance equation, adapted to a particular model gas system, is formulated. Specifically, for incompressible model gas expanding in y-direction between parallel infinite plates being spaced at a distance H in the open channel geometry at the uniform temperature the modified integral for of the property-balance equation is formulated by Equation (101) given below, which is obtained by substitution of symbols or corresponding values of Table 2 and of Equations (87)-(100) in Equation (84), then executing differentiation while considering that y'≠y:

$$n\frac{\partial}{\partial t}[\Psi(t, y)] + Z_V \Psi(t, y) = \quad (101)$$

$$-\frac{1}{2}Z_V \frac{\partial}{\partial y} \int_0^H \exp(-P_c|y - y'|)\Psi_{0-}(t'_i, y')[t'_i < t_0 + \varphi'_{ar}]dy' +$$

$$\frac{Z_V}{2}\exp(-P_c y)[\Psi_{0b2-}[t'_{ib2} < t_0] + \Psi_{0b2+}[t'_{ib2} \geq t_0]] -$$

$$\frac{1}{2}Z_V \frac{\partial}{\partial y} \int_0^H \exp(-P_c|y - y'|)\Psi(t'_i, y')[t'_i \geq t_0 + \varphi'_{ar}]dy'$$

In the equation above, the first right-hand term quantifies a pre-established rate of the property influx formed by converging ballistic particles, each delivering property obtained from a corresponding point source being advanced to the initial time. The second right-hand term quantifies a pre-established rate of the property influx formed by converging ballistic particles, each delivering property obtained from a corresponding heterogeneous point source on the gas-solid interface of plate 616. The third right-hand term formulates a rate of the property influx formed by converging ballistic particles, each delivering property obtained from a corresponding point source being the same as or later than the initial time.

In some embodiments, the step of forming the integral property balance equation further includes an approximating step of approximating the integral property balance equation by neglecting the first term of the temporal rate of the property change.

Specifically, if in the general non-moving point at the given time, a temporal rate of the property change per unit volume is negligible compared to the rate of collisions in the general non-moving point, which is true in majority of realistic conditions in the model gas system, then Equation (101) is reduced to:

$$\Psi(t, y) \cong \frac{1}{2}P_c \int_0^H \exp(-P_c|y - y'|)\Psi_{0-}(t'_i, y')[t'_i < t_0 + \varphi'_{ar}]dy' + \quad (102)$$

$$\frac{1}{2}\exp(-P_c y)[\Psi_{0b2-}[t'_{ib2} < t_0] + \Psi_{0b2+}[t'_{ib2} \geq t_0]] +$$

$$\frac{1}{2}P_c \int_0^H \exp(-P_c|y - y'|)\Psi(t'_i, y')[t'_i \geq t_0 + \varphi'_{ar}]dy'$$

A step of formulating a solution for the first approximation of a modified integral form of the property-balance equation includes steps of:

(1) modify Equation (101) by assignment, in the last right-hand term of $$\Psi = 0, \quad (103)$$

which is a zero approximation for a solution of Equation (101);

(2) resolve the modified Equation (101) and obtain a solution $\Psi_1(t, y)$ for each of a plurality of points in space occupied by the model gas, which quantify established effects of external fields capable to modify the property content, prehistoric conditions of the model gas flow, and an established effect of an available gas-solid interface. Based on Equation (102), the first approximation, $\Psi_1(t, y)$, has a form:

$$\Psi_1(t,y) \cong \frac{1}{2}P_c \int_0^H \exp(-P_c|y-y'|)\Psi_{0-}(t'_i,y')[t'_i < t_0 + \varphi'_{ar}]dy' + \frac{1}{2} \exp(-P_c y)[\Psi_{0b2-}[t'_{ib2} < t_0] + \Psi_{0b2+}[t'_{ib2} \geq t_0]] \quad (104)$$

A step of formulating a solution for a $k^{th}$ approximation of a modified form of the property-balance equation includes presenting an approximated solution for the $k^{th}$ approximation, $\Psi_k(t, y)$, for each of the plurality of points of the space occupied by the model gas in such form that the left-hand of an equation defines $k^{th}$ approximation that $\Psi_k(t, y)$ and the right-hand of the equation is defined by $(k-1)^{th}$ approximation, which has been obtained in the preceding cycle of the approximation, which is explained symbolically by Equation (105) given below:

$$\Psi_k(y,t) = \Psi_1(y,t) + \Psi_{ak}(y,t), \quad (105)$$

where $\Psi_{ak}(y, t)$ is an adjustment to the first approximation of velocity $\Psi_1(y, t)$, which is associated with the mutual effect of the property exchange between particles surrounding point y at time t, which is expressed as follows $$\Psi_{ak}(y,t) = \frac{1}{2}P_c \int_0^H \exp(-P_c|y-y'|)\Psi_{k-1}(t'_i,y')[t'_i \geq t_0 + \varphi'_{ar}]dy', \quad (106)$$

The property value in a specific point of space occupied by the model gas at the given time results from the impact of both the rate of property influx formed by particles being directly scattered from confining one or more of gas-solid interfaces and the rate of property influx formed by particles that have acquired the property from each of their preceding collision being within the space occupied by the model gas.

7. Performing Flow Calculation

The step S107 of performing flow calculation is further embodied in these two numerical simulations and comparative two analytical calculations, which are provided for the illustration of the invention and are construed not to limit the scopes of the invention. Simulation 1 and Simulation 2 of the following section provide detailed steps of computation of velocity profiles in the one-dimensional incompressible flow. However, the method can be generalized to the three-dimensional model gas with no difficulty.

Embodiments within the scope of the present invention also include computer program means including the computer readable medium having represented in that program code means. Program code means includes executable instructions and data that cause a computer to perform a certain function of a group of functions either directly or by conversion to another language including reproduction in a different material form. All these simulations suggest the applicability of the innovative analytical tools to construct specific Computational Fluid Dynamics models.

A method for modeling transport processes and computerized simulating the flow of the model gas includes, for example, steps of:

establishing an initial time, where the initial time is treated as a time of a specific modification of the model gas system in a specific location including specific modification of one or more of temperature, the velocity of the gas-solid interface, and application of an external field that modifies property content;

specifying the given time, where the given time is greater than or equal to the initial time;

specifying the model gas system, where the model gas system is specified by defining model gas properties including gas material, pressure, and temperature and by establishing a geometry model, where establishing the geometry model includes setting geometry and boundary conditions during a period from a pre-initial time until the given time;

establishing discretization parameters including a set of discretization points in space occupied by the model gas, where the set of discretization points includes a set of non-moving points;

calculating, for each of the set of discretization points in space occupied by the model gas, a local initial time, where the local initial time is greater than or equal to the initial time;

obtaining, for each of the set of discretization points in space occupied by the model gas at a given advanced time, which is ahead of the local initial time, a past property content, where the past property value is obtained by calculations or by measurements;

formulating, for each of the set of discretization points at the given time, an approximated integral form of property balance, where the approximated integral form of property balance is established in a way that, in a selected point of the set of discretization points at the given time, a net rate of property influx per unit volume from the model gas system, which is formed by a set of converging ballistic particles and calculated by summing a rate of property influx from the set of discretization points surrounding the selected point is equated to a net rate of property efflux per unit volume from the selected point of the set of discretization points, where the set of converging ballistic particles converging in the selected point of the set of discretization points at the given time includes a first set of converging ballistic particles and a second set of converging ballistic particles, each of the first set of converging ballistic particles delivers one or more of past property contents from the model gas system and each of the second set of converging ballistic particles delivers one or more of present property contents, where each of present property contents, $\Psi$, is obtained from a corresponding point of original collisions at a time being greater than or equal to the local initial time, where $\Psi$ is treated as a variable; and resolving with respect to the variable, for each of the set of discretization points in space occupied by the model gas, the approximated integral form of property balance and calculating the value of the transported property, where resolving and calculating is performed by an approximation method including a successive approximation method.

Figure 15:
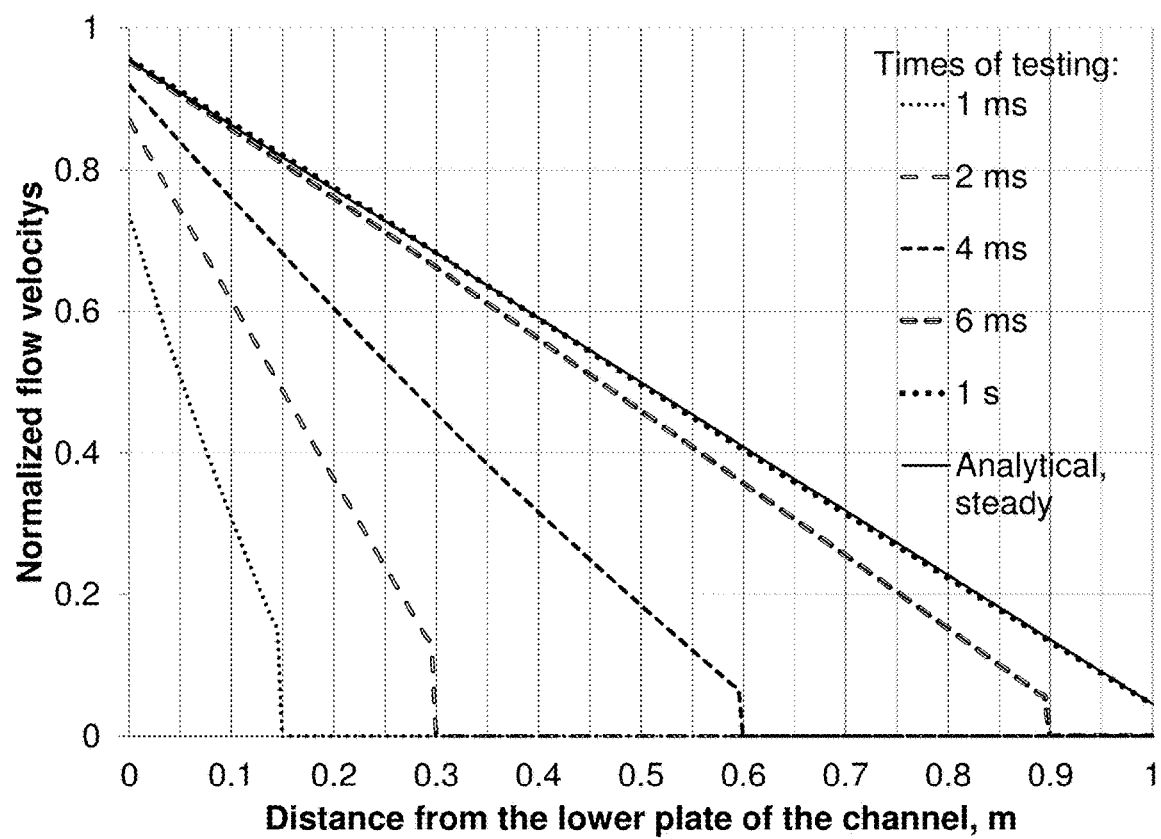
FIG. 15 is a chart showing the solutions providing the velocity profiles across between the parallel plates at different moments of time and a comparative analytical solution of a steady-state velocity profile.
Figure 16:
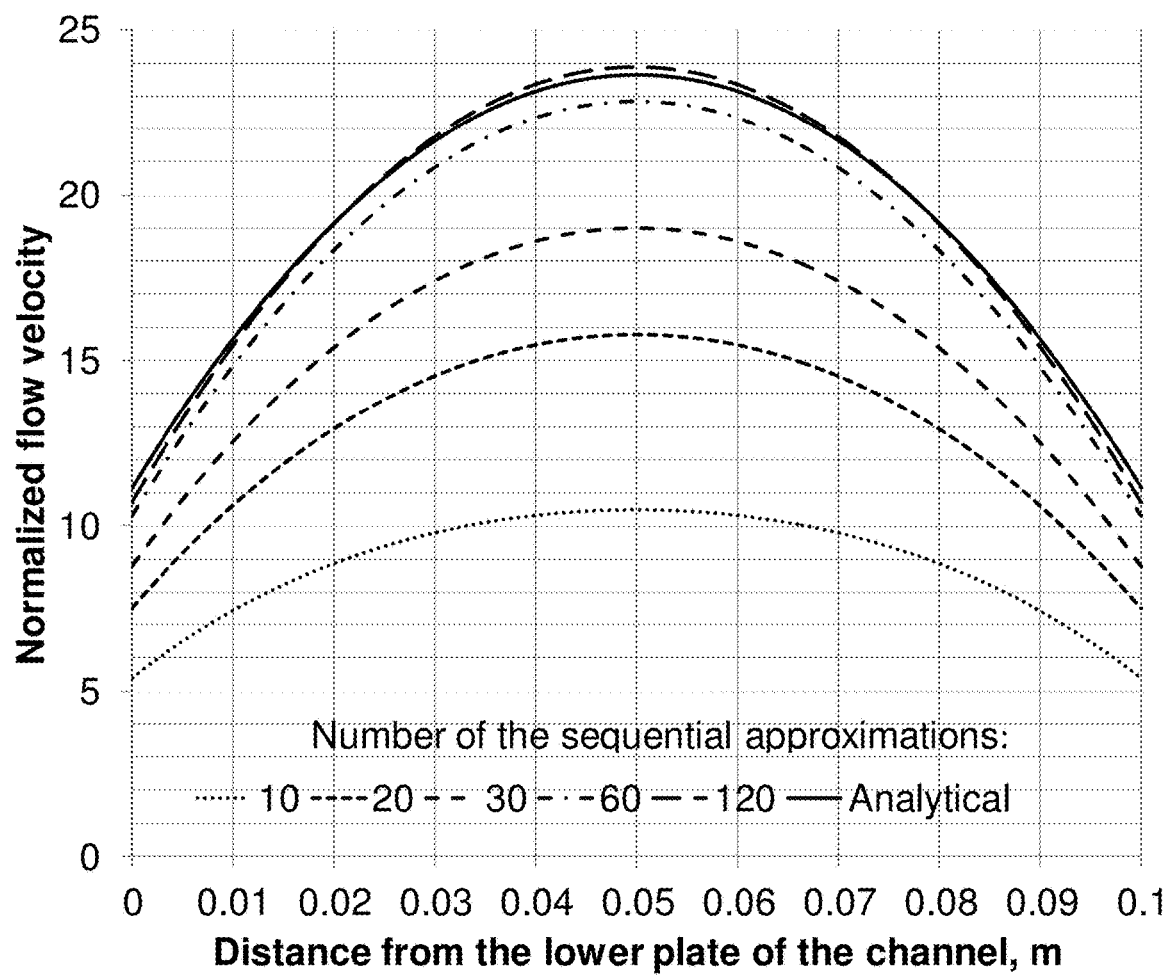
FIG. 16 is a chart showing the solutions for the stable velocity profile across between the parallel plates at different numbers of the sequential approximations with mixed diffuse and specular scattering from the plates and a comparative analytical solution.

Specific examples of the execution of velocity profile in model gas using Microsoft Visual Basic for Applications with Excel and computed on a PC are shown in FIG. 15 and FIG. 16.

Figure 14:
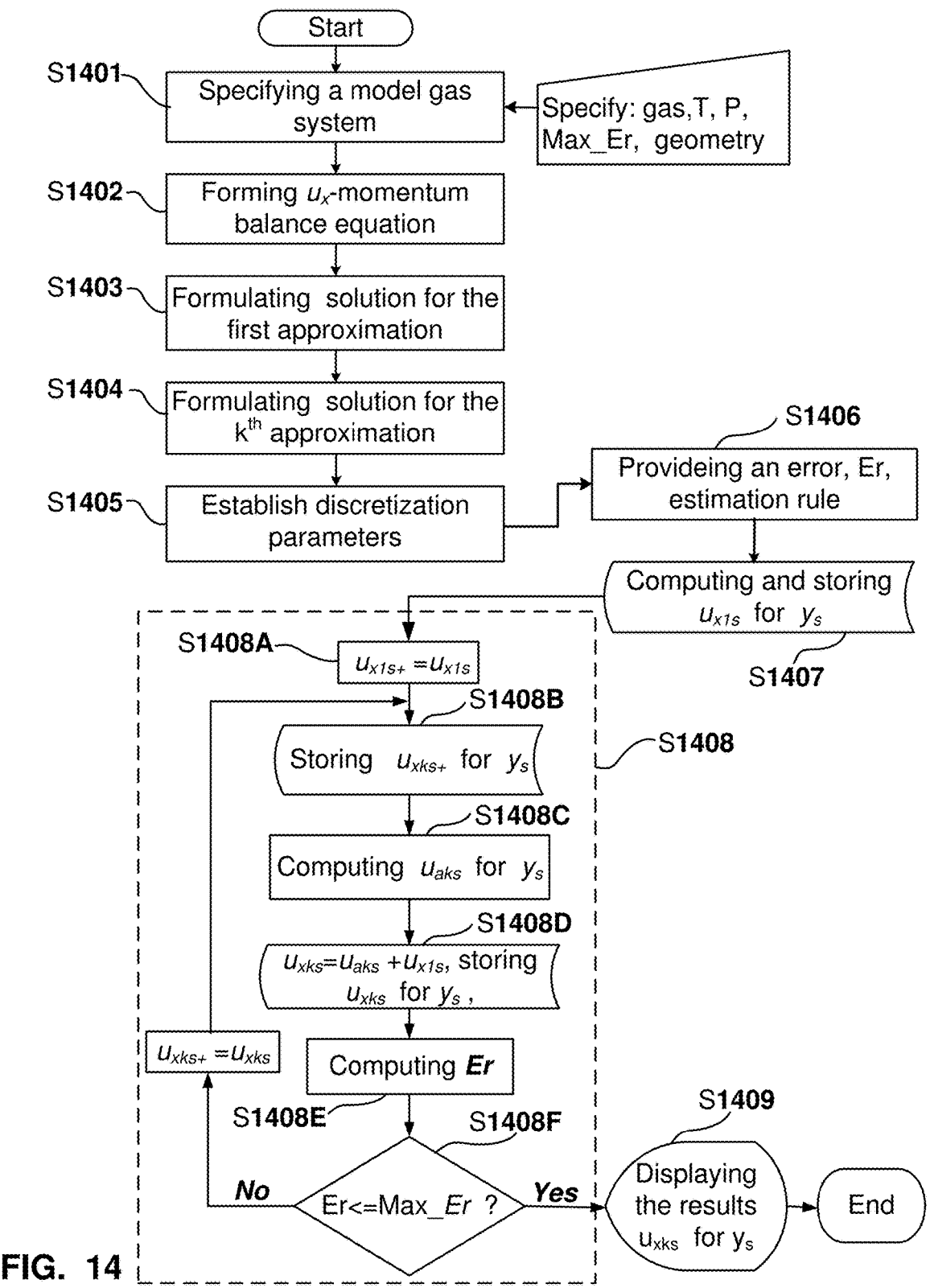
FIG. 14 is a flowchart of the flow calculation by the numerical method.

FIG. 14 is an example of a flowchart of the flow calculation by the numerical method. The numerical method of flow calculation includes the application of the computer and is applicable to both Simulation 1 and Simulation 2. The numerical calculation, for example, includes steps of:

specifying the model gas system (S1401);

forming $u_x$-momentum balance equation (S1402);

formulating a solution for the first approximation (S1403);

formulating a solution for the $k^{th}$ approximations (S1404);

establishing discretization parameters (S1405);

providing an error estimation rule (S1406);

computing and storing the values for the first approximation $u_{x1s}$ for corresponding $y_s$, as an array (S1407):

executing computation by the sequential approximations (S1408); and displaying the results (S1409).

7.1 Simulation 1

In the first simulation, Simulation 1, transient plane Couette flow is calculated.

FIG. 6 is a schematic view in section of a Newtonian model gas between parallel infinite plates in the open channel at uniform temperature and no external field of force applied in y direction and a lack of an internal aging process, namely, $\lambda=0$, each particle conserves properties acquired by it at a point and time of the original collision and deliver that properties unchanged to another location upon its final collision with another particle in a point sink. The following simulation is shown to illustrate the inventive approach in determining velocity profiles $u_x(y, t)$ or velocity distribution across the space between the plates.

A simulation is performed for incompressible model gas expanding in the y-direction between parallel infinite plates being spaced at the distance H in the open channel at the uniform temperature where the top and bottom plates and the model gas are initially at rest. Then, at time $t_0=0$ the bottom plate starts a sudden movement in x-direction along its plane with constant speed $v_{x0}$. The velocity profile induced in the model gas due to sudden motion of the bottom plate 616 is to be determined. Referring to FIG. 14, more detailed description of the steps of performing flow calculation by the computer is given below.

Step S1401 of specifying the model gas system, for example, is given:

Referring again to FIG. 6 showing a schematic view in section of a Newtonian model gas between parallel infinite plates in the open channel at a uniform temperature, a case when the top and bottom plates and the liquid are initially at rest is considered. For simplicity, the particles are considered to have a unit mass.

These parameters describing the model gas system are specified:

kind of model gas (providing a mass of molecules, effective cross-section of the collisions);

T, pressure P;

the distance between parallel plates, H;

the magnitude and direction of the velocity of the bottom plate in x-direction, which begins the movement at time $t \geq 0$ with constant velocity $v_{x0}$; and allowable error of computation, Max_Er.

The upper plate is at rest, which implies that the velocity of the upper plate in x-direction is zero, namely, $v_{xH}=0$. At time $t<0$ the incompressible model gas had uniform temperature T and pressure P.

Step S1402 of forming $u_x$-momentum balance equation includes, for example, steps of:

(1) defining $u_{x0}$ momentum, which is acquired by each particle in a point during its preceding collision and transported into a point of the following collision at the given includes applying Equation (107) given below, which is obtained by substitution in Equation (100) of $\Psi_0 \equiv u_{x0}$, $\Psi_{0-} \equiv u_{x0-}=0$, a predetermined initial or prehistoric x-momentum in each point y' at the time of the departure $t'_i<0$ and $\Psi \equiv u_x$, the x-momentum in each point y' at the time of the departure $t_i \equiv t'_i \geq 0$, which is a function to be determined:

$$u_{x0}(t'_i, y') = u_x(t'_i, y')[t'_i \geq 0]; \qquad (107)$$

(2) defining momentum, which is acquired by each particle in a point of its preceding diffuse scattering from the gas-solid interface of the confining plate 615 and transported into a point of the following collision at the given time includes applying Equation (108) given below:

$$\Psi_{ob2} = v_{x0}[t'_{ib2} \geq 0], \quad (108)$$

The upper plate 615 is at rest all time, which implies that $$\Psi_{ob1} \equiv v_{xH} = 0; \quad (109)$$

(3) forming an integral form of the $u_x$ momentum balance equation applied to a specific point in space at the given time includes applying Equation (110) given below, which is obtained by substitution in Equation (101) of $\dot{Q}_\Psi = 0$, and $\Psi_0 \equiv u_x(t'_i, y')[t'_i \geq 0]$, $\Psi_{ob1} = 0$, and $\Psi_{ob2} = v_{x0}[t'_{ib2} \geq 0]$ in the right-hand of the equation and $\Psi_0 \equiv u_x$, in the left-hand of the equation:

$$n\frac{\partial}{\partial t}u_x(t,y) + Z_V u_x(t,y) = +\frac{Z_V}{2}v_{x0}\exp(-P_c y)[t'_{ib2} \geq 0] + \quad (110)$$
$$\frac{1}{2}Z_V P_c \int_0^H \exp(-P_c|y-y'|)u_x(t'_i,y')[t'_i \geq t_0]dy'$$

The equation above is further reduced by executing some algebra operation, which results in:

$$\frac{\partial}{\partial t}u_x + \frac{Z_V}{n}u_x = \quad (111)$$
$$\frac{Z_V}{2n}P_c \int_0^H \exp(-P_c|y-y'|)u_x(t'_i,y')[t'_i \geq 0]dy' + g_0(y,t)$$

where a is a frequency factor quantified as $$a = \frac{Z_V}{n} = \frac{1}{2}P_c v_T, \quad (112)$$

and $$g_0(y,t) = \frac{a}{2}v_{x0}\exp(-P_c y)H\left(t - \frac{y}{v_T}\right), \quad (113)$$

Step S1403 of formulating solutions for the first approximation includes, for example, steps of:

(1) assigning in the first right-hand term of Equation (111)

$$u_x = 0, \quad (114)$$

which is zero approximation for the velocity of each particle surrounding point y, and which results in a reduction of Equation (111) to $$\frac{\partial}{\partial t}u_{x1} + au_{x1} = g_0(y,t) \text{ with } u_{x1}(y,t=0) = 0 \quad (115)$$

(2) formulating a solution of the equation above by applying Equation (116):

$$u_{x1}(y,t) = \exp(-at)\int_0^t \exp(as)g_0(y,s)ds \quad (116)$$

which upon integration results in:

$$u_{x1}(y,t) = \frac{1}{2}v_{x0}\exp(-P_c y)\left[t - \frac{y}{v_T} \geq 0\right]\left\{1 - \exp\left(-\frac{1}{2}P_c v_T\left(t - \frac{y}{v_T}\right)\right)\right\}; \quad (117)$$

Step S1404 of formulating solutions for the $k^{th}$ approximation includes, for example, steps of:

(1) modifying the $u_x$-momentum balance equation shown by Equation (111) in such form that u, in the left-hand of the equation defines $k^{th}$ approximation, $u_{xk}$, and $u_x(t'_i, y')$ in the right-hand of the equation defines $(k-1)^{th}$ approximation, $u_{x(k-1)}$, so Equation (111) is modified to $$\frac{\partial}{\partial t}u_{xk} + au_{xk} = g_{(k-1)+}(y,t) + g_0(y,t), \quad (118)$$

where $$g_{(k-1)+}(y,t) = \quad (119)$$
$$\frac{a}{2}P_c \int_0^H \exp(-P_c|y-y'|)u_{x(k-1)}(t'_i,y')\left[t'_i - \frac{y'}{v_T} \geq 0\right]dy',$$

where $g_0$ (y, t) is a well-defined function at any y and t, which defines established effects of both external fields and prehistoric conditions of the model gas and model gas flow and $g_{(k-1)+}(y, t)$ is a function characterizing the effect from the events of the original collisions taken place following the initial time;

(2) presenting an approximated solution for the $k^{th}$ approximation, $u_{xk}$, for each point of the space occupied by the model gas by Equation (120) given below:

$$u_{xk}(y,t) = u_{x1}(y,t) + u_{ak}(y,t), \quad (120)$$

where $u_{ak}(y, t)$ is the adjustment to the first approximation of velocity $u_{x1}(y, t)$, which is associated with the mutual effect of the momentum exchange between particles surrounding point y at time t, which is expressed as follows $$u_{ak}(y,t) = \frac{1}{2}\int_0^H \exp(-P_c|y-y'|)u_{x(k-1)+}(t'_i,y')\left[t'_i - \frac{y'}{v_T} \geq 0\right]dy'. \quad (121)$$

Equation (121) is obtained by analytical integration. However, numerical integration of a general function $g_0$ (y, t) over the time can be performed with no difficulty, as apprehended by those skilled in the art.

Step S1405 of establishing discretization parameters includes, for example, steps of:

specifying discretization parameters including the dimension of the system for calculation [0, H], the number of space intervals S, testing time t, and the number of time intervals j; and dividing the space intervals [0, H] into S equal parts of length l, so that, for $y_s \equiv y' = sl > y$, the range is divided as $y = y_s < y_{s+1} < \ldots < y_s = H$ and, for $y_s = sl < y$, the range is divided as $0 = y_0 < y_1 < \ldots < y_s = y$. Analogously, the time interval [0, t] is divided into j equal parts of length h: $0 = t_0 < t_1 \ldots < t_s < \ldots < t_j = t$. In the above, s is the index of a discretization point positioned in y'.

Step S1406 of providing an error estimation rule includes, for example, a step of providing the error estimation rule for $k^{th}$ cycle of the sequential approximation from Equation (122) given below $$Er = \sqrt{\frac{1}{S}\sum_1^S \left(\frac{u_{ak}(y_s,t) - u_{a(k-1)}(y_s,t)}{u_{xk}(y_s,t)}\right)^2}, \quad (122)$$

Step S1407 of computing and storing the values $u_{x1s}(y_i, t)$ for corresponding $y_s$ as an array includes, for example, presenting Equation (121) in a discrete form by computing the values $u_{x1s}$ for corresponding $y_i$ surrounding point y:

$$u_{x1s} = \frac{1}{2} v_{x0} \exp(-P_c y_s)\left[t'_i - \frac{y_s}{v_T} \geq 0\right]\left[1 - \exp\left(-\frac{1}{2} P_c v_T\left(t'_i - \frac{y_s}{v_T}\right)\right)\right]. \quad (123)$$

Step 1408 of executing computation for each cycle k of the sequential approximations includes, for example, steps of:

assigning $u_{xks+}=u_{x1s}$ (S1408A);

storing the values of $u_{xks+}$ for corresponding $y_s$ (S1408B);

computing $u_{aks} \equiv u_{ak}(y_s, t)$ for corresponding $y_s$ according to Equation (121) (S1408C);

computing $u_{xks}=u_{aks}+u_{x1s}$ according to Equation (120) and storing the values of $u_{xks}$ for corresponding $y_s$ (S1408D);

computing Er according to Equation (122) given above (S1408E);

defining a condition for ending approximations (S1408F), where If Er>Max_Er, assigning $u_{xks+}=u_{xks}$, and go to (S1408B) and if ≤Max_Er the cycle of the sequential approximations is stopped, then copying $u_{xks}$ for corresponding $y_s$, and displaying the results of computation (S1409).

The sign + in the subscript indicates that the function is used for the following integration with y' as an argument.

FIG. 15 is a chart showing the velocity profiles across between the plates at different moments of time, which are obtained by a computer simulation performed under the steps listed above, and a comparative analytical velocity profile, which is obtained independently by using the analytical tools disclosed in the specification for simplified stable conditions involving incompressible gas at the uniform temperature. As shown, the result of 160 sequential approximations computed according to Simulation 1 for the testing time t=100 ms substantially coincides with the analytical velocity profile. The computer simulation and analytical calculation were made for the nitrogen gas flow in a channel confined by parallel plates spaced at the distance of 1 meter at the uniform temperature of 300K and pressure of 0.6 Pa.

7.2 Simulation 2

In the second simulation, Simulation 2, the steady velocity profile across between the parallel plates with mixed diffuse and specular particles scatterings from the plates being at rest is calculated.

The particular embodiment is limited to a simulation of incompressible stable model gas flow confined in the y-direction between parallel infinite plates at a uniform temperature with no external field of the force applied in y-direction where the top and bottom plates are at rest. However, the method can be generalized to the model gas flow affected by the external field of force or kept at non-uniform temperature with no difficulty, as apprehended by those skilled in the art. The pressure gradient is constant along the model gas flow in he x-direction. The velocity profile induced in the model gas due the pressure gradient is to be determined. Referring to FIG. 14, more detailed description of the steps of performing flow calculation by the computer is given below.

Step S1401 of specifying a model gas system is given, for example:

Referring again to FIG. 6 showing a schematic view in section of the model gas in the stable between parallel infinite plates in the open channel at the uniform temperature, a case when both the lower plate 616 and the upper plate 615 plates are at rest. The model gas is Newtonian with constant viscosity. The pressure gradient is constant along the model gas flow in x-direction. The main control volume has dimensions Δx—length, Δy—thickness, and Δz—width. The pressure applied to the main control volume at x and x+Δx are $P_x$ and $-P_{x+\Delta x}$, respectively. The velocity profile induced in the model gas due to the motion of the plates and pressure gradient is to be determined.

In a stable incompressible model gas system at the uniform temperature and with a lack of internal processes, (1) each particle conserves properties acquired by it at a point and time of the preceding collision and deliver that properties unchanged in another location upon its second collision with another particle, (2) particle density n=constant, (2) temperature T and the magnitude of thermal velocity $v_T$ are constant. (3) We also accept, from Simulation 1, that the mass flow velocity vector along y-direction u=0. For simplicity, the particles are considered to have a unit mass.

These parameters describing the model gas system are specified:

kind of the model gas including the mass of particles and an effective cross-section of the collisions;

temperature T, pressure P;

the distance between parallel plates, H;

The pressure gradient along the channel, $$\frac{dP}{dx},$$

and allowable error of computation, Max_Er.

Step S1402 of forming $u_x$-momentum balance equation includes, for example, steps of:

(1) calculating the net rate of property influx, $B_{in}^{\Psi 0\_F}$, which is formed by converging ballistic particles chosen from the group of particles originated from preceding collisions within space occupied by the model gas (ballistic trajectories 601 and 603 in FIG. 6), from Equation (124) given below, obtained by substitution of Equation (58) and assigning $\lambda=0$, $Z_V$=constant, u=0, $B_{in}^{\Psi\lambda\_F} \equiv B_{in}^{\Psi 0\_F}$, $\Psi_{in}=\Psi_\lambda \equiv \Psi(y')$, and $v(t'_i, y', t, y) \equiv v_T n_i$ in Equation (38):

$$B_{in}^{\Psi 0\_F}(y, t) = -\frac{1}{2} Z_V \frac{\partial}{\partial y} \int_0^H \exp(-P_c|y - y'|) n_i \Psi(y') dy', \quad (124)$$

where $$n_i = \frac{y - y'}{|y - y'|}; \quad (125)$$

(2) and representing a general integral form of the property balance by substitution of Equations (124), (60), (63) in Equation (85) and forming $u_x$-momentum balance equation by formulating an integral form of the $u_x$ momentum balance equation in a stable model gas flow confined between two parallel plates with mixed diffuse and specular scatterings from the plates being at rest by substitution in the resulting equation of $\Psi \equiv u_x$, $$\dot{Q}_\Psi = -\frac{dP}{dx},$$

$J_{21}{}^1$ as of Equation (61), $J_{12}{}^2$ as of Equation (62), $\mathbb{N}$ as of Equation (54), and following differentiation and normalization by $z_V \neq 0$:

$$u_x = -\frac{1}{z_V}\frac{dP}{dx} + \frac{1}{2}P_c\int_0^H \exp(-P_c|y-y'|)u_x(y')dy' + \frac{1}{2}P_c\frac{(1-\sigma)\exp(-P_c H)[\exp(-P_c(H-y))+\exp(-P_c y)]}{1-(1-\sigma)\exp(-P_c H)}\int_0^H u_x(y')\exp(P_c y')dy' \quad (126)$$

Step S1403 of formulating solutions for the first approximation includes, for example, steps of:

(1) assigning in the right-hand term of Equation (126)

$$u_x = 0, \quad (127)$$

which is the velocity of each particle surrounding point y to be equal zero, so Equation (126) is reduced to $$u_{x1}(y) = g_0 = -\frac{1}{z_V}\frac{dP}{dx}, \quad (128)$$

which is a solution for the first order approximation;

(2) modification of the $u_x$-momentum balance equation shown by Equation (126) in such form that $u_x$ in the left-hand of the equation defines $k^{th}$ approximation, $u_{xk}$, and $u_x(t'_i, y')$ in the right-hand of the equation defines $(k-1)^{th}$ approximation, $u_{x(k-1)}$, so Equation (126) is modified to $$u_{xk} = g_{(k-1)}(y) + g_0, \quad (129)$$

where $$g_0 = -\frac{1}{z_V}\frac{dP}{dx}, \quad (130)$$

and $$g_{(k-1)+}(y) = +\frac{1}{2}P_c\int_0^H \exp(-P_c|y-y'|)u_{x(k-1)}(y')dy' + \frac{1}{2}P_c\frac{(1-\sigma)\exp(-P_c H)[\exp(-P_c(H-y))+\exp(-P_c y)]}{1-(1-\sigma)\exp(-P_c H)}\int_0^H u_{x(k-1)}(y')\exp(P_c y')dy'. \quad (131)$$

Here $g_0(y)$ is a well-defined function.

Step S1404 of formulating solutions for the $k^{th}$ approximation includes, for example, steps of:

(1) presenting the approximated solution for the $n^{th}$ approximation, $u_{xn}$, for each point of the space occupied by the model gas by Equations (132) given below:

$$u_{xk}(y) = u_{x1}(y) + u_{ak}(y), \quad (132)$$

where $u_{a\_n}(y)$ is the adjustment to velocity $u_{x(n-1)}(y)$ associated the velocities of particles surrounding point y, $u_{x(n-1)+}(y')$, which is expressed as follows $$u_{ak}(y) = \frac{1}{2}P_c\int_0^y \exp(-P_c(y-y'))u_{x(k-1)+}(y')dy' + \frac{1}{2}P_c\int_y^H \exp(P_c(y-y'))u_{x(k-1)+}(y')dy' + \frac{1}{2}P_c\frac{(1-\sigma)\exp(-P_c H)[\exp(-P_c(H-y))+\exp(-P_c y)]}{1-(1-\sigma)\exp(-P_c H)}\int_0^H u_{x(k-1)+}(y')\exp(P_c y')dy' \quad (133)$$

The magnitude of $u_x$-momentum in a specific point in the model gas space results from impact of both the rate of momentum influx formed by particles being directly affected by the pressure force and the rate of momentum influx formed by particles that have acquired the property from each of their preceding collision being within the space occupied by the model gas.

Step S1405 of establishing discretization parameters includes, for example, steps of:

specifying discretization parameters including the dimension of the system for calculation [0, H] and the number of space intervals S; and dividing the space intervals [0, H] into s equal parts of length 1, so that, for $y_i \equiv y' = sl > y$, the range is divided as $y = y_s < y_{s+1} < \ldots < y_s = H$ and, for $y_s \equiv y' = sl < y$, the range is divided as $0 = y_0 < y_1 < \ldots < y_s = y$.

Step S1406 of providing an error estimation rule includes, for example, the step of providing the error estimation rule for $k^{th}$ cycle of the sequential approximation from Equation (134) given below:

$$Er = \sqrt{\frac{1}{s}\sum_1^k\left(\frac{u_{ak}(y_s) - u_{a(k-1)}(y_s)}{u_{xs}(y_s)}\right)^2}, \quad (134)$$

Step S1407 of computing and storing the values $u_{x1s}(y_s)$ for corresponding $y_s$ is done by applying Equation (128) given above;

Step 1408 of executing computation for each cycle k of the sequential approximations includes, for example, steps of:

assigning $u_{xks+} = u_{x1s}$ (S1408A);

storing the values of $u_{xks+}$ for corresponding $y_s$ (S1408B);

computing $u_{aks} \equiv u_{ak}(y_s)$ for corresponding y, according to Equation (133) (S1408C);

computing $u_{xks} = u_{aks} + u_{x1s}$ according to Equation (132) and storing the values of $u_{xks}$ for corresponding $y_s$, (S1408D);

computing Er according to Equation (134) given above (S1408E);

defining a condition for ending approximations (S1408F), where If Er>Max_Er, assigning $u_{xks+} = u_{xks}$, and go to (S1408B) and if ≤Max_Er the cycle of the sequential approximations is stopped, then copying $u_{xks}$ for corresponding $y_s$, and displaying the results of computation (S1409).

The sign + in the subscript indicates that the function is used for the following integration with y' as an argument.

FIG. 16 is a chart showing the gas flow velocity profiles across between the plates at different numbers of the sequential approximations with mixed diffuse and specular scattering from the plates, which are obtained by computer simulations performed by the steps listed above, for stable conditions involving incompressible gas at the uniform temperature. The computation involves the case of mixed diffuse and specular scattering from the plates. As shown, the result of 120 sequential approximations computed according to Simulation 2 substantially coincides with the analytical velocity profile. The numerical and analytical calculations were made for the nitrogen gas flow in a channel confined by parallel plates, which are characterized by the property accommodation coefficient of 0.7 and spaced at the distance of 0.1 meters, at the uniform temperature of 300K and pressure of 1 Pa.

In the above, Simulation 1 and Simulation 2 and comparative flow calculations by the method of differentiation show an implementation of embodiments which can be used for simulating transport processes in model gas systems.

The simulations set forth above are provided to give those of ordinary skill in the art a complete disclosure and description of how to make and use the embodiments of the methods and systems for predicting the evolution of the model gas fluid, which is based on the dynamic evolution of the model gas system in some period of time preceding the initial time and do not limit the present invention.

8. Computer Hardware

Figure 17:
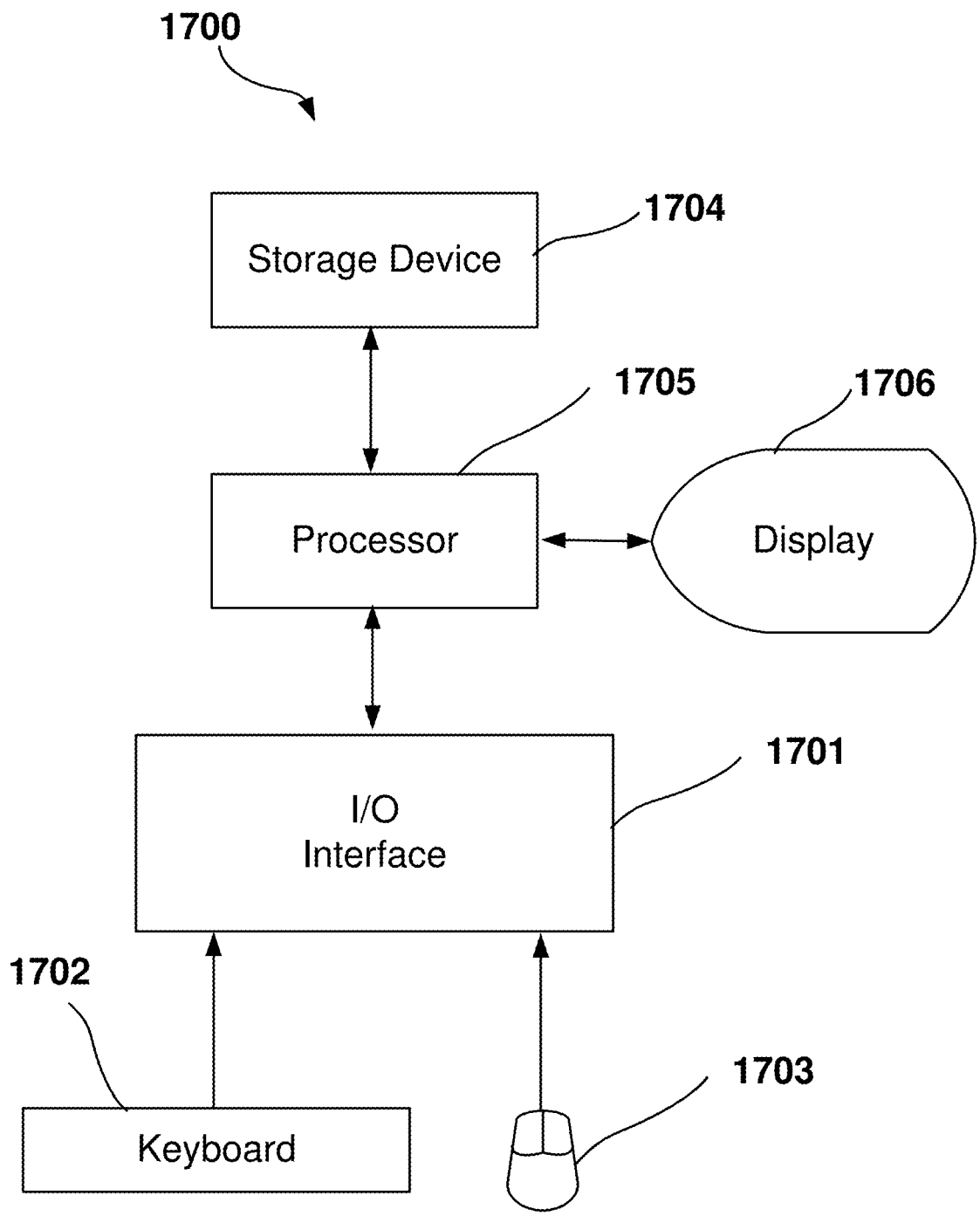
FIG. 17 is a schematic representation of computer system for implementing the method for simulating fluid flow.

In some embodiments, the calculations are performed by using a computer program product with a computer system. FIG. 17 is a schematic representation of a computer system for implementing the method for simulating fluid flow. The computer system 1700, for example, includes: a processor 1705, which can be any suitable computer processor; a non-transitory computer readable memory coupled to the processor 1704, which can be any suitable computer readable and programmable memory; one or more user input devices such as a keyboard 1702 and/or a pointing device such as a mouse 1703 operatively coupled to the processor via any suitable user I/O interface 1701; a display 1706, which can be any suitable computer display, operatively coupled to the processor; a computer program stored in the non-transitory computer readable memory and executable by the processor, the computer program operable to run on a computer to execute a sequence of instructions including:

obtaining a plurality of parameters specifying a fluid system being approximated to a model gas system including specification of model gas material, pressure, temperature, and geometry, where the plurality of parameters specifying geometry includes setting geometry and boundary conditions during a time period from a pre-initial time until a given time;

obtaining a set of discretization parameters specifying a set of points in space occupied by a model gas;

obtaining a value of an allowable error for calculations;

obtaining a set of parameters including an initial time and the given time;

calculating, for each of the set of points in space occupied by the model gas, a local initial time, obtaining a set of derived analytical equations involving in the set of parameters which govern model gas flow; and solving the set of derived analytical equations to calculate a property value in each of the set of points in space occupied by the model gas at the given time, where the set of derived analytical equations is derived based on an assumption that the model gas facilitates distant transport of one or more of properties including one or more of mass, momentum, and energy, which is implemented by way of a plurality of particles traveling with a probability between any of two points in space occupied by the model gas by following a ballistic trajectory governed by a law of motion, where each of the plurality of particles is adapted to transport a combination of one or more of properties including one or more of mass, momentum, and energy between any of two points of a plurality of points of collisions.

The method, for example, is implemented in software in any suitable software language, including C++, Visual C, Visual C++, Visual Basic, Java, C, and FORTRAN. The software program may be stored on any computer readable medium, including a floppy disk, a hard disk drive, a magneto-optical disk drive, CD-ROM, magnetic tape or any other of several non-volatile storage devices well known to those skilled in the art for storing a computer software program in such a form that the instructions may be retrieved and executed by a processor.

9. Analytical Representation of the Property Influx and Property Efflux in Three-dimensional Model Gas System Lastly, additional analytical tools needed to model fluid flows in the three-dimensional configuration are provided. Specifically, the analysis is limited to the case of forming an integral property balance equation in the homogenous three-dimensional model gas system having no gas-solid interfaces. However, the method can be generalized by applying it to other heterogeneous types of model gas systems that include gas-solid interfaces, as apprehended by those skilled in the art. Referring to FIG. 1 and FIG. 1A and to the above description of the method steps in the one-dimensional configuration, steps S103A, S104, and S105 are needed to define the property balance equation for the model gas system with no gas-solid interfaces.

In the following, various terms used in the equations and drawings are listed in Table 3.

TABLE 3

| Symbols | Short description |
|---|---|
| $\nabla$ | $\nabla = \vec{i}\dfrac{\partial}{\partial x} + \vec{j}\dfrac{\partial}{\partial y} + \vec{k}\dfrac{\partial}{\partial z}$ |
| | d is the divergence operator in a three-dimensional configuration |
| t | the given time |
| $t_i'$ | time of the original collision |
| $\vec{r}$ | position of the ending point in one of the plurality of points of ending collisions |
| $\vec{r}'$ | is the position of the starting point in one of the plurality of points of original collisions |
| $\vec{u}(\vec{r}, t)$ | mass flow velocity or velocity of the point sink at the given time |
| $v_T(t_i', \vec{r}')$ | average magnitude of thermal velocity in the starting point at the time of the original collision |
| $Z_V(t_i', \vec{r}')$ | rate of collisions per unit volume in the starting point at time of original collision |
| $\vec{v}(t_i', \vec{r}', t, \vec{r})$ | a velocity vector in the ending point at the given time |
| $Q_i(t, t_i')$ | the probability of traveling along the ballistic trajectory |

TABLE 3-continued

| Symbols | Short description |
|---|---|
| $\Psi_{in}(t_i', \vec{r}', t, \vec{r})$ | a property value delivered in the ending point at the given time by one of the first plurality of converging ballistic particles, which is defined analogously by Equation (7) |
| $\varphi_i = t - t_i'$ | traveling time between original and ending consecutive collisions |
| $P_c$ | the number of particles within a collision tube of a unit length |
| $\sigma_c$ | the cross-section of collisions |
| V | a volume of integration over space occupied by the model gas |
| $\vec{r}_i^c$ | position of a virtual particle at the given time, which has zero magnitude of thermal velocity |
| $\vec{n}_i = \dfrac{\vec{r} - \vec{r}_i^c}{|\vec{r} - \vec{r}_i^c|}$ | instant unit vector directing thermal velocity component allowing traveling particle to target point $\vec{r}$ at time t |
| $\tilde{\vec{r}} = \vec{r}(\vec{r}', t_i', \tilde{t})$ | position vector of a traveling particle at time $\tilde{t}$ |
| $\tilde{\vec{v}} = \vec{v}(t_i', \vec{r}', \tilde{t})$ | velocity vector of a traveling particle at time $\tilde{t}$ |
| $\vec{g}$ | the external force applied to a particle of a unit mass |
| $v_{rel}$ | the average magnitude of the relative velocity or the velocity of the traveling particle with respect to nearby passed particles |
| n | particle density. |

Here, the net rate of property influx from the surrounding model gas system in a general non-moving point at the given time is formed by converging ballistic particles coming from the model gas system and being consumed by the point sink positioned in the general non-moving point at the given time. In accordance to the invention, referring to FIG. 13 providing a block diagram of a word equation of a general property balance in the model gas system, the modified property balance in formula form includes applying Equation (135) given below:

$$B_{in}^{\Psi 0\_F}(\vec{r}, t) = B_{out}^{\Psi\_FS}(\vec{r}, t) + \dfrac{\partial}{\partial t}[n(t, \vec{r})\Psi(t, \vec{r})], \quad (135)$$

where $B_{in}^{\Psi 0\_F}$ is the net rate of property influx per unit volume from the surrounding model gas, which will be defined afterward in step S103A, $B_{out}^{\Psi\_FS}$ is the net rate of property efflux per unit volume from the general non-moving point at the given time, which will be defined afterward in step S104, and $$\dfrac{\partial}{\partial t}[n(t, \vec{r})\Psi(t, \vec{r})]$$

is the temporal rate of property change in the same point at the same time.

Figure 18:
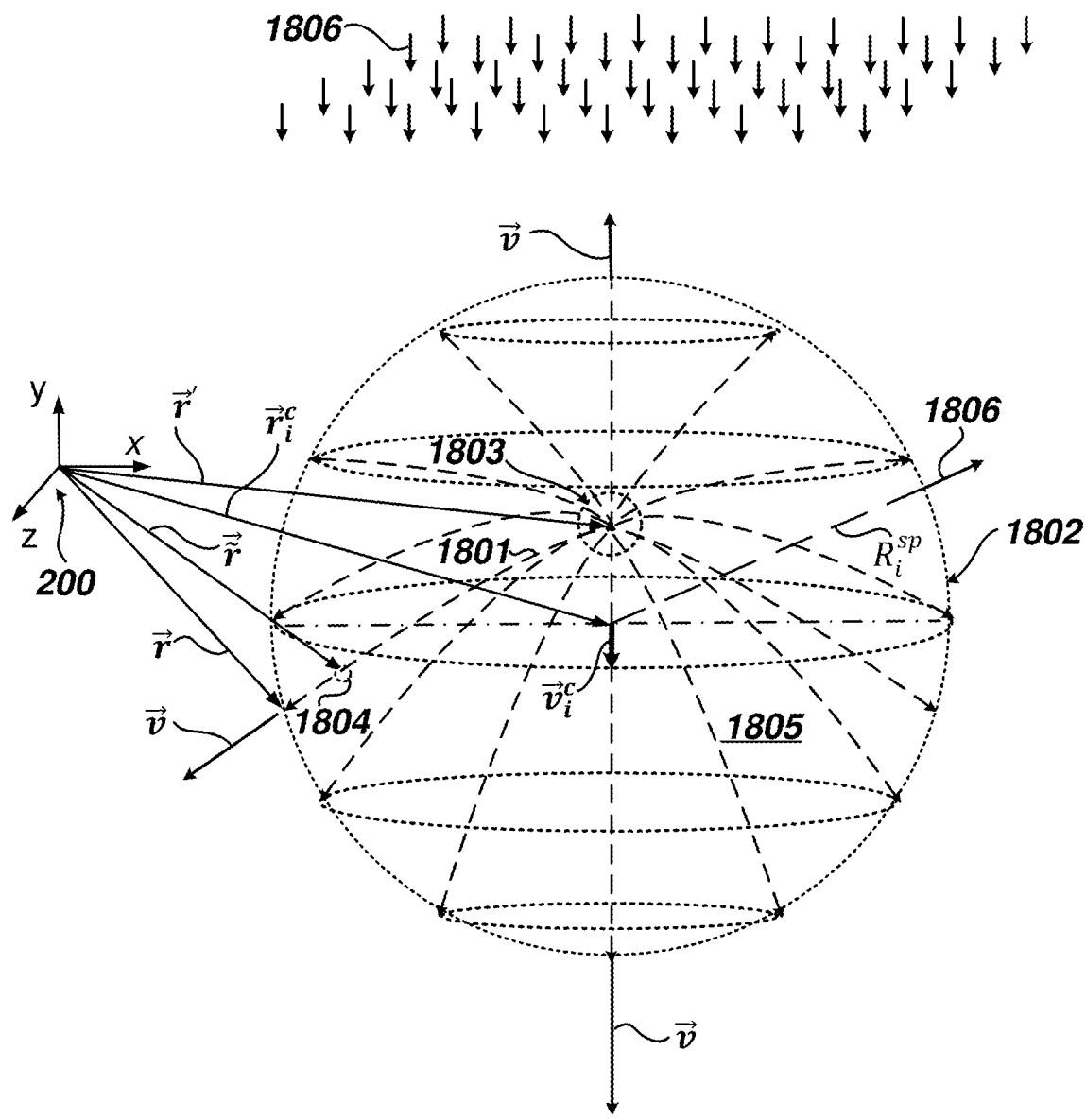
FIG. 18 is a schematic three-dimensional view of the model gas system for explaining the ballistic movement of the particle affected by the external field of force and illustrating the method for analytical representation of the net rate of property influx from the model gas.

FIG. 18 is a schematic three-dimensional view of a model gas system for explaining a ballistic movement of the particle affected by the external field of force and illustrating the method for analytical representation of the net rate of property influx from the model gas. For clarity with no limitation of the invention, the observer's Cartesian coordinate system 200 is oriented so y-axis is along the negative direction of the applied acceleration field 1806, which provides, for each particle, acceleration $\vec{g}$. In the example of FIG. 18, particle 1804 on trajectory 1801 has in an event point 1803 positioned in $\vec{r}'$ at the event time $t_i'$, which has resulted in obtaining by the particle a magnitude of thermal velocity, $v_T(t_i', \vec{r}')$ (not shown) and mass flow velocity $\vec{u}(t_i', \vec{r}')$ (not shown), which are intrinsic to the nearby volume of the model gas surrounding point $\vec{r}'$ 1803 at time $t_i'$.

In embodiments, the step of defining a trajectory of a ballistic movement of the ballistic particle that converges in a general non-moving point $\vec{r}$ at the given time t includes a step of formulating position vector $\tilde{\vec{r}} = \vec{r}(\tilde{t})$ of particle 1804 on trajectory 1801 and velocity vector $\tilde{\vec{v}} = \vec{v}(\tilde{t})$ (not shown) at time $\tilde{t}$ by applying Equations (136) and (137), respectively, given below:

$$\tilde{\vec{r}} = \vec{r}(\tilde{t}) = \vec{r}' + [v_T(t_i', \vec{r}')\vec{n}_i + \vec{u}(t_i', \vec{r}')](\tilde{t} - t_i') + \tfrac{1}{2}\vec{g}(\tilde{t} - t_i')^2, \quad (136)$$

and $$\tilde{\vec{v}} = \vec{v}(\tilde{t}) = v_T(t_i', \vec{r}')\vec{n}_i + \vec{u}(t_i', \vec{r}') + \vec{g}(\tilde{t} - t_i'). \quad (137)$$

where $t \geq \tilde{t} \geq t_i'$.

In some embodiments, the step of determining time of the original collision, $t_i'$, in point $\vec{r}'$ for each of the ballistic particles includes a step of resolving the equation of projectile motion, Equation (138) given below, with respect to the ballistic traveling time, $\varphi_i$:

$$\tfrac{1}{2}\vec{g}\varphi_i^2 + [v_T(t_i', \vec{r}')\vec{n}_i + \vec{u}(t_i', \vec{r}')]\varphi_i + \vec{r}' - \vec{r} = 0, \quad (138)$$

which is obtained by assigning $\tilde{t} = t$ and substitution $$\varphi_i = t - t_i' \quad (139)$$

in Equation (136) given above and rearrangement of the terms.

In some embodiments, the step of defining an appropriate instant unit vector directing thermal velocity component of each particle in point $\vec{r}'$ at time $t_i'$ includes the steps of:
presenting Equation (138) in the following form:

$$\varphi_i v_T \vec{n}_i = \vec{r} - \vec{r}_i^c, \quad (140)$$

where $\vec{n}_i$ is a unit vector and $$\vec{r}_i^c(t) = \vec{r}' + \vec{u}(t_i', \vec{r}')\varphi_i + \tfrac{1}{2}\vec{g}(\varphi_i)^2; \quad (141)$$

and deriving $\vec{n}_i$ from Equation (140), which is given as $$\vec{n}_i(t) = \dfrac{\vec{r} - \vec{r}_i^c}{|\vec{r} - \vec{r}_i^c|}. \quad (142)$$

where, referring to FIG. 18, $\vec{n}_i$ is interpreted as a unit exterior 1806 normal to the sphere 1802 having a point of origin $\vec{r}_i^c$ at time t. In this, vector $\vec{r}_i^c$ is interpreted as the position of the center of the expansion zone at time t or the position of a particle having zero magnitude of an arbitrary or thermal velocity in point $\vec{r}'$ at the time of the divergence $t_i'$, which is observed at time t. In embodiments, the step of defining the velocity, $\vec{v}$, of each particle reaching the general non-moving point $\vec{r}$ the given time t includes a step of applying Equation (143) given below:

$$\vec{v}(t,y) = v_T(t_i', \vec{r}')\vec{n}_i + \vec{u}(t_i', \vec{r}') + \vec{g}\varphi_i; \quad (143)$$

which is obtained by assigning $\tilde{t} = t$ and substitution $$\varphi_i = t - t_i' \quad (144)$$

in Equation (137) given above and rearrangement of the terms.

In some embodiments, the step of defining the size of the expansion zone includes a step of executing scalar multiplication of Equation (140) on itself, which is resulted in averaging as:

$$\varphi_i^2 v_T^2 = (\vec{r} - \vec{r}_i^c)^2. \tag{145}$$

where the radius of the expansion zone, $R_i^{sp}$, is computed from Equation (145) as $$R_i^{sp} = \varphi_i v_T = |\vec{r} - \vec{r}_i^c|. \tag{146}$$

and the velocity vector of the center of the expansion zone, $\vec{v}_i^c$, 301 is computed as $$\vec{v}_i^c = \vec{u}(t_i', \vec{r}') + \vec{g}\varphi_i. \tag{147}$$

In some embodiments, the step of formulating the probability of ballistic traveling along the trajectory includes steps of:

defining the average magnitude of the relative velocity or the velocity of the traveling particle with respect to nearby passed particles at a particular point of a trajectory; and representing the probability of traveling along the ballistic trajectory from the starting point to the ending point in three-dimensional configuration by Equation (148) given below:

$$Q_i(t, t_i') = \exp(-\int_{t_i'}^{t} P_c(\tilde{\vec{r}}(\tilde{t})) v_{rel}(\tilde{\vec{r}}(\tilde{t})) d\tilde{t}), \tag{148}$$

where $\tilde{t}$ is a parametric time $t_i' < \tilde{t} \leq t$, $\tilde{\vec{r}}(\tilde{t})$ is a trajectory point of the ballistic trajectory at the parametric time $\tilde{t}$, $v_{rel}(\tilde{\vec{r}}(\tilde{t}))$ is an average magnitude of relative velocity in the trajectory point, and $P_c(\tilde{\vec{r}}(\tilde{t}))$ is average number collisions per unit length in the trajectory point.

Figure 19:
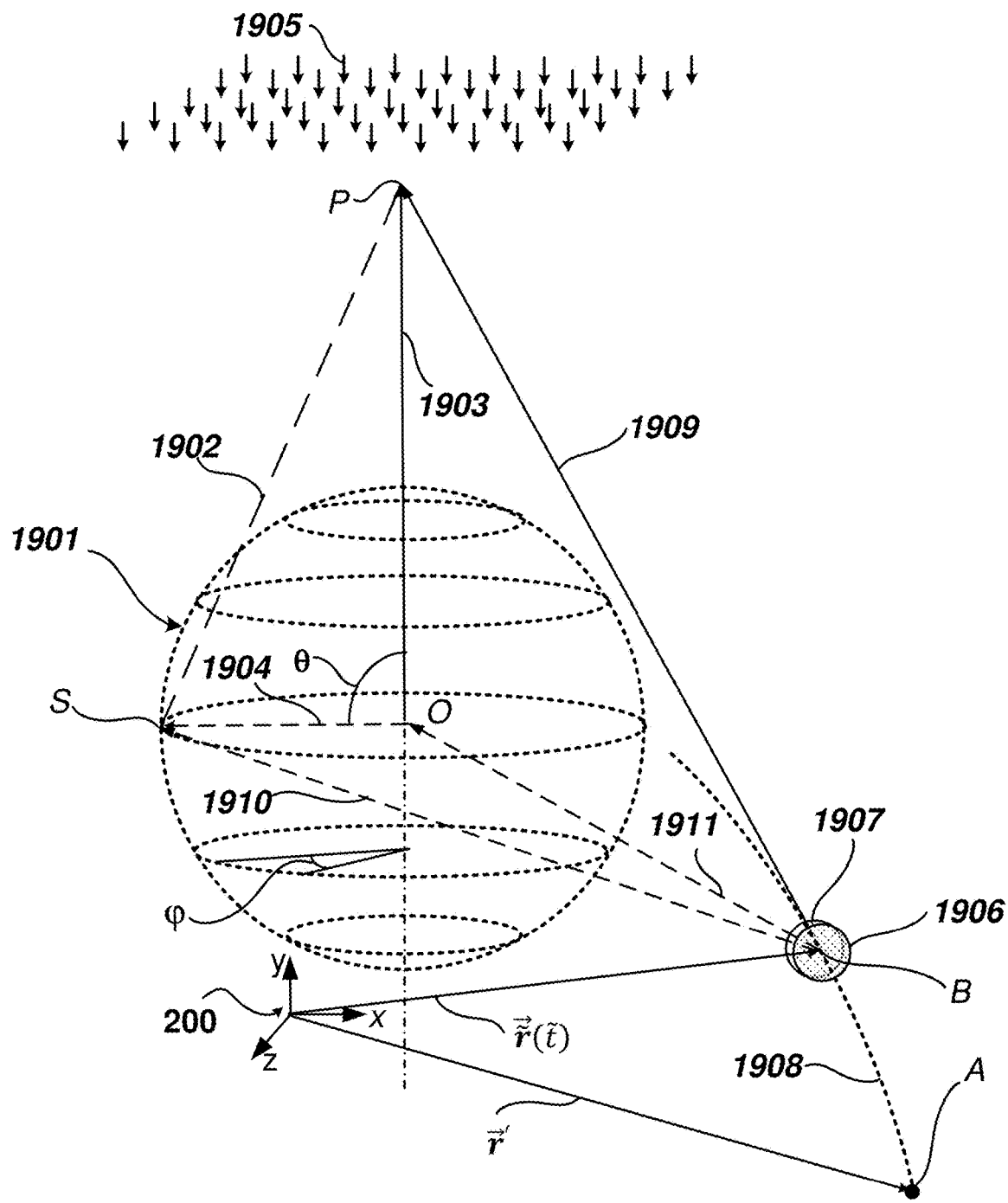
FIG. 19 is a schematic view for explaining a method for determining the average magnitude of the instant velocity of the traveling particle with respect to a nearby passed particle along a ballistic trajectory of the traveling particle in a three-dimensional configuration.

FIG. 19 is a schematic view for explaining a method for determining the average magnitude of the instant velocity of the traveling particle with respect to a nearby passed particle along the ballistic trajectory of the traveling particle in a three-dimensional configuration. For clarity with no limitation of the invention, the observer's Cartesian coordinate system 200 is oriented so y-axis is along the negative direction of the applied acceleration field 1905, which provides, for each particle, acceleration $\vec{g}$. In the example of FIG. 19, particle 1906, which had the original collision in point A, passes particle 1907 in point B positioned on ballistic trajectory 1908.

The step of defining the average magnitude of the relative velocity or the velocity of the traveling particle with respect to nearby passed particles at a particular point of a trajectory at a specified time is calculated by steps of:

defining an instant magnitude of the velocity of one of the plurality of converging ballistic particles in the trajectory point with respect to one of a plurality of nearby passed particles in the trajectory point, which includes:

defining in a rest frame the instant velocity vector 1909 of the traveling particle in point B, $\vec{v}_1$, by Equation (149) given below:

$$\vec{v}_1 = v_T(t_i', \vec{r}')\vec{n}_1 + \vec{u}(t_i', \vec{r}') + \vec{g}(\tilde{t} - t_i'), \tag{149}$$

where $\vec{n}_1$ is a unit vector of a specific direction having the point of origin $\vec{r}'$;

specifying instant velocity vector 1910 in a rest frame, $\vec{v}_2(\tilde{t}, \tilde{\vec{r}})$, of particle 1907 being passed by particle 1906 in point B at time $\tilde{t}$ by Equation (150) given below:

$$\vec{v}_2 = v_T(\tilde{\vec{r}}(\tilde{t}))\vec{n}_i + \vec{u}(\tilde{\vec{r}}(\tilde{t})), \tag{150}$$

where $v_T(\tilde{\vec{r}}(\tilde{t}))$ shown as 1904 and $\vec{u}(\tilde{\vec{r}}(\tilde{t}))$ shown as 1911 are thermal velocity and a mass flow velocity components in the rest frame of the model gas in point $\tilde{\vec{r}}$ at time $\tilde{t}$ which are acquired by particle 1907 because of a collision in this point;

forming an instant vector of relative velocity, $\vec{v}_{rl}$, or the velocity of the traveling particle with respect to nearby passed particle by connecting the end of the instant velocity vector, $\vec{v}_2(\tilde{t}, \tilde{\vec{r}})$, positioned at any point, S, of spherical surface 1901 of radius $v_T(\tilde{\vec{r}}(\tilde{t}))$ to the end of vector $\vec{v}_1$, point P, by line 1902, which is formulated by Equation (151) given below:

$$\vec{v}_{rl} = \vec{v}_1(t_i', \vec{r}', \tilde{t}) - \vec{v}_2(\tilde{\vec{r}}(\tilde{t})), \tag{151}$$

where is the velocity $\vec{v}_r$ shown in the example of FIG. 19 as 1903 and expressed as $$\vec{v}_r = \vec{v}_1(t_i', \vec{r}', \tilde{t}) - \vec{u}(\tilde{\vec{r}}(\tilde{t})) \tag{152}$$

is the vector-velocity $\vec{v}_r$ shown in the example of FIG. 19 as 1903;

defining an instant magnitude of the velocity of particle 1906 traveling along the ballistic trajectory with respect to one of a plurality of nearby passed particles (particle 1907) by executing the square root of the scalar product of the vector-velocity of Equation (151) with itself, which, referring to the example of FIG. 19, is expressed in formula form by Equation (153):

$$\left|\vec{v}_{rl}(\vec{r}(t))\right| = \sqrt{\vec{v}_{rl} \cdot \vec{v}_{rl}} = \sqrt{\left|\vec{v}_r\right|^2 + \left[v_T(\tilde{\vec{r}}(\tilde{t}))\right]^2 - 2v_T(\tilde{\vec{r}}(\tilde{t}))\left|\vec{v}_r\right|\cos(\vartheta)}, \tag{153}$$

where $\vartheta$ is an instant random angle between the direction designated by a specified at a particular point of the trajectory velocity vector $\vec{v}_r$ shown as 1903 and an arbitrary direction of the vector-velocity $v_T(\tilde{\vec{r}}(\tilde{t}))\vec{n}_i$ shown as 1904 of nearby passed particle 1907;

averaging the instant magnitude of a relative velocity of the particle traveling along the ballistic trajectory over all possible directions of the random instant relative velocity vector component of a passed nearby particle by integrating the instant magnitude of the relative velocity of Equation (153) over angles of $\vartheta$ from 0 to $\pi$ and $\varphi$, which is the angle of rotation around the direction of the velocity vector 1903, from 0 to $2\pi$ followed by normalizing by the solid angle of $4\pi$, which is expressed by Equation (154) given below:

$$v_{rel} = \frac{1}{2\pi} \int_0^\pi \sqrt{\left|\vec{v}_r(\vec{r}(\tilde{t}))\right|^2 + \left[v_T(\tilde{\vec{r}}(\tilde{t}))\right]^2 - 2v_T(\tilde{\vec{r}}(\tilde{t}))\left|\vec{v}_r(\tilde{\vec{r}}(\tilde{t}))\right|\cos(\vartheta)} \sin(\vartheta) d\vartheta. \tag{154}$$

Note that, usually, the magnitude of the relative mass flow velocity or the mass flow velocity component of the passing particle 1906 with respect to nearby passed particle 1907 is insignificant in comparison with the magnitude of the thermal velocity of either passing particle 1906 or nearby passed particle 1907 or of both.

An approximated average magnitude of the relative velocity of the traveling particle in the trajectory point is calculated from Equation (155) given below, which is obtained by substitution of $|\vec{v}_r| \cong v_T(t'_i, \vec{r}')$ in Equation (154) and executing the integration of the resulted equation:

$$v_{rel}(\vec{\tilde{r}}(t)) = \tag{155}$$

$$\frac{1}{6v_T(t'_i, \vec{r}')v_T(\vec{\tilde{t}}, \vec{\tilde{r}})}\left\{\left(v_T(t'_i, \vec{r}') + v_T(\vec{\tilde{r}}(t))\right)^3 - \left|v_T(t'_i, \vec{r}') - v_T(\vec{\tilde{r}}(t))\right|^3\right\},$$

where $v_{rel}(\vec{\tilde{r}}(t))$ is the average magnitude of relative velocity in the trajectory point, $v_T(t'_i, \vec{r}')$ is the average magnitude of the thermal velocity component in the starting point of the ballistic trajectory, and $v_T(\vec{\tilde{r}}(t))$ is the average magnitude of the thermal velocity component of one of the plurality of nearby passed particles in the trajectory point.

Also, usually, the magnitudes of the thermal velocity of nearby particles are approximately identical. By the invention, in 3D configuration, the approximated average magnitude of a relative velocity with respect to each particle moving in arbitrary directions, which is originated from the proximity of each to other, is calculated from Equation (156) given below, which is obtained by substitution of $v_T(\vec{\tilde{r}}(t)) = v_T(t'_i, \vec{r}')$ in Equation (155):

$$v_{rel}(t'_i, \vec{r}') = 4/3 v_T(t'_i, \vec{r}'). \tag{156}$$

In some embodiments, the step of defining the net rate of particle efflux per unit volume from a point source positioned in a point of the original collisions and moving with the mass flow velocity of the model gas in that point includes a step of representing the particle flux production rate or the net rate of particle efflux per unit volume, $Z_V(t'_i, \vec{r}')$, in a point of the original collision moving with the mass flow velocity $u(t'_i, \vec{r}')$ by following Equation (157) given below:

$$Z_V(t'_i, \vec{r}') = \tfrac{1}{2} n(t'_i, \vec{r}') P_c(t'_i, \vec{r}') v_{rel}(t'_i, \vec{r}'), \tag{157}$$

where, $n(t'_i, \vec{r}')$ is particle density in the corresponding point of original collisions at the time of the original collision, $P_c(t'_i, \vec{r}')$ is the average number of collisions per unit length in the corresponding point of original collisions at the time of the original collision, and $v_{rel}(t'_i, \vec{r}')$ is the average magnitude of relative velocity in the corresponding point of the original collisions at the time of the original collision.

In some embodiments, this obtained by steps of:

defining the vector field of the particle flux, $\vec{J}_r^N$, along each of the ballistic trajectories in a point of the space $\vec{r}$ around the point of the original collision, the step which includes a step of representing $\vec{J}_r^N$ by applying Equation (33) given below:

$$\vec{J}_r^N = \tfrac{1}{2} n(t'_i, \vec{r}') Q_i(t, t'_i) \vec{v}(t'_i, \vec{r}', t, \vec{r}), \tag{158}$$

where $\vec{v}$ is defined by Equation (143), $Q_i$ is a survival probability defined by Equation (148), and $n(t'_i, \vec{r}')$ is particle density at a specific point point $\vec{r}'$ at time $t'_i$;

representing, in a coordinate system associated with point $\vec{r}_i^c$ moving with velocity $\vec{v}_i^c$, the vector field of the particle vector flux, $\vec{J}_{r'}^N$, through the in the control surface 1802 of FIG. 18 in the following form:

$$\vec{J}_{CS}^N = \tfrac{1}{2} n(t'_i, \vec{r}') Q_i(t, t'_i) [\vec{v}(t'_i, \vec{r}', t, \vec{r}) - \vec{v}_i^c] =$$
$$\tfrac{1}{2} n(t'_i, \vec{r}') Q_i(t, t'_i) v_T(t'_i, \vec{r}') \vec{n}_i; \tag{159}$$

and applying and executing divergence operator $\nabla'\cdot$ to the vector field of Equation (159) followed by shrinking volume of the auxiliary control volume to infinitely small volume, namely, $\vec{r} \to \vec{r}'$, which, in formula form, is expressed as:

$$Z_V(t'_i, \vec{r}') = \tag{160}$$

$$\{\nabla' \cdot [J_{CS}^N]\}_{\vec{r} \to \vec{r}'} = \tfrac{1}{2}\{\nabla' \cdot [n(t'_i, \vec{r}') Q_i(t, t'_i) v_T(t'_i, \vec{r}') \vec{n}_i]\}_{\vec{r} \to \vec{r}'}.$$

where $$\nabla' = \vec{i}\frac{\partial}{\partial x'} + \vec{j}\frac{\partial}{\partial y'} + \vec{k}\frac{\partial}{\partial z'}. \tag{161}$$

The above is obtained upon recognizing that control volume 1805 is confined by inflated control surface 1802 is isolated (see FIG. 18), then the total particle efflux through the surface 1802 at time t should be equal to the total particle efflux from the point at $\vec{r}'$ at time $t'_i$ through the surface 1803 closely surrounding point $\vec{r}'$ and is analogous to Equation (32) in one-dimensional configuration. Some also recognize that, after a collision in point $\vec{r}'$ at time $t'_i$, the particle can move in any direction because of the arbitrary nature of the unit vector $\vec{n}_i$ thus forming an expansion zone around the point source in point $\vec{r}'$ at time $t'_i$, which is shown, as 1802.

In embodiments, the step of formulating the net rate of the property flux originated from original collisions within entire space occupied by the model gas in a point sink positioned in a general non-moving point of the space occupied by the model gas at the given time includes steps of:

representing the property vector flux, $J_{\vec{r}' \to \vec{r}}^\Psi$, originated from original collisions in point $\vec{r}'$ at time $t'_i$ and being sensed by a point sink positioned in a being at rest point $\vec{r}'$ at the given time t by applying Equation (162) given below:

$$J_{\vec{r}' \to \vec{r}}^\Psi(t, \vec{r}) = \tag{162}$$

$$\frac{1}{4\pi}\frac{1}{|\vec{r}-\vec{r}_i^c|^2} Q_i(t, t'_i) Z_V(t'_i, \vec{r}')\frac{\vec{v}(t'_i, \vec{r}', t, \vec{r})}{v_T(t'_i, \vec{r}')}\Psi_{in}(t'_i, \vec{r}', t, \vec{r}) dV';$$

and defining the rate of the property vector flux, $J_{FS \to \vec{r}}^\Psi$, in point $\vec{r}$ at the given time t, which is originated from preceding collisions within entire space occupied by the model gas, includes applying Equation (163) given below, which is obtained by integrating Equation (162) over the volume of the model gas system:

$$J_{FS \to y}^\Psi = \int\int\int_V \frac{1}{4\pi}\frac{1}{|\vec{r}-\vec{r}_i^c|^2} Q_i(t, t'_i) \tag{163}$$

$$Z_V(t'_i, \vec{r}')\frac{\vec{v}(t'_i, \vec{r}', t, \vec{r})}{v_T(t'_i, \vec{r}')}\Psi_{in}(t'_i, \vec{r}', t, \vec{r}) dV',$$

where symbols of the equation above are as defined in Table 3 and $\Psi_{in}(t'_i, \vec{r}\,', \vec{r})$ is the property carried by each of converging ballistic particles at the moment of the entering the model gas volume closely surrounding point y at the given time t, and where, analogously to Equation (7), property content, $\Psi_{in}$, carried by each particle in the ending point of the ballistic trajectory, which has the starting point in one of the plurality of points in space occupied by the model gas, is calculated from Equation (164) given below:

$$\Psi_{in}(t'_i, \vec{r}\,', t, \vec{r}) = \Psi_0(t'_i, \vec{r}\,') + \Psi_g(t'_i, t, \vec{g}), \quad (164)$$

where $\Psi_0(t'_i, \vec{r}\,')$ is property, which is obtained by each particle in the point of its original collision in the model gas at time $t'_i$ and $\Psi_g(t'_i, t, \vec{g})$ is a field function characterizing property value of known measure, which is accumulated or lost during ballistic traveling time because of interaction with acceleration, $\vec{g}$, if available, and where, analogously to Equation (9), $\Psi_0$ is calculated from Equation (165) given below:

$$\Psi_0(t'_i, \vec{r}\,') = \Psi_{0-}(t'_i, \vec{r}\,')[t'_i < t_0] + \Psi(t'_i, \vec{r}\,')[t'_i \geq t_0], \quad (165)$$

where $\Psi_{0-}$ is a pre-established property value in each of the plurality of points in space of the model gas system at the starting time ahead of the local initial time, and $\Psi$ is a present property value in each of the plurality of points in space of the model gas system at the starting time greater than or equal to the local initial time.

Also, since the surface area of a sphere 1802 is proportional to the square of the radius $R_i^{sp}$, as the diverged particles go farther from the source, the property flux carrying by the particles passing through any unit area is inversely proportional to the square of the distance from the point source, namely, $(\vec{r} - \vec{r}_i^c)^2$. This has led in incorporating term $$\frac{1}{4\pi} \frac{1}{|\vec{r} - \vec{r}_i^c|^2}$$

in Equations (162) and (163).

In embodiments, the step of defining the net rate of property influx per unit volume, $B_{in}^{\Psi 0\_F}$, formed by the flow of ballistic particles carrying property and converging from the space occupied by the model gas in the general non-moving point of the space occupied by the model gas at the given time further includes a step of representing $B_{in}^{\Psi 0\_F}$ by applying Equation (166):

$$B_{in}^{\Psi 0\_F}(\vec{r}, t) = -\nabla \cdot \iiint_V \frac{1}{4\pi} \frac{1}{|\vec{r} - \vec{r}_i^c|^2} \quad (166)$$

$$Q_i(t, t'_i) Z_V(t'_i, \vec{r}\,') \frac{\vec{v}(t'_i, \vec{r}\,', t, \vec{r})}{v_T(t'_i, \vec{r}\,')} \Psi_{in}(t'_i, \vec{r}\,', t, \vec{r}) dV'$$

Next, to define and formulate the net rate of property efflux per unit volume into surroundings from the general non-moving point $\vec{r}$ at the given time, t, the linear dimensions of the main control volume surrounding point $\vec{r}$ are selected to be sufficiently small for preventing two and more consecutive collisions of the same particle within the main control volume.

Figure 20:
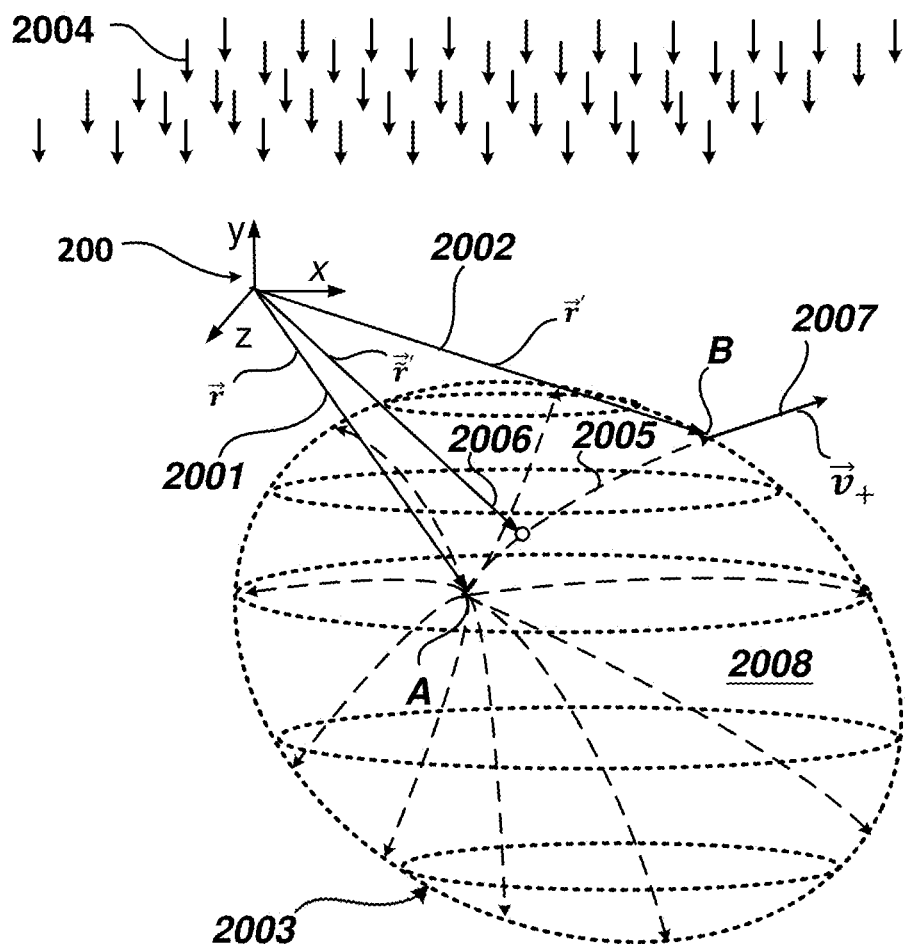
FIG. 20 is a schematic shown to illustrate a method for analytical representation of the net rate of property efflux from a stationary point in three-dimensional space occupied by the model gas.

FIG. 20 is a schematic shown to illustrate a method for analytical representation of the net rate of property efflux from a stationary point in three-dimensional space occupied by the model gas. In the example of FIG. 20, the particle having an original collision in point A indicated by the position vector $\vec{r}$ (2001) at the given time t diverges from the point source in this point and, in point B indicated by the position vector $\vec{r}\,'$ (2002) at time $t'_a$, has velocity $\vec{v}_+$ while crossing control surface 2003 enclosing the point source. We assume that property, $\Psi$ carried by the diverging ballistic particle at time $t'_a$ of crossing in point $\vec{r}\,'$ enclosing control surface 2003 was initially obtained by the particle at the moment of the original collision in point $\vec{r}$ time t. Specifically, in the point source in point $\vec{r}$ at time t (point A), each of the diverging ballistic particles obtains the thermal velocity of magnitude of $v_T$ and mass flow velocity it $\vec{u}$ (not shown). In addition, in the example of FIG. 20, for clarity with no limitation of the scope of the invention, the observer's Cartesian coordinate system 200 is oriented so y-axis is along the negative direction of the applied acceleration field 2004, which provides, for each particle, acceleration $\vec{g}$. In the following, various terms used in the equations and drawings are listed in Table 4.

TABLE 4

| Symbol | Short description |
| --- | --- |
| $\nabla = \vec{i}\frac{\partial}{\partial x} + \vec{j}\frac{\partial}{\partial y} + \vec{k}\frac{\partial}{\partial z}$ | the divergence operator in a three-dimensional configuration |
| t | the given time |
| $\vec{r}$ | position of the starting point of a plurality of ballistic trajectories of diverging ballistic particles |
| $\vec{r}\,'$ | position of the ending point of one of the plurality of ballistic trajectories of diverging ballistic particles |
| $t_a'$ | time of positioning the ending point |
| $\vec{u}(\vec{r}, t)$ | mass flow velocity of the model gas in the general non-moving at time t |
| $v_T(\vec{r}, t)$ | the magnitude of thermal velocity obtained by each particle in general non-moving point at the given time |
| $\vec{v}_+ (t, \vec{r}, t_a', \vec{r}\,')$ | a velocity vector of each of the plurality of diverging ballistic particles at time of positioning the ending point |
| $Q_+ (t_a', t)$ | the probability of traveling along the ballistic trajectory of one of the plurality of diverging ballistic particles |
| $\Psi(t, \vec{r}, t_a', \vec{r}\,')$ | property value carried by one of the plurality of diverging ballistic particles at the time of positioning the ending point |
| $n(t, \vec{r})$ | particle density in point in the starting point at the given time. |

In some embodiments, the step S104 of defining the net rate of property efflux per unit volume from the general point of the plurality of non-moving points at the given time in the model gas system in one-dimensional configuration includes the steps of:

identifying a trajectory and trajectory characteristics, for each particle diverging from the general non-moving point at the given time;

formulating the probability of ballistic traveling along the trajectory from the point of the divergence $\vec{r}$ to point $\vec{r}\,'$ on the control surface 2003;

defining vector field of the property flux along each of the ballistic trajectories in point $\vec{r}\,'$ of the trajectory; and defining the net rate of property efflux per unit volume by applying a divergence operator to the vector field of the property flux per unit area in the ending point; and shrinking volume of space surrounding the general point to the general point.

The step of identifying a trajectory and trajectory characteristics, for each particle diverging from the general non-moving point at the given time includes steps of:

defining a diverging ballistic trajectory of each particle diverging from the general non-moving point $\vec{r}$ at time, t;

determining traveling time needed, for each particle diverging from a non-moving point $\vec{r}$ at the given time, t, to cross a control surface enclosing point $\vec{r}$ in point $\vec{r}'$ of control surface;

defining an appropriate instant unit vector directing thermal velocity component along the diverging ballistic trajectory of each particle diverging from the general non-moving point $\vec{r}$ at time t;

defining the velocity vector of each particle at the moment of crossing the control surface in point $\vec{r}'$.

In some embodiments, the step of defining the diverging ballistic trajectory of each particle diverging from the general non-moving point $\vec{r}$ time, t includes a step of formulating position vector $\tilde{\vec{r}}'$ (2006) of the particle on trajectory 2005 and velocity vector $\tilde{\vec{v}}'$ (not shown) at time $\tilde{t}$ by applying Equations (167) and (168), respectively, given below:

$$\tilde{\vec{r}}' = \vec{r}'(t,\vec{r},\tilde{t}) = \vec{r} + [v_T(t,\vec{r})\vec{n}_{+c} + \vec{u}(t,\vec{r})](\tilde{t}-t) + \tfrac{1}{2}\vec{g}(\tilde{t}-t)^2, \quad (167)$$

and $$\tilde{\vec{v}}'_{+}(\tilde{t}) = \vec{v}'_{+}(t,\vec{r},\tilde{t}) = v_T(t,\vec{r})\vec{n}_{+c} + \vec{u}(t,\vec{r}) + \vec{g}(\tilde{t}-t), \quad (168)$$

where, $\vec{n}_{+c}$ is a unit vector of arbitrary direction with the initial point of origin $\vec{r}$ at time t.

In embodiments, the step of determining a traveling time needed, for each particle diverging from a non-moving point $\vec{r}$ at the given time, t, to cross a control surface enclosing point $\vec{r}$ in point $\vec{r}'$ of the control surface includes a step of resolving the equation of projectile motion, Equation (169) given below, with respect to the ballistic traveling time, $\varphi_+$:

$$\vec{r}' = \vec{r} + [v_T(t,\vec{r})\vec{n}_{+c} + \vec{u}(t,\vec{r})]\varphi_+ + \tfrac{1}{2}\vec{g}\varphi_+^2, \quad (169)$$

which is obtained by assigning $\tilde{t}=t'_a$ and substitution of $\varphi_+ = t'_a - t$ in Equation (167) and rearrangement of the terms. Traveling time $\varphi_+$ is needed to indicate time $t'_a$ at which the departing particle has reached point $\vec{r}'$ on control surface 2003 enclosing point $\vec{r}$.

In embodiments, the step of defining an appropriate instant unit vector directing thermal velocity component along the diverging ballistic trajectory of each particle diverging from the general non-moving point $\vec{r}$ at time t includes the steps of:

presenting Equation (169) as:

$$\varphi_+ v_T \vec{n}_{+c} = \vec{r}' - \vec{r}_a^c, \quad (170)$$

where $\vec{n}_{+c}$ is a unit vector and $\vec{r}_a^c$ (not shown) is a virtual position of the particle leaving point $\vec{r}$ at time t, which would have zero magnitude of thermal velocity and is observed at time $t'_a$ and, in formula form, is expressed as:

$$\vec{r}_a^c = \vec{r} + \vec{u}(t,\vec{r})\varphi_+ + \tfrac{1}{2}\vec{g}\varphi_+^2; \quad (171)$$

and deriving $\vec{n}_{+c}$ from Equation (170), which is given as $$\vec{n}_{+c} = \frac{\vec{r}' - \vec{r}_a^c}{|\vec{r}' - \vec{r}_a^c|}. \quad (172)$$

where, referring to FIG. 20, $\vec{n}_{+c}$ (not shown) is interpreted as a unit vector of origin $\vec{r}_a^c$, at time $t'_a$, which directs the vector of the thermal velocity component and where $t'_a$ is the time of positioning in point $\vec{r}'$, which is on the control surface 2003.

In some embodiments, the step of defining the velocity vector, $\vec{v}_+$, (2007) of each particle at the moment of crossing the control surface in point $\vec{r}'$ includes representing $\vec{v}_+$ by applying Equation (173) given below:

$$\vec{v}_+(t,\vec{r},t'_a,\vec{r}') = v_T(t,\vec{r})\vec{n}_{+c} + \vec{u}(t,\vec{r}) + \vec{g}\varphi_+, \quad (173)$$

which is obtained by assigning $\tilde{t}=t'_a$ and substitution of $t'_a-t=\varphi_+$ in Equation (168).

In some embodiments, the step of formulating the probability, $Q_+$, of ballistic traveling along the trajectory from point of the divergence $\vec{r}$ to point $\vec{r}'$ on control surface 2003 includes a step of representing $Q_+(t'_a, t)$ by applying Equation (174) given below:

$$Q_+(t'_a,t) = Q_+(0,\varphi_{i+}) = \exp(-\int_t^{t'_a} P_c(\tilde{\vec{r}}'(\tilde{t})) v_{rel}(\tilde{\vec{r}}'(\tilde{t})) d\tilde{t}) \quad (174)$$

where $t'_a = t + \varphi_+$ is a time of the particle positioning in point $\vec{r}'$ within the volume of the model gas system, $P_c(\tilde{\vec{r}}'(\tilde{t}))$ is the number of particles within a collision tube placed in the model gas having a particle density of $n(\tilde{\vec{r}}'(\tilde{t}))$ at time $\tilde{t}$, $v_{rel}(\tilde{\vec{r}}'(\tilde{t}))$ is an average magnitude of the relative velocity between the particle traveling along the diverging ballistic trajectory and nearby passed another particle being within the collision tube along the diverging ballistic trajectory at time $\tilde{t}$, with the method of its determination described above.

In some embodiments, the step of defining vector field of the property flux, $J_r^\Psi$, along each of the ballistic trajectories in point $\vec{r}'$ of the trajectory includes a step of representing $J_r^\Psi$ by applying Equation (175) given below:

$$J_r^\Psi = \tfrac{1}{2} n(t,\vec{r}) Q_+(t'_a,t) \vec{v}_+(t,\vec{r},t'_a,\vec{r}') \Psi(t,\vec{r},t'_a,\vec{r}'); \quad (175)$$

In some embodiments, the step of defining the net rate of property efflux per unit volume, $B_{out}^{\Psi\_FS}$, from a point source positioned in the general non-moving point $\vec{r}$ at the given time t includes a step of representing $B_{out}^{\Psi\_FS}$ by applying Equation (176) given below:

$$B_{out}^{\Psi\_FS}(\vec{r},t) = \tfrac{1}{2}\{\nabla \cdot [n(t,\vec{r}) Q_+(t'_a,t) \vec{v}_+(t,\vec{r},t'_a,\vec{r}') \Psi(t,\vec{r},t'_a,\vec{r}')]\}_{\vec{r}' \to \vec{r}} \quad (176)$$

which is obtained by executing divergence operator $\nabla \cdot$ to the vector field of Equation (175) followed by shrinking volume of control volume 2008 confined by the control surface 2003 to infinitely small volume, namely, $\vec{r}' \to \vec{r}$, which also leads to the limit $\vec{r}_a^c \to \vec{r}$.

Finally, in some embodiments, the step S106 includes establishing an integral property balance equation for each of one or more properties being transported by the plurality of particles in each of the plurality of non-moving points in a way that, in the general point at the given time, a term of the net rate of property influx per unit volume is equated to sum of a first term of temporal rate of a property change per unit volume and a second term of the net rate of property efflux per unit volume. The integral form of property balance equation for each of one or more properties being transported by the plurality of particles in each of the plurality of non-moving points is formulated by Equation (177) given below, which is obtained by substitution of Equations (166) and (176) in Equation (135):

$$\frac{\partial}{\partial t}[n(t,\vec{r})\Psi(t,\vec{r})] + \tag{177}$$

$$\frac{1}{2}\{\nabla \cdot [n(t,\vec{r})Q_+(t'_a,t)\vec{v}_+(t,\vec{r},t'_a,\vec{r}')\Psi(t,\vec{r},t'_a,\vec{r}')]\}_{\vec{r}' \to \vec{r}} =$$

$$-\nabla \cdot \int\int\int_V \frac{1}{4\pi} \frac{1}{|\vec{r}-\vec{r}_i^c|^2}$$

$$Q_i(t,t'_i)Z_V(t'_i,\vec{r}') \frac{\vec{v}(t'_i,\vec{r}',t,\vec{r})}{v_T(t'_i,\vec{r}')} \Psi_{in}(t'_i,\vec{r}',t,\vec{r})dV'$$

where the integral property balance equation is formed for each unknown property/variable and the number of equations should determine each of the unknown properties characterizing model gas flow.

It is believed that the system and method as described and many of its attendant advantages will be understood by the preceding description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

References which are incorporated herein by reference in their entirely and referred to above throughout using brackets, [ ]:
1. https://www.comsol.com/multiphysics/navier-stokes-equations
2. J. E. Mahan, Physical Vapor Deposition of Thin Films, John Wiley & Sons, New-York, (2000), p.1. ISBN 0-471-33001-9.
3. M. Hssikou, J. Baliti, and M. Alaoui, "Extended Macroscopic Study of Dilute Gas Flow within a Microcavity", Modelling and Simulation in Engineering, Vol. 2016, Article ID 7619746, 9 pages, http://dx.doi.org/10.1155/2016/7619746; posted at https://www.hindawi.com/journals/mse/2016/7619746/.

What is claimed is:

1. A computer-implemented method for modeling transport processes in fluids comprising:
generating a model of fluid flow in a fluid system including a flow of rarefied gases, by treating the fluid flow as a flow of a model gas in a model gas system being identical to the fluid system,
wherein the model gas is composed of a plurality of particles including molecules, which move randomly and interact by collisions,
wherein each of the plurality of particles is assigned to travel with a probability between any of two points in a space occupied by the model gas by following a ballistic trajectory governed by a law of motion, the ballistic trajectory having a starting point in one of a plurality of points of original collisions and an ending point in one of a plurality of points of ending collisions,
wherein each of the plurality of points of original collisions is treated as a point source,
wherein each of the plurality of points of ending collisions is treated as a point sink, and
wherein each of a plurality of ballistic particles moving from the point source to the point sink is treated as a property carrier created in the point source at a time of original collision by obtaining one or more of properties comprising one or more of mass, momentum, and energy of specific values being intrinsic to the point source, and ended in the point sink at time of ending collision by transferring one or more of properties of specific values in the point sink; and
simulating, on a computer, the fluid flow in the fluid system including the flow of rarefied gases,
wherein the computer comprises:
a computer readable medium storing executable instructions that model the fluid flow in the fluid system and implement a model of property balance; and
a processor for executing the instructions, thus simulating the fluid flow in the fluid system, while implementing the model of property balance;
wherein implementing the model of property balance comprises
establishing an integral property balance equation for a property being transported by a plurality of converging ballistic particles and a plurality of diverging ballistic particles in each of a plurality of non-moving points in the space occupied by the model gas at a given time, and
wherein the simulation computes the flow of the model gas in each of the plurality of non-moving points at the given time, thereby reliably predicting the fluid flow including the flow of rarefied gases; and
displaying results of simulation on a display device of the computer.

2. The method of claim 1, wherein a value of property delivered in the point sink by each of the plurality of converging ballistic particles is evaluated regarding whether the value of property is conserved, whether the value of property is changed because of aging, or whether the value of property is modified because of interaction with an external field during a ballistic traveling time.

3. The method of claim 1, wherein
each of a plurality of collisions on a gas-solid interface of the model gas system, which has resulted in diffuse particle scattering from the gas-solid interface, is treated as an act of interaction involving a property transfer from the gas-solid interface to a scattered particle,
wherein each of a plurality of points of diffuse particle scattering on the gas-solid interface is treated as a heterogeneous point source for each of a plurality of scattered particles,
wherein velocity of each of a plurality of heterogeneous point sources on the gas-solid interface is assigned to be equal to velocity of the gas-solid interface in each of a plurality of corresponding points of diffuse particle scattering at time of diffuse particle scattering, and
wherein point source strength of each of the plurality of heterogeneous point sources on the gas-solid interface is assigned to be directly proportional to a property accommodation coefficient in a corresponding point on the gas-solid interface.

4. The method of claim 1, further comprising steps of:
establishing an initial time, wherein the initial time is treated as a time of a specific modification of the model gas system in a specific location comprising specific modification of one or more of temperature, velocity of a gas-solid interface, and application of an external field that may modify property value;

specifying the given time, wherein the given time is greater than or equal to the initial time;

specifying the model gas system, wherein the model gas system is specified by defining model gas properties comprising a gas material, pressure, temperature and by establishing a geometry model, wherein establishing the geometry model comprises setting geometry and boundary conditions during a period from a pre-initial time until the given time;

establishing discretization parameters comprising a set of discretization points in the space occupied by the model gas, wherein each of the set of discretization points is assigned to a corresponding point of the plurality of non-moving points;

calculating, for each of the set of discretization points in the space occupied by the model gas, a local initial time, wherein the local initial time is greater than or equal to the initial time;

obtaining a past property value, for each of the set of discretization points in the space occupied by the model gas at time, which is ahead of the local initial time;

formulating, for each of the set of discretization points at the given time, an integral form of property balance, wherein the integral form of property balance is established in a way that, in a selected point of the set of discretization points at the given time, a net rate of property influx per unit volume from the model gas system, which is formed by converging ballistic particles and calculated by summing a rate of property influx from the set of discretization points surrounding the selected point is equated to a sum of a temporal rate of a property change per unit volume and a net rate of property efflux per unit volume from the selected point of the set of discretization points, where the plurality of converging ballistic particles comprises a past plurality of converging ballistic particles and a present plurality of converging ballistic particles, where each of the past plurality of converging ballistic particles delivers the past property value from the model gas system, where each of the present plurality of converging ballistic particles delivers a present property value from the model gas system, where the past property value is obtained by the converging ballistic particle in a point of an original collision at the time ahead of the local initial time, where the past property value is treated as a pre-established property value at the time of the original collision, and where the present property value is obtained by the converging ballistic particle in a point of the original collision at the time which follows the local initial time; and computing flow of the model gas by the steps of:

obtaining a first approximation of the present property value in each of the plurality of non-moving points at the given time by considering an impact of the plurality of converging ballistic particles, and obtaining a solution of the present property value in each of the plurality of non-moving points at the given time by taking into account a mutual effect of property exchange between interacting particles, which comprises a sequential approximation method, thereby reliably predicting gas flow including the flow of a rarefied gas.

5. The method of claim 1, wherein the integral property balance equation is established in a way that, in a general point of the plurality of non-moving points in the space occupied by the model gas at the given time, a net rate of property influx per unit volume, which is formed by the plurality of converging ballistic particles, each of the plurality of converging ballistic particles is selected from a plurality of ballistic particles by the ballistic trajectory having the ending point in the general point at the given time, is equated to a sum of a temporal rate of a property change per unit volume and a net rate of property efflux per unit volume, which is formed by the plurality of diverging ballistic particles, each of the plurality of diverging ballistic particles is selected from the plurality of ballistic particles by the ballistic trajectory having the starting point in the general point at the given time.

6. A computer-implemented method for modeling transport processes in fluids comprising:

generating a model of fluid flow in a fluid system including a flow of rarefied gases, by treating the fluid flow as a flow of a model gas in a model gas system being identical to the fluid system, wherein the model gas is composed of a plurality of particles including molecules, which move randomly and interact by collisions, wherein each of the plurality of particles is assigned to travel with a probability between any of two points in a space occupied by the model gas by following a ballistic trajectory governed by a law of motion, the ballistic trajectory having a starting point and an ending point, and wherein each of a plurality of ballistic particles transports a combination of one or more of properties comprising one or more of mass, momentum, and energy between the starting point and the ending point;

generating a model of property balance, by transforming parameters characterizing motion of the plurality of ballistic particles into parameters characterizing the fluid flow using the model of fluid flow, wherein generating the model of property balance comprises specifying a geometry model, defining a net rate of property influx per unit volume from the model gas system in a general non-moving point in the space occupied by the model gas at a given time, the net rate of property influx per unit volume, which is formed by way of a plurality of converging ballistic particles, each of the plurality of converging ballistic particles is selected from the plurality of ballistic particles by the ballistic trajectory having the ending point in the general non-moving point at the given time, wherein the given time is greater than an initial time, wherein the initial time is treated as a time before which the fluid system is described, wherein the plurality of converging ballistic particles comprises a first plurality of converging ballistic particles and a second plurality of converging ballistic particles, where the ballistic trajectory of one of the first plurality of converging ballistic particles has the starting point in the space occupied by the model gas, and where the ballistic trajectory of one of the second plurality of converging ballistic particles has the starting point on a gas-solid interface, defining a net rate of property efflux per unit volume from the general non-moving point at the given time, the net rate of property efflux per unit volume, which is formed by a plurality of diverging ballistic particles, each of the plurality of diverging ballistic particles is selected from the plurality of ballistic particles by the ballistic trajectory having the starting point in the general non-moving point at the given time; and establishing an integral property balance equation for each of one or more properties being transported by the plurality of ballistic particles in the general non-moving point;

simulating, on a computer, the fluid flow in the fluid system including the flow of rarefied gases, wherein the computer comprises:

a computer readable medium storing executable instructions that model the fluid flow in the fluid system and implement the model of property balance; and a processor for executing the instructions, thus simulating the fluid flow in the fluid system, while implementing the model of property balance;

wherein the simulation computes the flow of the model gas in every general point of a plurality of non-moving points in the space occupied by the model gas at the given time, thereby reliably predicting the fluid flow including the flow of rarefied gases; and displaying results of simulation on a display device of the computer.

7. The method of claim 6, wherein the step of specifying geometry model further comprises the steps of:

establishing geometry and boundary conditions, wherein geometry and boundary conditions are established during a period from a pre-initial time until the given time; and establishing a dynamic history of the model gas, wherein the dynamic history of the model gas, which is in form of one or more of instant distribution patterns of model gas properties within the model gas system at a set of different sequential moments, is established during a pre-initial period, and wherein the pre-initial period is set to be not less than a reliable period before the initial time.

8. The method of claim 7, wherein the reliable period before the initial time is estimated as $$\varphi_{i0}^{rel} \cong -\frac{\ln(MAV)}{[P_c v_{rel}]_{max}},$$

where $\varphi_{i0}^{rel}$ is the reliable period before the initial time, MAV is a minimum absolute value corresponding to a precision format supported by a computer hardware, $P_c$ is a number of particles within a collision tube of a unit length placed in the model gas, $v_{rel}$ is an average magnitude of velocity of a traveling particle with respect to one of a plurality of nearby passed particles, and $[P_c v_{rel}]_{max}$ is a highest value of product of $P_c v_{rel}$ in the model gas system.

9. The method of claim 6, wherein the step of defining the net rate of property influx per unit volume from the model gas system further comprises a step of defining a net rate of total property influx per unit volume from a surrounding model gas in the general non-moving point, wherein the net rate of total property influx per unit volume is formed by the first plurality of converging ballistic particles, and wherein each of the plurality of points of original collisions is treated as a point source.

10. The method of claim 9, wherein the step of defining the net rate of total property influx per unit volume from the surrounding model gas in the general non-moving point comprises:

identifying, for each of the first plurality of converging ballistic particles, the ballistic trajectory;

defining a probability of traveling along the ballistic trajectory;

defining a net rate of particle efflux per unit volume from one of the plurality of points of an original collision at time of the original collision, wherein time of original collision for each of the plurality of the converging ballistic particles is identified by the ballistic trajectory, and wherein velocity of the point source for each of the first plurality of converging ballistic particles is assigned to be equal to mass flow velocity of the model gas in a corresponding point of the original collision at the time of the original collision;

defining a net rate of property flux per unit area in the general non-moving point at the given time from one of a plurality of point sources;

defining a net rate of total property flux per unit area in the general non-moving point at the given time from the plurality of point sources; and defining the net rate of total property influx per unit volume in the general non-moving point at the given time by applying divergence operator to the net rate of total property flux.

11. The method of claim 10, wherein the step of the identifying the ballistic trajectory comprises:

determining one or more of characteristics of the ballistic trajectory comprising the time of the original collision, an appropriate instant unit vector defining the ballistic trajectory in the starting point, and a velocity vector in the ending point of the ballistic trajectory at the given time; and defining a size of an expansion zone.

12. The method of claim 10, wherein the step of defining the net rate of total property influx per unit volume in a one-dimensional configuration further comprises a step of formulating the net rate of total property influx as $$B_{in}^{\Psi\lambda\_F}(y,t) = -\frac{1}{2}\frac{\partial}{\partial y}\int_{y_{b2}}^{y_{b1}} Q_i(t,t_i')Z_V(t_i',y')\frac{v(t_i',y',t,y)}{v_T(t_i',y')}\Psi_{in}(t_i',y',t,y)dy',$$

wherein $$\frac{\partial}{\partial y}$$

is the divergence operator in the one-dimensional configuration, $B_{in}^{\Psi\lambda\_F}$ is the net rate of property influx per unit volume, t is the given time,
t'$_i$ is the time of the original collision,
y is position of the ending point in one of the plurality of points of ending collisions,
y' is position of the starting point in one of the plurality of points of original collisions,
V$_T$(t'$_i$, y') is an average magnitude of thermal velocity in the starting point at the time of the collision,
Z$_V$(t'$_i$, y') is rate of collisions per unit volume in the starting point at the time of original collision,
v(t'$_i$, y', t, y) is a velocity vector in the ending point at the given time,
Q$_i$(t, t'$_i$) is the probability of traveling along the ballistic trajectory,
Ψ$_{in}$(t'$_i$, y', t, y) is a property value delivered in the ending point at the given time by one the first plurality of converging ballistic particles,
yb1 is a lower limit of integration over volume of space occupied by the model gas,
yb2 is an upper limit of integration over a volume of space occupied by the model gas, and
Z$_V$(t'$_i$, y') is calculated as $$Z_V(t'_i,y')=\tfrac{1}{2}P_c(t'_i,y')v_{rel}(t'_i,y')n(t'_i,y'),$$

where n(t'$_i$, y') is particle density, P$_c$(t'$_i$, y') is an average number of collisions per unit length, and v$_{rel}$(t'$_i$, y') is average magnitude of relative velocity.

13. The method of claim 12, wherein the probability of traveling along the ballistic trajectory in the one-dimensional configuration is calculated as $$Q_i(t,t'_i)=\exp(-\int_{t'_i}^{t}P_c(\tilde{y}(\tilde{t}))v_{rel}(\tilde{y}(\tilde{t}))d\tilde{t}),$$

where $\tilde{t}$ is a parametric time in a range of t'$_i$ < $\tilde{t}$ ≤ t, $\tilde{y}(\tilde{t})$ is a trajectory point of the ballistic trajectory at parametric time $\tilde{t}$, v$_{rel}$($\tilde{y}(\tilde{t})$) is an average magnitude of relative velocity in the trajectory point, and P$_c$($\tilde{y}(\tilde{t})$) is an average number of collisions per unit length in the trajectory point.

14. The method of claim 13, wherein the average magnitude of relative velocity in the trajectory point is calculated by steps of:
defining an instant magnitude of velocity of one of the plurality of the converging ballistic particles in the trajectory point with respect to one of a plurality of nearby passed particles in the trajectory point; and
averaging the instant magnitude of velocity over a plurality of directions of a thermal velocity component of one of the plurality of nearby passed particles,
wherein a step of averaging comprises calculating the average magnitude of relative velocity as $$v_{rel}(\tilde{y}(\tilde{t})) = \frac{|v_T(t'_i, y') - v_T(\tilde{y}(\tilde{t}))| + (v_T(t'_i, y') + v_T(\tilde{y}(\tilde{t})))}{2},$$

where v$_{rel}$($\tilde{y}(\tilde{t})$) is the average magnitude of relative velocity in the trajectory point, v$_T$(t'$_i$, y') is average magnitude of the thermal velocity component in the starting point of the ballistic trajectory, and v$_T$($\tilde{y}(\tilde{t})$) is the average magnitude of the thermal velocity component of one of the plurality of nearby passed particles in the trajectory point.

15. The method of claim 10, wherein the step of defining the net rate of total property influx per unit volume from the surrounding model gas, in a three-dimensional configuration further comprises a step of formulating the net rate of total property influx as $$B_{in}^{\Psi\lambda\_F}(\vec{r}, t) =$$

$$-\nabla \cdot \int\int\int_V \frac{1}{4\pi}\frac{1}{|\vec{r}-\vec{r}_i^c|^2}Q_i(t,t'_i)Z_V(t'_i,\vec{r}')\frac{\vec{v}(t'_i,\vec{r}',t,\vec{r})}{v_T(t'_i,\vec{r}')}\Psi_{in}(t'_i,\vec{r}',t,\vec{r})dV',$$

wherein $$\nabla = \vec{i}\frac{\partial}{\partial x}+\vec{j}\frac{\partial}{\partial y}+\vec{k}\frac{\partial}{\partial z}$$

is the divergence operator in the three-dimensional configuration,
B$_{in}^{\Psi\lambda\_F}$ is the net rate of total property influx per unit volume from the surrounding model gas,
t is the given time
t'$_i$ is the time of the original collision,
$\vec{r}$ is position of the ending point in one of the plurality of points of ending collisions,
$\vec{r}'$ is position of the starting point in one of the plurality of points of original collisions,
v$_T$(t'$_i$, $\vec{r}'$) is an average magnitude of thermal velocity in the starting point at the time of original collision,
Z$_V$(t'$_i$, $\vec{r}'$) is rate of collisions per unit volume in the starting point at the time of original collision,
$\vec{v}$(t'$_i$, $\vec{r}'$, t, $\vec{r}$) is a velocity vector in the ending point at the given time,
Q$_i$(t, t'$_i$) is the probability of traveling along the ballistic trajectory,
Ψ$_{in}$(t'$_i$, $\vec{r}'$, t, $\vec{r}$) is a property value delivered in the ending point at the given time by one of the first plurality of converging ballistic particles, is a volume of integration over the space occupied by the model gas,
$\vec{r}_i^c$ is position at the given time of a virtual particle which has zero magnitude of thermal velocity, and
Z$_V$(t'$_i$, $\vec{r}'$) is calculated as $$Z_V(t'_i,\vec{r}')=\tfrac{1}{2}n(t'_i,\vec{r}')P_c(t'_i,\vec{r}')v_{rel}(t'_i,\vec{r}'),$$

where, n(t'$_i$, $\vec{r}'$) is particle density, P$_c$(t'$_i$, $\vec{r}'$) is an average number of collisions per unit length, and v$_{rel}$(t'$_i$, $\vec{r}'$) is the average magnitude of relative velocity.

16. The method of claim 15, wherein the probability of traveling along the ballistic trajectory in the three-dimensional configuration is calculated as $$Q_i(t,t'_i)=\exp(-\int_{t'_i}^{t}P_c(\vec{\tilde{r}}(\tilde{t}))v_{rel}(\vec{\tilde{r}}(\tilde{t}))d\tilde{t}),$$

where $\tilde{t}$ is a parametric time in a range of t'$_i$ < $\tilde{t}$ ≤ t, $\vec{\tilde{r}}(\tilde{t})$ is a trajectory point of the ballistic trajectory at parametric time $\tilde{t}$, v$_{rel}$($\vec{\tilde{r}}(\tilde{t})$) is average magnitude of relative velocity in the trajectory point, and P$_c$($\vec{\tilde{r}}(\tilde{t})$) is the average number of collisions per unit length in the trajectory point.

17. The method of claim 16, wherein the average magnitude of relative velocity in the trajectory point is calculated by steps of:
defining an instant magnitude of velocity of one of the plurality of the converging ballistic particles in the trajectory point with respect to one of a plurality of nearby passed particles in the trajectory point; and averaging the instant magnitude of velocity over a plurality of directions of a thermal velocity component of one of the plurality of nearby passed particles.

18. The method of claim 6, wherein property value delivered in the ending point by each of the plurality of converging ballistic particles is calculated as $$\Psi_{in} = \Psi_\lambda + \Psi_g,$$

where $\Psi_{in}$ is the property value delivered in the ending point, $\Psi_g$ is a field function characterizing property value of known measure, which is changed during traveling time, $\varphi$, because of interaction with external field comprising modification of momentum in gravitation field, $\Psi_\lambda$ is an age function characterizing the property value in the ending point of the ballistic trajectory, which is calculated as $$\Psi_\lambda = \Psi_0 e^{-\lambda \varphi},$$

where $\lambda$ is an aging coefficient, which is in range from negative to positive values including zero value, and where $\Psi_0$ is a starting function characterizing the property value carried by each of the plurality of ballistic particles in the starting point of the ballistic trajectory at a starting time, $t_i$, which is calculated as $$\Psi_0(t'_i, y') = \Psi_{0-}[t_i < t_{i0}] + \Psi[t_i \geq t_{i0}],$$

where $t_{i0}$ is a local initial time, each of expressions enclosed in the bracket is the Iverson bracket, which converts a statement in brackets into a number, the number is one if the statement is satisfied, and the number is zero otherwise, $\Psi$ (0−) is a pre-established property value in each of the plurality of points in space of the model gas system at the starting time ahead of the local initial time, and $\Psi$ is a present property value in each of the plurality of points in space of the model gas system at the starting time greater than or equal to the local initial time.

19. The method of claim 6, wherein the step of defining the net rate of property influx per unit volume from the model gas system further comprises a step of defining a net rate of total property influx per unit volume from a gas-solid interface exhibiting mixed diffuse and specular particle scattering,
wherein the net rate of total property influx per unit volume from the gas-solid interface is formed by the second plurality of converging ballistic particles, each of the second plurality of converging ballistic particles is selected from the plurality of converging the ballistic particles by the ballistic trajectory having the starting point in one of a plurality of points of original collisions on the gas-solid interface, and wherein each of the plurality of points of original collisions resulted in diffuse particle scattering from the gas-solid interface is treated as a heterogeneous point source.

20. The method of claim 19, wherein the step of defining the net rate of total property influx per unit volume from the gas-solid interface comprises:
identifying the ballistic trajectory, for each of the second plurality of converging ballistic particles,
wherein velocity of the heterogeneous point source for each of the second plurality of converging ballistic particles is assigned to be equal to velocity of the gas-solid interface in a corresponding point of original collisions on the gas-solid interface at a time of diffuse particle scattering;
defining a probability of traveling along the ballistic trajectory;
defining a rate of collisions per unit area in one of a plurality of heterogeneous point sources on the gas-solid interface at the time of diffuse particle scattering, wherein time of the diffuse particle scattering for each of the second plurality of converging ballistic particles is identified by the ballistic trajectory;
defining a net rate of property flux per unit area in the general non-moving point at the given time from one of the plurality of heterogeneous point sources;
defining a net rate of total property flux in the general non-moving point at the given time from the plurality of heterogeneous point sources on one or more of gas-solid interfaces; and
defining the net rate of total property influx per unit volume in the general non-moving point at the given time by applying divergence operator to the net rate of total property flux.

21. The method of claim 20, wherein the step of defining the rate of collisions comprises the steps of:
defining a bulk component of an impingement rate formed by particles chosen from the plurality of the converging ballistic particles originated from the original collisions in the space occupied by the model gas;
defining a bulk-specular component of the impingement rate formed by the particles chosen from the plurality of the converging ballistic particles originated from the original collisions in the space occupied by the model gas and having at least the last preceding specular scattering;
defining a diffuse component of the impingement rate formed by the particles chosen from the plurality of the converging ballistic particles originated from one or more of heterogeneous point sources;
defining a diffuse-specular component of the impingement rate formed by the particles chosen from the plurality of converging the ballistic particles originated from original diffuse scatterings from one or more of heterogeneous point sources and having at least the last preceding specular scattering; and
summing the bulk component, the bulk-specular component, the diffuse component, and the diffuse-specular component of the impingement rate,
wherein each of a plurality of impinging particles is selected by an impinging trajectory allowing to target the gas-solid interface in a specific location of the gas-solid interface at a specific time.

22. The method of claim 20, wherein the step of defining the net rate of total property influx per unit volume further comprises a step of formulating the net rate of total property influx as $$B_{in}^{\Psi \lambda\_b} = -\frac{\partial}{\partial y}\left[Q_{ib}(t, t'_{ib})\sigma Z_b(t'_{ib}, y_b)\frac{v_b(t'_{ib}, y_b, t, y)}{v_{Tb1}(t'_{ib}, y_b)}\Psi_{inb}(t'_{ib}, y_b, \lambda, \varphi_{ib1})\right],$$

wherein
$B_{in}^{\Psi\lambda\_b}$ is the net rate of total property influx from the gas-solid interface in one-dimensional configuration,
t is the given time,
$t'_{ib}$ is the time of scattering from the gas-solid interface,
y is position of the ending point,
$y_b$ is position of the starting point in one of the plurality of points of original collisions on the gas-solid interface, $v_{Tb}(t'_{ib}, y_b)$ is a magnitude of thermal velocity obtained in the starting point at the time of scattering from the gas-solid interface, $Z_b(t'_{ib}, y_b)$ is the rate of collisions per unit area in the starting point at the time of scattering from the gas-solid interface, $v_b(t'_{ib}, y_b, t, y)$ is a velocity vector in the ending point at the given time, $Q_{ib}(t, t'_{ib})$ is the probability of traveling along the ballistic trajectory of the second plurality of converging ballistic trajectories, $\Psi_{inb}(t'_{ib}, y', \lambda, t, y)$ is a property value delivered in the ending point at the given time by one of the second plurality of converging ballistic particles, $\lambda$ is aging coefficient, and $\sigma$ is a property accommodation coefficient.

23. The method of claim 6, wherein the step of defining the net rate of property efflux per unit volume from the general non-moving point at the given time in the model gas system comprises:

identifying, for each of the plurality of diverging ballistic particles, the ballistic trajectory starting from the general non-moving point at the given time and ending in one of the plurality of points of ending collisions surrounding the general non-moving point;

defining a probability of traveling along the ballistic trajectory;

defining a vector field of a property flux per unit area in the ending point the ballistic trajectory; and defining the net rate of property efflux per unit volume by applying a divergence operator to the vector field of the property flux per unit area in the ending point; and shrinking volume of space surrounding the general non-moving point to the general non-moving point.

24. The method of claim 23, wherein the step of defining the net rate of property efflux per unit volume in three-dimensional configuration comprises a step of formulating the net rate of property efflux as $$B_{out}^{\Psi\_FS}(\vec{r},t) = \tfrac{1}{2}\{\nabla \cdot [n(t,\vec{r})Q_+(t'_a,t)\vec{v}_+(t,\vec{r},t'_a,\vec{r}')\Psi(t,\vec{r},t'_a,\vec{r}')]\}_{\vec{r}' \to \vec{r}},$$

where $$\nabla = \vec{i}\frac{\partial}{\partial x} + \vec{j}\frac{\partial}{\partial y} + \vec{k}\frac{\partial}{\partial z}$$

is the divergence operator in the three-dimensional configuration, $B_{out}^{\Psi\_FS}$ is the net rate of property efflux per unit volume, t is the given time, $\vec{r}$ is position of the starting point of a plurality of ballistic trajectories of diverging ballistic particles, $\vec{r}'$ is position of the ending point of one of the plurality of ballistic trajectories of diverging ballistic particles, $t'_a$ is time of positioning the ending point, $\vec{v}_+(t, \vec{r}, t'_a, \vec{r}')$ is a velocity vector of a diverging ballistic particles at the time of positioning the ending point, $Q_+(t'_a, t)$ is probability of traveling along the ballistic trajectory of the diverging ballistic particle, $\Psi_\lambda(t, \vec{r}, t'_a, \vec{r}')$ is property value carried by the diverging ballistic particle at the time of positioning the ending point, and $n(t, \vec{r})$ is particle density in the starting point at the given time.

25. The method of claim 23, wherein the step of defining the net rate of property efflux per unit volume in one-dimensional configuration comprises a step of formulating the net rate of property efflux as $$B_{out}^{\Psi\_FS}(t,y) = \tfrac{1}{2}\left\{\frac{\partial}{\partial y}[n(t,y)Q_+(t'_a,t)v_+(t,y,t'_a,y')\Psi_\lambda(t,y,t'_a,y')]\right\}_{y' \to y},$$

where $$\frac{\partial}{\partial y}$$

is the divergence operator in the one-dimensional configuration, $B_{out}^{\Psi\_FS}$ is the net rate of property efflux per unit volume, t is the given time, y is position of the starting point of a plurality of ballistic trajectories of diverging ballistic particles, y' is position of the ending point of one of the plurality of ballistic trajectories of diverging ballistic particles, $t'_a$ is a time of positioning in the ending point, $v_+(t, y, t'_a, y')$ is a velocity vector of each of the plurality of diverging ballistic particles at the time of positioning the ending point, $Q_+(t'_a, t)$ is probability of traveling along the ballistic trajectory of one of the plurality of diverging the ballistic particles, $\Psi_\lambda(t, y, t'_a, y)$ is property value carried by one of the plurality of diverging ballistic particles at the time of positioning the ending point, and $n(t, y)$ is particle density in the starting point at the given time.

26. A computer-implemented method for modeling transport processes in fluids being in a stable condition comprising:

generating a model of fluid flow in a fluid system including a flow of rarefied gases, by treating the fluid flow as a flow of a model gas in a model gas system being identical to the fluid system, wherein the model gas is composed of a plurality of particles including molecules, which move randomly and interact by collisions, wherein each of the plurality of particles is assigned to travel with a probability between any of two points of a plurality of points in a space occupied by the model gas by following a ballistic trajectory governed by a law of motion, the ballistic trajectory having a starting point and an ending point, and wherein each of a plurality of ballistic particles transports a combination of one or more of properties comprising one or more of mass, momentum, and energy between the starting point and the ending point;

generating a model of property balance, by transforming parameters characterizing motion of the plurality of ballistic particles into parameters characterizing the fluid flow using the model of fluid flow,
wherein generating the model of property balance comprises:
specifying geometry and boundary conditions,
defining a net rate of property influx per unit volume from the model gas system in a general non-moving point in the space occupied by the model gas, the net rate of property influx per unit volume, which is formed by a plurality of converging ballistic particles, each of the plurality of converging ballistic particles is selected from the plurality of ballistic particles by the ballistic trajectory having the ending point in the general non-moving point,
defining a net rate of property efflux per unit volume from the general non-moving point, the net rate of property efflux per unit volume, which is formed by a plurality of diverging ballistic particles, each of the plurality of diverging particles is selected from the plurality of ballistic particles by the ballistic trajectory having the starting point in the general non-moving point; and
establishing an integral property balance equation for each of one or more properties being transported by the plurality of ballistic particles the general non-moving point;
and
simulating, on a computer, the fluid flow in the fluid system including the flow of rarefied gases,
wherein the computer comprises:
a computer readable medium storing executable instructions that model the fluid flow in the fluid system and implement the model of property balance; and
a processor for executing the instructions, thus simulating the fluid flow in the fluid system, while implementing the model of property balance;
wherein the simulation computes the flow of the model gas in every general point of a plurality of non-moving points in the space occupied by the model gas, thereby reliably predicting the fluid flow including the flow of rarefied gases; and
displaying results of simulation on a display device of the computer.

27. The method of claim 26, further comprising:
treating each point of the plurality of points in the space occupied by the model gas as a point of collisions for each of the plurality of ballistic particles converging in a selected point;
treating each of the collisions as either a point source for each of the plurality of diverging ballistic particles or a point sink for each of the plurality of converging ballistic particles; and
treating each of the plurality of ballistic particles moving from the point source to the point sink as a property carrier created in the point source by obtaining one or more of properties of specific values being intrinsic to the model gas surrounding the point source, and ended in the point sink by transferring one or more of obtained properties in the point sink,
wherein value of property delivered by each of the plurality of ballistic particles converging in the point sink is evaluated regarding whether the value of property is conserved, whether the value of property is changed because of aging, or whether the value of property is modified because of interaction with an external field during a ballistic traveling time.

28. The method of claim 26, further comprising:
treating each of a plurality of collisions on a gas-solid interface of the model gas system, which has resulted in diffuse particle scattering from the gas-solid interface, as an act of interaction involving a property transfer from the gas-solid interface to a scattered particle; and
treating each of a plurality of points of diffuse particle scattering on the gas-solid interface as a heterogeneous point source for each of a plurality of the scattered particles,
wherein the gas-solid interface reveals mixed diffuse and specular particle scatterings,
wherein velocity of each of a plurality of heterogeneous point sources on the gas-solid interface is assigned to be equal to velocity of the gas-solid interface in each of a plurality of corresponding points of diffuse particle scattering, and
wherein point source strength of each of the plurality of heterogeneous point sources on the gas-solid interface is assigned to be directly proportional to a property accommodation coefficient in each of the plurality of corresponding points of diffuse particle scattering, the property accommodation coefficient being in a range from zero to one.

29. A system for computational fluid dynamics analysis comprising:
means for specifying geometry model of a fluid system, which is approximated to a model gas system, including configurations, dimensions, materials, temperature, pressure, and a pre-initial time and an initial time;
means for transferring into memory a set of discretization parameters, wherein the set of discretization parameters comprises a set of points including a set of points in a space occupied by a model gas and a set of points on one or more of gas-solid interfaces being in contact with the model gas, the set of points in which the model gas system is identified by defining model gas material, the pressure, the temperature, external forces, and other properties comprising one or more of mass, momentum, and energy during a time period from the pre-initial time until the initial time;
means for transferring into memory a set of points connecting a non-moving point of the set of points in the space occupied by a model gas to each of other points of the set of points;
means for computing, for each of two points of the set of points, a converging ballistic trajectory of a particle having a starting point in one of points of the set of points and targeting a general non-moving point at a given time;
means for computing for each of converging ballistic trajectories a starting time;
means for computing a local initial time in each of the set of points;
means for specifying property value obtained by each of converging ballistic particles at the starting time, wherein, when the starting time is less than the local initial time, then property value is defined by a pre-established property value;
means for computing a probability of traveling along the converging ballistic trajectory;
means for computing a net rate of property influx per unit volume in each of a set of non-moving points at the given time from the model gas system by calculating an impact of converging ballistic particles targeting the non-moving point at the given time;

means for computing, for each of two points of the set of points, a diverging ballistic trajectory of a particle escaping the non-moving point at the given time;

means for identifying property value obtained by each of diverging ballistic particles at the given time;

means for computing probability of traveling along the diverging ballistic trajectory;

means for computing a net rate of property efflux per unit volume from each of the set of non-moving points at the given time;

means for formulating an integral property balance equation by establishing a property balance at the given time between the net rate of property influx and the net rate of property efflux in each of the set of non-moving points; and means for solving the integral property balance equation and obtaining property value in each of the set of points in the space occupied by a model gas at the given time, thereby reliably predicting a fluid flow including a flow of rarefied gases.

30. A non-transitory computer readable medium comprising computer executable instructions which when executed by a processor of a computer perform simulation of transport processes in fluids, the instructions comprising instructions for:

specifying geometry model of a fluid system, which is approximated to a model gas system, including configurations, dimensions, materials, temperature, pressure, and a pre-initial time and an initial time;

transferring into a memory a set of discretization parameters, wherein the set of discretization parameters comprises a set of points including a set of points in a space occupied by a model gas and a set of points on one or more of gas-solid interfaces being in contact with the model gas, the set of points in which the model gas system is identified by defining a model gas material, the pressure, the temperature, external forces, and other properties comprising one or more of mass, momentum, and energy during a time period from the pre-initial time until the initial time;

transferring into the memory a set of points connecting a general non-moving point of the set of points in the space to each of other points of the set of points;

computing, for each of two points of the set of points, a converging ballistic trajectory of a particle targeting the general non-moving point at a given time;

computing a starting time for the converging ballistic trajectory;

computing a local initial time in each of the set of points;

specifying property value obtained by each of converging ballistic particles at the starting time, wherein, when the starting time is less than the local initial time, then the property value is defined by a pre-established property value;

computing probability of traveling along the converging ballistic trajectory of the particle targeting the general non-moving point at a given time;

computing a net rate of property influx per unit volume in each of a set of non-moving points at the given time;

computing, for each of two points of the set of points, a diverging ballistic trajectory of the particle escaping the general non-moving point at the given time;

identifying property obtained by each of diverging ballistic particles at the given time;

computing the of traveling along the diverging ballistic trajectory;

computing a net rate of property efflux per unit volume from each of the set of non-moving points at the given time;

formulating an integral property balance equation by establishing a property balance at the given time between the net rate of property influx and the net rate of property efflux in each of the set of non-moving points;

solving the integral property balance equation and obtaining the property value in each of the set of points in the space at the given time, thereby reliably predicting a fluid flow including a flow of rarefied gases; and displaying results of simulation on a display device of the computer.

* * * * *